United States Patent
Tomioka et al.

(10) Patent No.: US 6,863,391 B2
(45) Date of Patent: Mar. 8, 2005

(54) LIQUID COMPOSITION, INK SET, METHOD OF FORMING A COLORED SECTION ON RECORDING MEDIUM AND INK-JET RECORDING APPARATUS

(75) Inventors: Hiroshi Tomioka, Tokyo (JP); Masao Kato, Tochigi (JP); Makiko Endo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 241 days.

(21) Appl. No.: 10/138,576

(22) Filed: May 6, 2002

(65) Prior Publication Data

US 2003/0079643 A1 May 1, 2003

(30) Foreign Application Priority Data

May 10, 2001 (JP) ........................................ 2001-140467

(51) Int. Cl.[7] .................................................. B41J 2/01
(52) U.S. Cl. ....................... 347/100; 347/95; 106/31.13
(58) Field of Search ............................ 347/100, 95, 96, 347/98, 101, 105; 106/31.13, 31.27, 31.6; 523/160; 428/195, 32.1

(56) References Cited

U.S. PATENT DOCUMENTS

| | | | |
|---|---|---|---|
| 4,202,870 A | 5/1980 | Weber et al. | 423/630 |
| 4,242,271 A | 12/1980 | Weber et al. | 260/448 AD |
| 4,433,048 A | 2/1984 | Solberg et al. | 430/434 |
| 4,694,302 A | 9/1987 | Hackleman et al. | 346/1.1 |
| 4,723,129 A | 2/1988 | Endo et al. | 346/1.1 |
| 5,618,338 A * | 4/1997 | Kurabayashi et al. | 347/100 |
| 5,640,187 A | 6/1997 | Kashiwazaki et al. | 347/101 |
| 5,846,647 A | 12/1998 | Yoshino et al. | 428/328 |
| 6,460,989 B1 | 10/2002 | Yano et al. | 347/101 |

FOREIGN PATENT DOCUMENTS

| | | |
|---|---|---|
| EP | 0 663 299 A2 | 7/1995 |
| EP | 0 822 094 A2 | 2/1998 |
| EP | 0 965 460 A2 | 12/1999 |
| EP | 1 106 658 | 6/2001 |
| EP | 1 193 077 A2 | 3/2002 |
| EP | 1 197 533 A1 | 4/2002 |

(List continued on next page.)

OTHER PUBLICATIONS

Brunauer, et al., The Journal of the American Chemical Society, "Adsorption of Gases in Multimolecular Layers", vol. LX, Jan.–Jun. 1938, pp. 309–319.

Barrett et al., The Journal of the American Chemical Society, "The Determination of Pore Volume and Area Distributions in Porous Substances. I. Computations from Nitrogen Isotherms", vol. LXXIII, Jan.–Mar. 1951, pp. 373–380.

Roček, et al., Institute of Chemical Process Fundamentals, Czechoslovak Academy of Scienc s, "Porous Structure of Aluminum Hydroxide and its Content of Pseudoboehmite", Applied Catalysis, 74, Elsevier Science Publishers B.V., (1991), pp. 29–36.

"Surface Science", Gakkai Shuppan Center (Japan Scientific Societies Press) pp 326–327, (Kenji Tamaru, ed.) (1985).

*Primary Examiner*—Manish Shah
(74) *Attorney, Agent, or Firm*—Fitzpatrick, Cella, Harper & Scinto

(57) ABSTRACT

This invention relates to a liquid composition adapted to be applied to a recording medium with ink containing a multi-color to form a colored section on the recording medium. The liquid composition contains fine particles reactive relative to the solvent and the coloring material in ink. When processed in particular steps, it produces aggregates of fine particles showing a specific surface area between 70 and 250 $m^2/g$ as determined by the BET nitrogen adsorption/desorption method.

39 Claims, 12 Drawing Sheets

FOREIGN PATENT DOCUMENTS

| | | | | |
|---|---|---|---|---|
| EP | 1197533 A1 * | 4/2002 | | B41J/2/21 |
| JP | 55-65269 A | 5/1980 | | |
| JP | 55-66976 A | 5/1980 | | |
| JP | 55-150396 A | 11/1980 | | |
| JP | 56-120508 A | 9/1981 | | |
| JP | 61-59911 B2 | 12/1986 | | |
| JP | 61-59912 B2 | 12/1986 | | |
| JP | 61-59914 B2 | 12/1986 | | |
| JP | 63-22681 A | 1/1988 | | |
| JP | 63-60783 A | 3/1988 | | |
| JP | 63-299971 A | 12/1988 | | |
| JP | 64-9279 A | 1/1989 | | |
| JP | 64-63185 A | 3/1989 | | |
| JP | 4-259590 A | 9/1992 | | |
| JP | 5-16015 B2 | 3/1993 | | |
| JP | 6-92010 A | 4/1994 | | |
| JP | 8-72393 A | 3/1996 | | |
| JP | 8-224955 A | 9/1996 | | |
| JP | 10-146991 A | 6/1998 | | |
| JP | 2000-34432 A | 2/2002 | | |

* cited by examiner

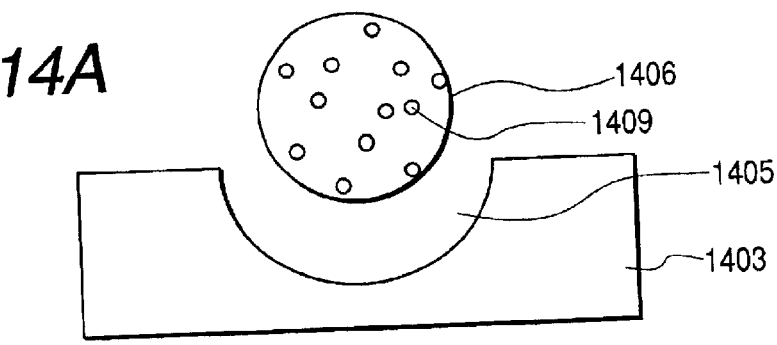
FIG. 14A
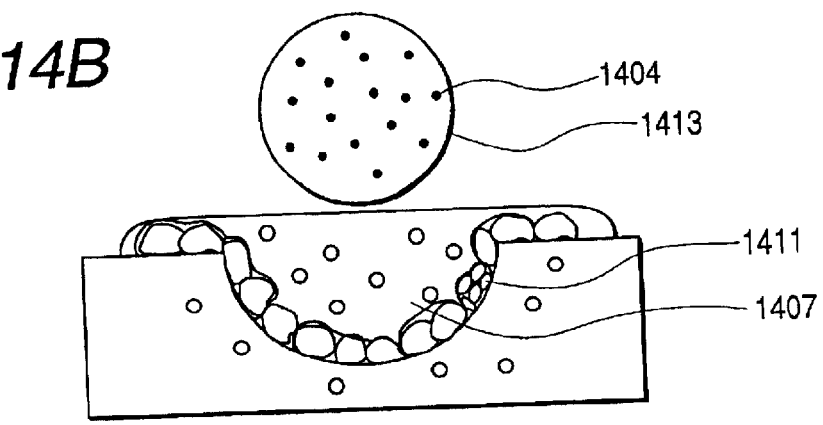
FIG. 14B
FIG. 14C
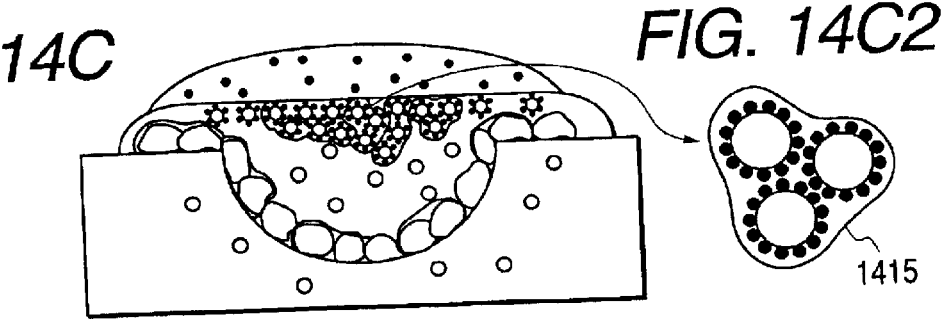
FIG. 14C2
FIG. 14D
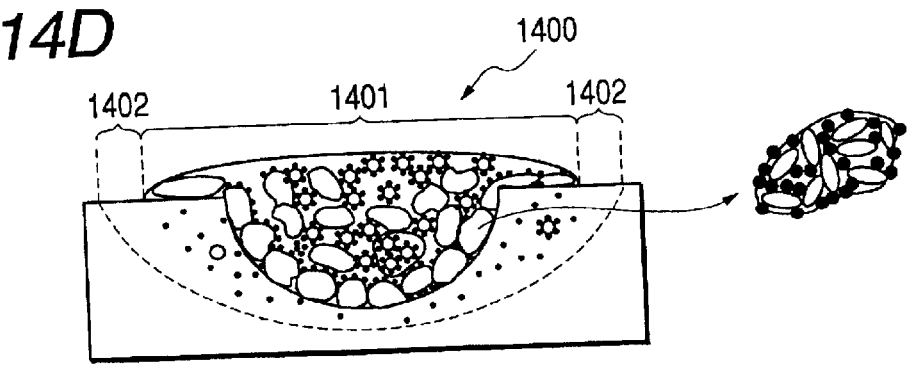

LIQUID COMPOSITION, INK SET, METHOD OF FORMING A COLORED SECTION ON RECORDING MEDIUM AND INK-JET RECORDING APPARATUS

BACKGROUND OF THE INVENTION

1. Field of the Invention

This invention generally relates to the technology of forming an excellent color image in terms of coloring property and uniformity of colors that can effectively suppress bleeding and provide high quality printing. More particularly, the present invention relates to a liquid composition that can suitably be used for forming images by means of an ink-jet recording method, an ink set, a method of forming a colored section on a recording medium and an ink-jet recording apparatus.

2. Related Background Art

An ink-jet recording method is a method of driving ink to fly and adhere to a recording medium, which may typically be a sheet of paper, for the purpose of recording an image thereon. For example, Japanese Patent Applications Laid-Open Nos. 61-59911, 61-59912 and 61-59914 disclose an ink-jet recording method that utilizes an electrothermal transducer as ejection energy supply means to apply thermal energy to ink and cause the latter to generate bubbles in order to eject liquid droplets. A high density multi-orifice recording head can be easily realized by using such a method to make it possible to record high resolution and high quality images at high speed.

Meanwhile, ink that is used with a conventional ink-jet recording method normally contains water and a coloring material as principal ingredients along with a water-soluble high boiling point solvent such as glycol that is added for the purpose of preventing ink from drying in the nozzles to clog the latter. However, an image recorded on a recording medium by using such ink may not show a satisfactory fixing effect and can be short of uniformity presumably because of an uneven distribution of the filler and the sizing material on the surface of the recording medium, which may typically be a sheet of paper. On the other hand, in recent year, images formed by ink-jet recording are strongly required to show an image quality comparable to that of silver salt photography. In other words, there is a strong demand for technologies that can raise the image density, expand the scope of color reproduction and improve the color uniformity of images formed by ink-jet recording.

Under these circumstances, various proposals have been made to improve the stability of ink-jet recording and the quality of images formed by ink-jet recording. As a proposal relating to recording medium, there is a known method of applying a filler and/or a sizing material to the surface of the base paper of a recording medium. For example, a technique of applying porous fine particles that adsorb coloring materials to a base paper as filler and forming an ink-receiving layer by the porous fine particles has been disclosed. Coat paper to be used for ink-jet recording that is produced by using such a technique is marketed as recording medium.

Some major proposals that have been made to provide stable and reliable ink-jet recording methods and improve the quality of images recorded by such ink-jet recording methods under these circumstances are classified below.

(1) Methods of Adding a Volatile Solvent and/or a Penetrating Solvent to Ink:

Japanese Patent Application Laid-Open No. 55-65269 discloses a method of adding a compound such as a surfactant that enhances the penetrating effect to ink as means of accelerating the fixation of ink to the recording medium. Japanese Patent Application Laid-Open No. 55-665976 discloses the use of ink containing a volatile solvent as major ingredient.

(2) Methods of Mixing Ink and a Liquid Composition that Reacts with Ink on the Recording Medium:

Methods of applying a liquid composition that improves the formation of an image on the recording medium before or after ejecting ink and forming a recorded image for the purpose of improving the image density and the water-resistance and suppress bleeding have been proposed. For example, Japanese Patent Application Laid-Open No. 63-60783 discloses a method of causing a liquid composition containing a basic polymer to adhere to the recording medium and subsequently recording an image by using ink containing an anionic dye. Japanese Patent Application Laid-Open No. 63-22681 discloses a method of mixing a first liquid composition containing reactive chemical seeds and a second liquid composition containing a compound that reacts with the reactive chemical seeds on the recording medium. Japanese Patent Application Laid-Open No. 63-299971 discloses a method of applying a liquid composition containing an organic compound having two or more than two cationic groups in a molecule to the recording medium and subsequently recording an image by means of ink containing an anionic dye. Japanese Patent Application Laid-Open No. 64-9279 discloses a method of applying an acidic liquid composition containing succinic acid or the like and subsequently recording an image by means of ink containing an anionic dye.

Furthermore, Japanese Patent Application Laid-Open No. 64-63185 discloses a method of applying a liquid composition that makes dyes insoluble to a sheet of paper before applying ink thereto. Japanese Patent Application Laid-Open No. 8-224955 discloses a method of using a liquid composition containing cationic substances with different molecular weight distribution regions with ink containing an anionic compound. Japanese Patent Application Laid-Open No. 8-72393 discloses a method of using a liquid composition containing a cationic substance and finely pulverized cellulose with ink. All the cited patent documents describe that the disclosed methods can produce an image with a high image density, a high printing quality, a good water-resistance, an excellent color reproducibility and a good anti-bleeding effect. Additionally, Japanese Patent Application Laid-Open No. 55-150396 discloses a method of recording an image on the recording medium by means of dye ink and subsequently applying a water-resistance providing agent that can form a lake with a dye. It proposes a method of providing the recorded image with water-resistance.

(3) Methods of Mixing Ink and a Liquid Composition Containing Fine particles on the Recording Medium:

Japanese Patent Application Laid-Open No. 4-259590 discloses a method of applying colorless liquid containing colorless fine particles of an inorganic substance onto the recording medium and subsequently causing non-aqueous recording liquid to adhere to the latter. Japanese Patent Application Laid-Open No. 6-92010 discloses a method of applying a solution containing fine particles and/or a binder polymer onto the recording medium and subsequently causing ink containing a pigment, water-soluble resin, water-soluble solvent and water to adhere to the latter. Japanese Patent Application Laid-Open No. 2000-34432 discloses a recording material containing a liquid composition that by turn contains water-insoluble fine particles and ink. All the cited patent documents describe that the disclosed methods can produce an excellent image in terms of printing quality and coloring property regardless of type of paper.

SUMMARY OF THE INVENTION

The inventors of the present invention looked into various known ink-jet recording techniques of the above listed categories and found that, while each of them may clearly provides excellent effects in achieving its own technological objectives, those effects are obtained often at the cost of other ink-jet recording characteristics. For example, a recording medium prepared by coating a filler and a sizing agent to the surface of the base paper of the recording medium (to be referred to as coat paper hereinafter) is recognized as a technological achievement that can form high quality images.

It is known that generally the coloring material applied to a recording medium needs to be left on the surface of the recording medium in a monomolecular state without agglomeration in order to obtain a highly saturated color image. Porous fine particles of coat paper provide such an effect. However, in order to produce a color image with a high density and a high degree of color saturation, it is indispensably necessary to form a thick ink receiving layer that completely covers the base paper by using a large volume of porous fine particles relative to the coloring material contained in given ink. Then, as a result, there arises a problem that the texture of the base paper is blinded. The inventors of the present invention presumed that such a thick ink receiving layer that blinds the texture of the base paper is needed because the coloring material is not adsorbed to porous fine particles effectively and efficiently.

This problem will be discussed in greater detail below. Imagine coat paper having a single ink receiving layer. FIG. 9 of the accompanying drawings shows a schematic cross sectional view of a part of such a coat paper located near the surface thereof. In FIG. 9, reference symbols 901 and 903 respectively denote the base paper and the ink receiving layer. Generally, an ink receiving layer includes porous fine particles 905 and an adhesive agent 907 for fixing them. As ink is applied, it penetrates the coat paper by way of the void among porous fine particles 905 by capillarity and produces penetrating ink sections 909. As shown in FIG. 9, the local density of porous fine particles 905 differs from place to place in the ink receiving layer so that ink penetrates by capillarity differently from place to place. As a result, the coloring material does not uniformly contact the surfaces of porous fine particles and hence is not adsorbed to porous fine particles effectively and efficiently.

Additionally, the adhesive agent 907 can block the penetration of ink in some areas. In other words, there are parts where ink does not penetrate in the ink receiving layer 903. Those parts do not participate in coloring at all. Thus, for the above reasons, conventional coat paper cannot adsorb the coloring material in a monomolecular state effectively and efficiently despite the large amount of porous fine particles laid on the paper. As a result, porous fine particles have to be consumed at a huge rate to consequently hide the texture of the base paper.

Furthermore, according to the study made by the inventors of the present invention, it was found that, while the use of any of the techniques of category (1) above improves fixation of ink to the recording medium, it can reduce the image density and narrow the scope of color reproduction that is highly important for recording color images on plain paper. On the other hand, while the techniques of category (2) above can produce recorded objects with a high image density because the coloring material in ink is effectively anchored to the surface of the recording medium, there can be occasions where the scope of color reproduction and the degree of color saturation are not sufficient probably because the coloring material is made to aggregate on the surface of the recording medium. Finally, while the techniques of category (3) above modify the surface condition when a solution containing fine particles is applied to the surface of the recording medium, they cannot produce images as chromatically fine and pure as the quality level of coat paper. Additionally, particularly in the case of non-aqueous recording liquid, the degree of freedom is low because selection of coloring materials and recording/application methods are limited. Thus, as discussed above, the known techniques are accompanied by problems to be dissolved. In view of this finding, the inventors of the present invention came to realize that new ink-jet recording techniques need to be developed in order to meet the demand for higher quality recorded images that has been increasing in recent years. The present invention is based on this recognition.

Therefore, it is an object of the present invention to provide a liquid composition for producing high quality recorded matters by means of ink-jet recording that show a broader scope of color reproduction, improved color uniformity and excellent fineness of characters and suppresses bleeding.

Another object of the present invention is to provide a method of forming a colored section on a recording medium that can be used for producing high quality recorded matters on plain paper by means of ink-jet recording that show a broader scope of color reproduction, improved color uniformity, excellent fineness of characters and suppresses bleeding without producing striped images in solid areas.

Still another object of the present invention is to provide an ink-jet recording apparatus that can produce high quality recorded matters on plain paper by means of ink-jet recording that show a broader scope of color reproduction, improved color uniformity, excellent fineness of characters and suppresses bleeding without producing striped images in solid areas as well as a liquid composition and an ink set that can be used with such an apparatus.

Still another object of the present invention is to provide a liquid composition that is excellent in terms of storage stability and ink-jet recording characteristics such as stability of ejection form a recording head.

In an aspect of the invention, there is provided a liquid composition to be applied to a recording medium with ink containing a coloring material to form a colored section on the recording medium, said liquid composition containing at least a solvent and fine particles reactive relative to said coloring material, the specific surface area of aggregates of fine particles formed from the liquid composition by way of steps (1) through (4) listed below being 70 to 250 $m^2/g$ as determined by the BET nitrogen adsorption/desorption method, (1) a step of drying the liquid composition at 120° C. for 10 hours in the atmosphere to substantially completely evaporate the solvent;

(2) a step of raising the temperature of said dry product from 120° C. to 700° C. in an hour and baking it at 700° C. for 3 hours;

(3) a step of gradually cooling the baked product to room temperature after the baking step and pulverizing it; and (4) a step of deaerating the powder obtained in the above step (3) by vacuum at 120° C. for 8 hours to obtain fine particles aggregates formed from the liquid composition.

In another aspect of the invention, there is provided an ink set comprising independently a coloring material and a liquid composition containing fine particles reactive relative to the coloring material, said liquid composition being a liquid composition as defined above.

In still another aspect of the invention, there is provided a method of forming a colored section on a recording medium, said method comprising (i) a step of applying ink containing a coloring material to a recording medium and (ii) a step of applying a liquid composition as defined above to the recording medium.

In a further aspect of the invention, there is provided an ink-jet recording apparatus comprising an ink storage section containing ink containing a coloring material, a first recording unit having an ink-jet head for ejecting ink, a liquid composition storage section containing liquid composition as defined above and a second recording unit having an ink-jet head for ejecting the liquid composition.

As a result of intensive research efforts for dissolving the problems of the prior art, the inventors of the present invention came to find that it is possible to cause a coloring material and fine particles to react with each other in a liquid-liquid state by using fine particles having an effect of adsorbing the multi-color in a monomolecular state, dispersing the fine particles in a solvent in order to cause the fine particles to effectively adsorb or become bonded to the coloring material and using them with ink in a liquid state. Then, consequently, it is possible to improve the density and the degree of color saturation of the formed image. The present invention is based on this finding.

As far as this patent specification is concerned, the terms of "reactive" and "reaction" in expressions such as "fine particles reactive relative to the coloring material" and "reaction of the coloring material and fine particles" means covalent bonding of the coloring material and fine particles as well as ionic bonding, physical/chemical adsorption, absorption, adherence and interaction of them.

BRIEF DESCRIPTION OF THE DRAWINGS

FIGS. 4A, 4B, 4C and 4D are schematic illustrations of a wiping operation of the ink-jet printer of FIG. 1, of which FIG. 4A shows a movement of each head from the printing region to the home position and a rising motion of the ink scraping blades and FIG. 4B shows an operation of wiping the printing heads, whereas FIG. 4C shows an operation of wiping the liquid composition ejection head and FIG. 4D shows an operation of wiping the printing heads and a falling motion of the ink scraping blades.

FIGS. 5A, 5B, 5C and 5D are schematic illustrations of a wiping operation of the ink-jet printer of FIG. 1, of which FIG. 5A shows a rising motion of each blade and FIG. 5B shows a movement of each head from the home position to the printing region, whereas FIG. 5C shows a falling motion of the liquid composition scraping blade and FIG. 5D shows an operation of wiping the printing heads and a falling motion of the ink scraping blades.

FIGS. 6A, 6B, 6C and 6D are schematic illustrations of a wiping operation of the ink-jet printer of FIG. 1, of which FIG. 6A shows a rising motion of ink scraping blades and FIG. 6B shows a movement of each head from the home position to the printing region and an operation of wiping the printing heads, whereas FIG. 6C shows a movement of each head from the printing region to the home position and FIG. 6D shows a movement of each head to the home position and an operation of wiping the liquid composition ejection head.

FIGS. 14A, 14B, 14C, 14C2 and 14D are schematic illustrations of steps of forming a colored section of an image formed by ink-jet recording according to the invention.

FIGS. 17A, 17B, 17C, 17D, 17E and 17F are schematic illustrations of a wiping operation of the ink-jet printer of FIG. 16, of which FIG. 17A shows a rising motion of the ink scraping blades, FIG. 17B shows an operation of wiping the printing heads and FIG. 17C shows a falling motion of the ink scraping blades, whereas FIG. 17D shows a rising motion of the both blades after the liquid composition is applied to a right position, FIG. 17E shows an operation of wiping the liquid composition and the head for ejecting black ink and FIG. 17F shows a falling motion of the both blades.

DESCRIPTION OF THE PREFERRED EMBODIMENTS

Figure 1:
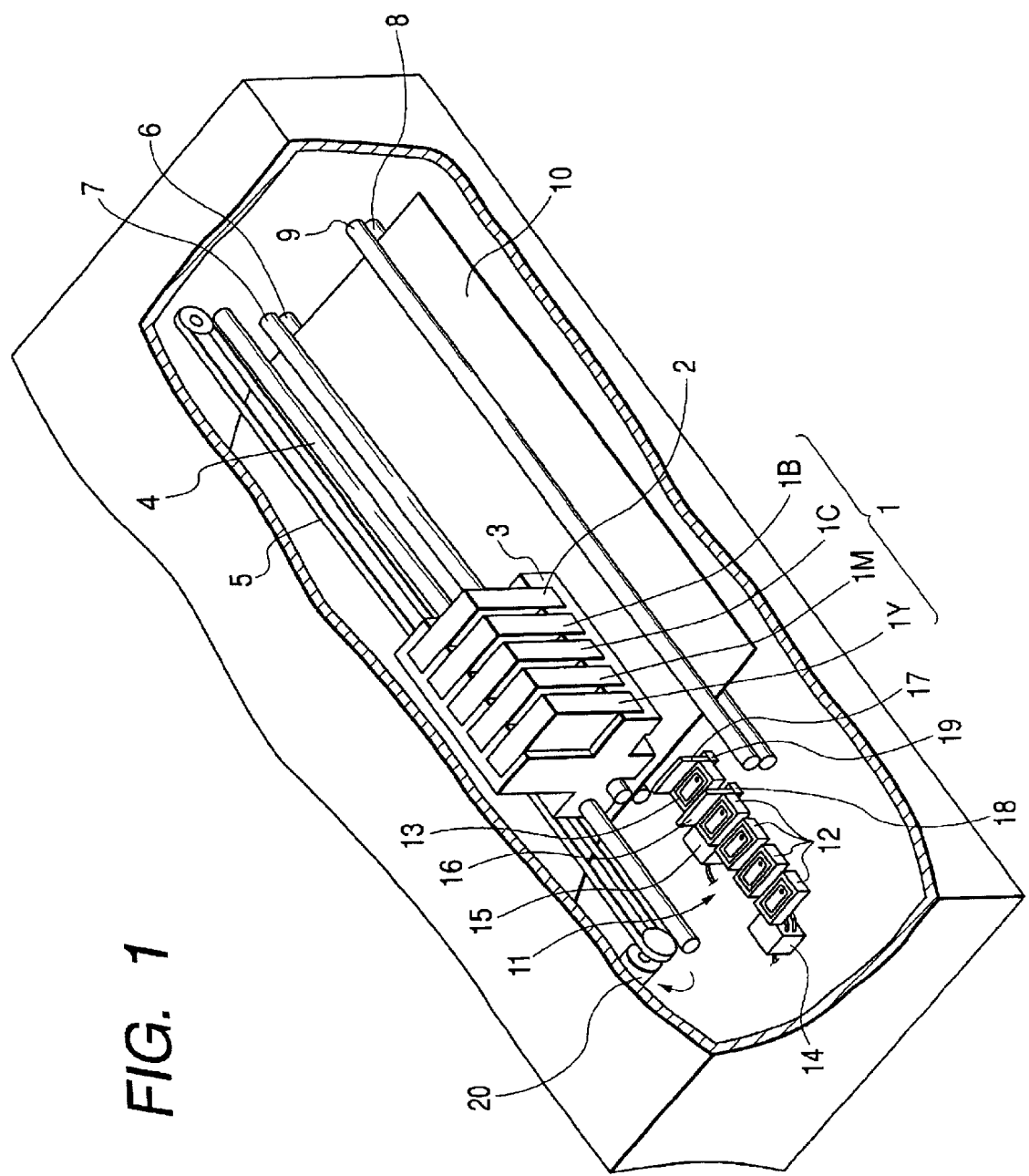
FIG. 1 is a partially cut out schematic cross sectional view of an embodiment of ink-jet printer according to the present invention.

Now, the present invention will be described in greater detail by referring to preferred embodiments.

As pointed out earlier, in an aspect of the invention, there is provided a liquid composition to be applied to a recording medium with ink containing a coloring material to form a colored section on the recording medium, said liquid composition containing at least a solvent and fine particles reactive relative to said coloring material, the specific surface area of aggregates of fine particles formed from the liquid composition by way of steps (1) through (4) listed below being 70 to 250 $m^2/g$ as determined by the BET nitrogen adsorption/desorption method, (1) a step of drying the liquid composition at 120° C. for 10 hours in the atmosphere to substantially completely evaporate the solvent;
(2) a step of raising the temperature of said dry product from 120° C. to 700° C. in an hour and baking it at 700° C. for 3 hours;

(3) a step of gradually cooling the baked product to room temperature after the baking step and pulverizing it; and
(4) a step of deaerating the powder obtained in the above step (3) by vacuum at 120° C. for 8 hours to obtain fine particles aggregates formed from the liquid composition.

In still another aspect of the invention, there is provided a method of forming a colored section on a recording medium by using such a liquid composition, said method comprising (i) a step of applying ink containing a coloring material to a recording medium and (ii) a step of applying the liquid composition as defined above to the recording medium. By using such a method, it is possible to produce high quality recorded matters on plain paper by means of ink-jet recording that show a broader scope of color reproduction, improved color uniformity, excellent fineness of characters and suppresses bleeding without producing striped images in solid areas.

In another aspect of the invention, there is provided an ink set of a combination of a coloring material and a liquid composition containing fine particles reactive relative to the coloring material, said liquid composition being a liquid composition as defined above. By using such an ink set, it is possible to produce high quality recorded matters on plain paper by means of ink-jet recording that show a broader scope of color reproduction, improved color uniformity, excellent fineness of characters and suppresses bleeding without producing striped images in solid areas. Since both ink and a liquid composition that is used in combination with ink for the purpose of the invention are of a simple make-up, they can be stored stably so that, as a result, it is possible to form high quality images to obtain recorded matters by means of ink-jet recording on a stable basis.

While the reasons why the present invention provides the above listed advantages are not clear, inventors of the present invention believe they include those that are described below. The inventors of the present invention have looked closely into the mechanism of forming aggregates of fine particles on the surface and its vicinity of a recording medium by conventional image forming methods, using an ink set comprising ink containing a coloring material and a liquid composition containing fine particles reactive relative to the coloring material.

Firstly, the mechanism will be described specifically by referring to FIG. 13 and FIGS. 14A through 14D. Note that in the following description, an aqueous ink containing a water-soluble dye having an anionic group (anionic dye) in combination with an aqueous liquid composition containing fine particles that are cationically charged on the surfaces and held in a dispersed state are used.

Before describing the mechanism, a technical term has to be defined. The expression of "a monomolecular state" as used herein refers to a state where a coloring material such as a dye or a pigment is held in a dissolved or dispersed state in ink. If the coloring material aggregates to a slight extent, it is also assumed to be in "a monomolecular state" unless the degree of color saturation is significantly reduced. It is desired that dyes are in a monomolecular state and hence the expression of in "a monomolecular state" is also applied to coloring materials other than dyes for the same of convenience.

Figure 13:
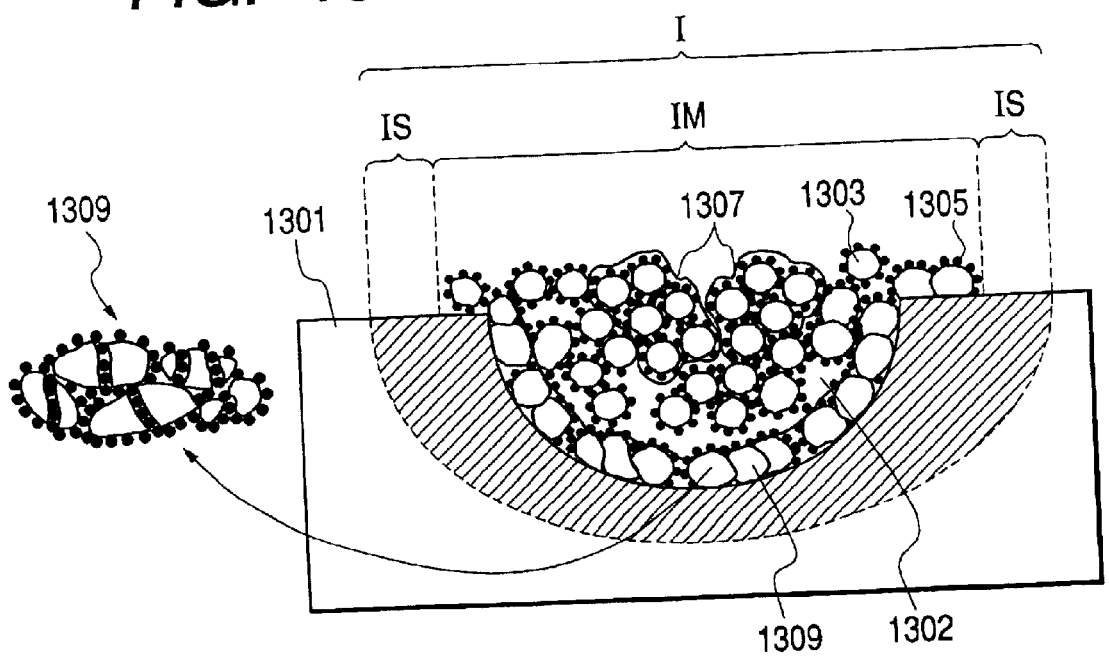
FIG. 13 is a schematic illustration of a colored section of an image formed by ink-jet recording according to the invention.

FIG. 13 is a schematic cross sectional view of a colored section I of a recorded image formed on a recording medium on the basis of the above mechanism, showing that the colored section I is formed by a main image section IM and a peripheral section IS. In FIG. 13, reference symbols 1301 and 1302 respectively denotes the recording medium and the void among fibers of the recording medium and reference symbol 1303 denotes fine particles that are schematically illustrated and adapted to chemically adsorb the coloring material 1305. As shown in FIG. 13, in an image produced by ink-jet recording according to the invention, the main image section IM is constituted by fine particles 1303 to the surfaces of which the coloring material is adsorbed uniformly in a monomolecular state or in a quasi-monomolecular state (to be referred to simply as in "a monomolecular state" hereinafter) and aggregates of fine particles retaining such a monomolecular state of the coloring material. In FIG. 13, reference symbol 1309 denotes aggregates of fine particles found near the fibers of the recording medium in the main image section IM. Such a main image section IM is formed by way of a step in which fine particles are physically and/or chemically adsorbed to fibers of the recording medium and a step in which the coloring material 1305 and fine particles 1303 are adsorbed to each other in a liquid-liquid state. As a result, the coloring property of the coloring material itself can hardly be damaged and the density and the degree of color saturation of the image are high even on a recording medium such as plain paper where ink can easily sink so that it is possible to form an image on plain paper with a broad scope of color reproduction that is as broad as that of an image formed on a coat paper.

On the other hand, the coloring material 1305 that is not adsorbed to the surfaces of fine particles and remaining in the applied ink penetrates the recording medium 1301 both transversally and vertically so that ink can produce minute blurs in the peripheral section IS. Because the, coloring material is left near the surface of the recording medium 1301 and produces minute blurs in the peripheral section IS, no white haze nor color unevenness occur in the regions of the image where ink is applied at a high rate such as shaded areas and solid areas to provide the image with a high degree of color uniformity. If the recording medium 1301 allows ink and a liquid composition to penetrate as in the case of FIG. 13, the ingredients of ink and those of the liquid composition may not necessarily be prevented from penetrating the inside of the recording medium. Rather, they will be allowed to penetrate the inside of the recording medium to a certain extent.

Additionally, when aggregates 1309 of fine particles are formed near the surface of the recording medium as a result of the reaction of the liquid composition and the coloring material in ink, pores of a certain size are produced in the inside of the aggregates. While ink penetrates the inside of the recording medium, the above described coloring material 1305 that is remaining solely in the applied ink penetrates the inside of such pores of aggregates 1309 of fine particles and adsorbed to parts of the pores including those located near the openings and on the inner walls thereof in an ideal monomolecular state. Thus, a larger portion of the coloring material remains near the surface of the recording medium to make it possible to produce a recorded matter that shows an excellent coloring effect.

As a result of an in-depth study of the mechanism, the inventor of the present invention came to realize that the specific surface area of such aggregates significantly influences the state of existence of the coloring material in the recorded part of the recording medium and the state of existence of the coloring material in the recorded part can be controlled accurately to produce a recorded matter of a higher quality by controlling the specific surface area of the aggregates. However, in the process of determining a desired specific surface area, it was highly difficult to determine the specific surface area of the aggregates of an actual recorded matter because the aggregates have adsorbed the coloring material at the surfaces thereof and even in the insides of the pores. Therefore, the inventors of the present invention paid efforts for finding a feasible method of determining the specific surface area of aggregates of fine particles that is correlated to the quality of the recorded section and came to find that the value of specific surface area of aggregates of fine particles that can be determined by using the BET nitrogen adsorption/desorption method and following the steps (1) through (4) below is correlated to higher quality ink images. More specifically, a very high quality recorded section can be formed when the specific surface area is between 70 and 250 $m^2/g$. The present invention is achieved on the basis of this novel finding of the inventors.

(1) a step of drying the liquid composition at 120° C. for 10 hours
(2) a step of raising the temperature of the dry product obtained in (1) from 120° C. to 700° C. in an hour and subsequently baking it at 700° C. for 3 hours
(3) a step of gradually cooling the baked product obtained in (3) to room temperature (25° C.) and subsequently pulverizing it typically in an agate mortar
(4) a step of deaerating the powder obtained in the above step (3) by vacuum at 120° C. for 8 hours to obtain fine particles aggregates Note that the pulverizing operation in step (3) is an operation for improving the operability of the aggregates of fine particles and does not influence the value of the specific surface area that is determined thereafter by the BET nitrogen adsorption/desorption method at all. In other words, the specific surface area of the aggregates of fine particles does not change after the operation.

When a liquid composition according to the invention is used, the specific surface area of the produced aggregates of fine particles 1309 shows a particular value that increases the number of coloring material adsorption sites and consequently improves the reactivity of the aggregates relative to the coloring material. As a result, the present invention provides the advantage that, although minute blurs are produced as described above, occurrence of bleedings along the color boundaries is suppressed and, at the same time, the quality of the characters recorded on the recording medium is improved if the recording medium is plain paper where the feathering phenomenon can easily appear.

FIGS. 14A through 14D are schematic cross sectional views of a colored section 1400 formed by a method of forming a colored section on a recording medium according to the invention. They also illustrate the steps for forming the colored section. In FIGS. 14A through 14D, there are shown a section 1401 mainly containing the reaction product of ink and the liquid composition, or the reaction product of the coloring material and the liquid composition (to be referred to as "reaction section" hereinafter), which corresponds to the main image section IM in FIG. 13 and a section 1402 formed by ink that does not substantially participate in the reaction with the liquid composition and flows out of the periphery of the reaction section 1401 (to be referred to as "ink flowing out section" hereinafter), which corresponds to the peripheral section IS in FIGS. 14A through 14D. The colored section 1400 is typically formed in a manner as described below. Note here that the part denoted by reference symbol 1405 in FIG. 14A schematically illustrates the void among fibers of the recording medium. As will be discussed hereinafter, with a method of forming a colored section on a recording medium by means of a liquid composition according to the invention, it is possible to produce a recorded matter of an image stably with a density and a degree of color saturation that are by far higher than any recorded matter obtained by a conventional method and the reason for this is a remarkable effect of the mechanism that will be described hereinafter.

Firstly, as the liquid composition 1406 containing fine particles 1409 that are reactive relative to coloring materials is applied to the recording medium 1403 in the form of droplets as shown in FIG. 14A, small liquid pools 1407 of the liquid composition are formed on the surface of the recording medium. Note that only a small liquid pool is shown in FIG. 14B. In the liquid pool 1407, the fine particles 1409 located near the surfaces of fibers of the recording medium 1403 are physically and/or chemically adsorbed to the surfaces of fibers of the recording medium. Under this condition, it may be safe to presume that the dispersed state of fine particles becomes unstable and some fine particles form aggregates 1411. On the other hand, fine particles located remote from fibers in the liquid pool 1407 presumably maintain the original uniformly dispersed state.

Figure 2:
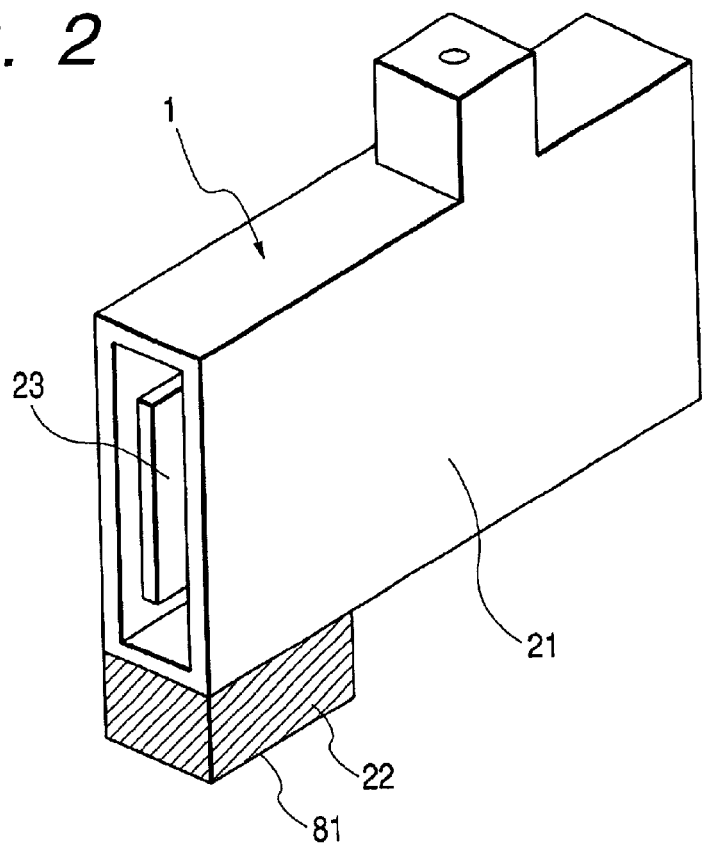
FIG. 2 is a schematic perspective view of the head cartridge in FIG. 1.

Then, as ink 1413 containing the coloring material 1404 is applied to the recording medium 1403 as droplets in a manner as shown in FIG. 14B, the coloring material 1404 in the droplet of ink is physically and/or chemically adsorbed to fine particles 1409 along the interface of the ink 1413 and the liquid pool 1407 (see FIG. 14C). Since this reaction takes place between two liquids (liquid-liquid reaction), presumably the coloring material 1404 is uniformly adsorbed to the surface of the fine particles 1409 in a monomolecular state as shown in FIG. 14C2. In other words, presumably the coloring material 1409 does not aggregate or only slightly aggregate on the surfaces of fine particles 1409. As a result, a large number of fine particles 1409 that have adsorbed the coloring material 1404 in a monomolecular state are produced in the surface layer of the reaction section 1401. Then, since the coloring material 1404 remains in a monomolecular state in the surface layer that is most influential to the coloring effect of the image, the formed image shows a high density and a high degree of color saturation.

Additionally, since the fine particles 1409 to the surfaces of which the coloring material 1404 is adsorbed come to show an unstably dispersed state, presumably some of them will aggregate. The produced aggregates 1415 retain the coloring material 1404 in a monomolecular state even in the inside thereof as shown in FIG. 14C2. Because the existence of such aggregates 1415, it is possible to form a recorded image with a high density and a high degree of color saturation by a method of forming a colored section on a recording medium according to the invention.

Furthermore, part of the coloring material 1404 that has not reacted is dispersed in the liquid pool 1407 and adsorbed to the surfaces of fine particles 1409 that have not reacted too. In this way, the reaction of the coloring material 1404 and fine particles 1409 proceeds further in the inside of the liquid pool 1407 to provide the formed image with a higher density and a higher degree of color saturation. On the other hand, the aggregates 1411 of fine particles formed on the surfaces of fibers of the recording medium 1403 in a manner as described above presumably take a role of suppressing the penetration of the liquid phase of the liquid pool 1407 into the recording medium. As a result, the fine particles 1409 in the liquid composition that is prevented from penetrating into the recording medium and the coloring material 1404 coexist in an intermingled state to a large extent to raise the probability of mutual contact so that the reaction proceeds relatively uniformly and sufficiently. As a result, it is possible to produce an image in a uniform manner that is excellent in terms of density and color saturation.

When the liquid composition 1406 is applied to the recording medium 1403 as shown in FIG. 14A and when ink 1413 is applied to the liquid pool 1407 of the liquid composition as shown in FIG. 14B, the dispersion of fine particles 1409 becomes unstable because the dispersion medium of the fine particles 1409 shows changes. Therefore, some of the fine particles 1409 may aggregate before they adsorb the coloring material 1404. The expression of changes of the dispersion medium as used herein refers to changes that are generally observed when two or more than two different types of liquid coexist in an intermingled state or changes in physical properties such as the pH of the liquid phase, the concentration of the solid ingredients, the composition of the liquid medium (solvent) and the concentration of dissolved ions. These changes occur rapidly and complexly to presumably destroy the dispersion stability of fine particles and produce aggregates 1415 when the liquid composition contacts the recording medium and ink. It will be safe to presume that such aggregates 1415 provide an effect of filling the void among fibers and that of retaining the fine particles 1409 that have adsorbed the coloring material 1404 further to and near the surface of the recording medium 1403.

The fine particles 1415 that are formed in the liquid pool 1407 may be partly adsorbed to the recording medium 1403 and partly moving in the liquid phase (having mobility). Those having mobility will adsorb the coloring material in a monomolecular state to the surface thereof as in the case of the above described steps of reaction of the coloring material 1404 and fine particles 1409 to produce larger aggregates, which presumably operate to further improve the coloring property of the liquid composition. More specifically, the large aggregates move with the liquid phase when the latter penetrates along fibers to fill the void and smooth the surface of the recording medium 1403 so as to improve the uniformity and the density of the formed image.

The present invention provides images that are highly dense and highly colored as will be evidenced hereinafter presumably because, as ink and the liquid composition according to the invention are applied to a recording medium to coexist on the latter, the coloring material 1404 in the applied ink is adsorbed to fine particles 1409 of the liquid composition and aggregates 1415 of fine particles in a monomolecular state and left on and near the surface of the recording medium in that state. Additionally, the fine particles to which the coloring material is adsorbed in a monomolecular state and left on and near the surface of the recording medium are fixed to the surface of the recording medium in that state to improve the durability of the image formed thereon in terms of rub-off resistance and water resistance.

While the liquid composition and ink are applied in the mentioned order in the above description, there is no limitation to the order of applying ink and the liquid composition for the purpose of the invention so long as a liquid-liquid reaction is ensured between ink and the liquid composition. In other words, ink may be applied first and the liquid composition may be applied subsequently.

Furthermore, as shown in FIG. 14B, presumably at least part of the fine particles 1409 contained in the liquid composition that is applied to the recording medium penetrates the inside of the recording medium 1403 as the liquid medium of the liquid composition penetrates the inside of the recording medium. On the other hand, as shown in FIG. 14D, it may be safe to imagine that the coloring material 1404 is adsorbed to and/or combined in a monomolecular state with the fine particles 1409 that have already penetrated the inside of the recording medium. In this way, the fine particles 1409 that have adsorbed and/or been combined with the coloring material 1404 in a monomolecular state operate to improve the coloring effect of the applied ink. It may also be safe to image that the fixation of ink is improved by the penetration of the liquid medium.

Besides, as a result of using a liquid composition according to the invention, when aggregates 1411 are formed by some of the fine particles existing on and near the surface of the recording medium, pores of a certain size are also formed in the inside of the aggregates. The coloring material 1404 that has not been adsorbed to fine particles 1409 and remains in the liquid pool 1407 will penetrates the inside of the recording medium 1403 and then the inside of aggregates 1411 of fine particles along with certain ingredients of the liquid medium through such pores. At this time, the coloring material 1404 is adsorbed to parts of the pores including those located near the openings and on the inner walls thereof so that only the solvent will penetrate further into the inside of the recording medium 1403. As a result, more coloring material will be adsorbed efficiently to the surface and the inside of the aggregates 1411 of fine particles and consequently remain on and near the surface of the recording medium. Additionally, if the coloring material 1404 is a dye, the diameter of the pores of the aggregates 1411 of fine particles is about one to several times of the size of the molecules of the coloring material 1404 existing in ink. This means that molecules of the coloring material 1404 adsorbed to the inside of pores will hardly aggregate by themselves and hence remain in an ideal monomolecular state. This situation will work to further improve the coloring effect of the coloring material and expand the scope of color reproduction.

The aggregates 1411 of fine particles presumably remarkably lose their mobility on and near the surface of the recording medium and are held in a substantially fixed state. The coloring material adsorbed to the surface of aggregates of fine particles and to the inside of pores thereof can hardly move in the inside of the liquid pool 1407. According to a study of the inventors of the present invention, the number of coloring material adsorbing sites of aggregates of fine particles increases to improve their reactivity when the specific surface area of the aggregates 1411 of fine particles shows a particular value. Then, as a result, the coloring material on the recording medium is prevented from dispersing to a certain extent to consequently suppress the phenomenon of bleeding from occurring along the color boundaries so that high quality characters may be recorded on the recording medium which may be plain paper that is prone to show feathering.

The inventors of the present invention also found that the physical properties of the pores and the specific surface area of the aggregates 1411 of fine particles are influenced not only by the fine particles 1409 contained in the liquid composition 1406 but also by the composition of the liquid medium of the liquid composition and that of the liquid medium of ink. When aggregates of fine particles are formed from the liquid medium in such a way that they show a particular specific surface area, the image forming ability of the combination of the liquid composition and ink on the surface of the recording medium is strongly correlated with a situation where the pore volume of the aggregates of fine particles having a radius found within a particular range is also found within a particular range. According to the invention, it is also preferable that the pore radius and the pore volume of the aggregates of fine particles obtained by subjecting the liquid composition to a predetermined processing operation are found within respective particular ranges.

As described above, according to the invention, fine particles in the liquid-medium and the coloring material in ink are made to react with each other in a liquid phase on the surface of the recording medium. According to a study made by the inventors of the present invention, a particularly favorable effect can be obtained when anionic or cationic aqueous ink is used and the liquid composition to be used with ink is an aqueous liquid composition containing in a dispersed state fine particles that are electrically charged to the polarity opposite to that of aqueous ink. For example, if the multi-color contained in ink is anionic, it will be highly effectively and efficiently adsorbed to the surfaces of fine particles in the liquid medium when the fine particles are cationic. To the contrary, when conventional coat paper to be used for ink-jet recording is used to achieve a coloring material adsorbing effect comparable to that of the present invention, it should contain cationic porous fine particles to a large extent. Then, a thick ink receiving layer has to be formed to completely cover the base paper. Such coat paper can damage the texture of the base paper. If compared with the use of such coat paper, the process of forming an image by using a liquid composition according to the invention requires much less fine particles contained in the liquid composition. Therefore, it is possible to form an image on a recording medium that does not damage the texture of the base paper. Then, the recorded area and the non-recorded area of the recording medium that carries the image will not produce any difference of texture.

Additionally, the present invention is free from both a situation where the coloring material itself is not sufficiently left on the surface of the recording medium as in the case of (1) of the prior art and a situation where the coloring material is sufficiently left on the surface of the recording medium but aggregate by itself as in the case of (2) of the prior art. According to the invention, the coloring material adsorbed to the surface of fine particles can be anchored to the surface of the recording medium along with the fine particles and the coloring material retains a monomolecular state so that it is possible to form an image showing an excellent coloring effect.

Apparently, the present invention may resemble to the method of externally adding a liquid medium containing fine particles to ink as described in (3) of the prior art at the first glance because a liquid composition containing fine particles and ink containing a coloring material are applied to the surface of a recording medium to form an image according to the invention. However, as described above in detail, according to the invention, the liquid composition and the coloring material are encouraged to positively react with each other and the fine particles in the liquid composition are used as means for suppressing agglomeration (production of lake) of the coloring material. On the other hand, the purpose of applying a solution containing fine particles as described in (3) of the prior art is to modify the surface condition of the recording medium and hence the method of (3) of the prior art is totally different from the present invention. The prior art does not disclose at all the idea of the present invention of causing fine particles in the liquid composition and the coloring material in ink to chemically react with each other. Therefore, a recorded matter obtained by a recording method of the prior art and a recorded matter obtained according to the invention are clearly different from each other in terms of quality probably because of the difference of mechanism. According to the invention, it is possible to obtain an image that is excellent in terms of density and color saturation as well as in terms of other characteristics of the image including fixation.

Now, the ingredients of a liquid composition according to the invention and those of ink to be used with it will be described in greater detail.

Firstly, cationic ink and anionic ink will be defined. It is well known to those skilled in the art that, as far as ionic characteristics of ink is concerned, ink itself is not electrically charged and hence neutral. Therefore, the expression of anionic ink or cationic ion refers to an ingredient of ink, e.g., a coloring material, that has an anionic or cationic group, whichever appropriate, and the ingredient is so regulated that the group behave as such in the ink. This description also applies to an anionic or cationic liquid composition.

<Liquid Composition>

Firstly, a liquid composition according to the invention will be described.

(Specific Surface Area of Aggregates of Fine Particles)

A liquid composition according to the invention contains at least solvent and fine particles reactive relative to the coloring material in ink and aggregates of fine particles formed through steps (1) through (4) below preferably shows a specific surface area between 70 and 250 $m^2/g$ as determined by the BET nitrogen adsorption/desorption method;

(1) a step of drying the liquid composition at 120° C. for 10 hours in the atmosphere to substantially completely evaporate the solvent;

(2) a step of raising the temperature of said dry product from 120° C. to 700° C. in an hour and baking it at 700° C. for 3 hours;

(3) a step of gradually cooling the baked product to room temperature after the baking step and pulverizing it; and (4) a step of deaerating the powder obtained in the above step (3) by vacuum at 120° C. for 8 hours to obtain fine particles aggregates formed from the liquid composition.

The pretreatment of steps (1) through (3) is conducted to produce aggregates of fine particles out of the liquid composition by drying and completely eliminate the solvent by baking in order to evacuate the inside of pores in the inside of the aggregates and produce void.

For the purpose of the invention, from the viewpoint of reactivity with the coloring material, it is preferable to use a liquid composition that can produce aggregates of fine particles showing a specific surface area between 70 and 250 $m^2/g$ as determined by the above identified method. By using such a liquid composition, the reactivity of the liquid composition is enhanced relative to the coloring material and bleeding along the color boundaries is effectively suppressed to further improve the quality of recorded characters. On the other hand, the reactivity of the liquid composition relative to the coloring material in ink is not raised excessively and degradation of the coloring property due to excessive agglomeration of the coloring material is effectively suppressed. Additionally, reduction of dispersion stability due to excessive interactions of fine particles in the liquid composition and degradation of storage stability due to agglomeration of fine particles can also be effectively suppressed. More preferably, the specific surface area is between 100 and 200 $m^2/g$. If the specific surface area is found within this range, bleeding and stripes in the obtained image are largely alleviated and further improvement in the quality of recorded characters can be seen. Furthermore, aggregates of fine particles are formed with appropriate pores to improve the coloring property of the coloring material to a great advantage of the use of a liquid composition according to the invention.

While the specific surface area of the aggregates of fine particles is determined by the BET nitrogen adsorption/ desorption method according to the invention, the BET specific surface area can be determined by subjecting the liquid composition to the above described pretreatment to produce aggregates of fine particles out of the liquid composition and subsequently using a method proposed by Brunauer et al. (J. Am. Chem. Soc., Vol. 60, 309, 1938). This method is used in the experiments conducted for the purpose of the invention.

(Radius and Volume of Pores of Aggregates of Fine Particles)

The mechanism of image recording is described above. When a liquid composition according to the invention is used for forming an image, aggregates of fine particles are formed on and near the surface of the recording medium by specific fine particles contained in the liquid composition and then pores having a certain size are formed in the inside of the aggregates. Then, as ink penetrates into the inside of the recording medium, the coloring material existing independently in the ink penetrates into the inside of pores of aggregates of fine particles. As a result, the coloring material is made to remain on and near the surface of the recording medium to a greater extent so that consequently it is possible to obtain a recorded matter showing an excellent coloring effect. Therefore, a liquid composition according to the invention is preferably such that appropriate pores are formed in the aggregates of fine particles.

The dimensions of the pores formed by fine particles contained in the liquid composition can be determined by the nitrogen adsorption/desorption method as in the case of measuring the specific surface area of aggregates of fine particles as described above. Thus, an excellent image can be formed when a liquid composition according to the invention and containing at least fine particles and solvent is so prepared that the specific surface area of the aggregates of fine particles formed by the above described process is found within a particular range and, preferably, the volume of the pores in the aggregates of fine particles whose radius is found within a particular range is also found within an appropriate range as measured by the above method.

As a result of a series of experiments conducted by the inventors of the present invention, it was found that an excellent image can be formed when the volume of the pores of the aggregates of fine particles formed from a liquid composition by means of the above described method and having a radius within a range between 3 nm and 30 nm as measured by the nitrogen adsorption/desorption method is found within a particular range. While the reasons of the strong correlation of the volume of the pores having a radius within the above range and the image forming ability of combination of the liquid composition and ink on the surface of the recording medium are not clear, it may be safe to presume that the coloring material and the solvent penetrate poorly into the inside of aggregates of fine particles and the coloring material is adsorbed only poorly to the inside of pores so that the pores do not participate in improving the coloring effect of the coloring material when the radius of the pores is smaller than the above range. On the other hand, when the radius of the pores is greater than the above range, while the coloring material and the solvent may penetrate with ease, probably the coloring material adsorbed to parts of the pores including those located near the openings and on the inner walls thereof can hardly participate in absorption of light due to the light scattering effect of the pore themselves to consequently degrade its own coloring property.

Thus, when determining the coloring performance of the image formed by using a liquid composition according to the invention, it is effective to measure the volume of the pores within a radius range between 3 nm and 30 nm and also in a radius range exceeding 30 nm for the aggregates of fine particles formed out of the liquid composition to be observed that is subjected to the above described pretreatment. The above described nitrogen adsorption/desorption method is most suited for observing the physical properties of pores with the above ranges. The radius and the volume of pores can be determined by using the nitrogen adsorption/desorption method and the method proposed by Barrett et al. (J. Am. Chem. Soc., Vol. 173, 373, 1951) after deaerating the specimen of liquid composition that is pretreated in a manner as described above by vacuum at 120° C. for 8 hours. More preferably, the volume of the pores formed in the aggregates of fine particles is measured within a radius range between 3 nm and 20 nm and also in a radius range exceeding 20 nm. The coloring property of the coloring material is further improved in these ranges particularly if the coloring material is a dye and therefore it is preferable to observe the coloring performance in these ranges.

As pointed out above, it is preferable that the radius of the pores of the aggregates of fine particles is found within a range between 3 nm and 30 nm from the viewpoint of quick penetration of the coloring material, adsorption thereof to parts of the pores including those located near the openings and on the inner walls thereof and prevention of agglomeration of the coloring material in the inside of the pores. Additionally, the pores need to have a certain volume in order to take the coloring material into the inside by an amount sufficient to operate for improving the coloring effect thereof. Furthermore, the extent to which the coloring material is adsorbed not only to the inside of pores but also to parts thereof located near the openings will increase when the pore volume is raised.

From this point of view, a liquid composition according to the invention is preferably such that, when the pores in the aggregates of fine particles are observed by the above described method, the volume of the pores within the radius range between 3 nm and 30 nm is not less than 0.4 ml/g and that of the pores within the radius range exceeding 30 nm is not more than 0.1 ml/g. The coloring material and the solvent penetrate into the inside of the pores and the pores of the aggregates of fine particles effective operate to improve the coloring property of the coloring material by limiting the radius of the pores to the above ranges. Additionally, since the light scattering effect of pores is suppressed also by limiting the radius of the pores to the above ranges, the problem that the coloring material adsorbed to parts of the pores including those located near the openings and on the inner walls thereof does not operate effectively for coloring can be satisfactorily suppressed.

More preferably, the volume of the pores within the radius range between 3 nm and 20 nm is not less than 0.4 ml/g and that of the pores within the radius range exceeding 20 nm is not more than 0.1 ml/g. The coloring property is further improved to make it possible to form an image with an expanded scope of color reproduction when a large number of pores within the radius range between 3 nm and 20 nm exist particularly if a dye is used for the coloring material. Note that the radius and the volume of the pores in the aggregates of fine particles formed from the liquid composition can vary depending not only on the chemical seed, the profile and the size of the contained fine particles but also on the type of the solvent, the additives and their composition ratio. Therefore, the profile and the condition of the aggregates of fine particles can be controlled by controlling these parameters. Thus, the pores formed in the aggregates of fine particles preferably have dimensions within the above ranges when preparing a liquid composition according to the invention, taking these parameters into consideration.

(Effects of Fine Particles)

It is desired that the fine particles contained in a liquid composition according to the invention have the effects 1) and 2) listed below. These effects may be provided by fine particles of a single type or those of two or more than two different types for the purpose of the invention.
1) When mixed with ink, they adsorb the coloring material of the ink to the surfaces thereof without damaging the intrinsic coloring property of the coloring material.
2) When mixed with ink or when applied to a recording medium, their dispersion stability is reduced so that they remain on the surface of the recording medium.

For the fine particles to exert the effect of 1), they preferably have an ionic property that is opposite to that of the coloring material to be combined with the liquid composition for use. The coloring material is electrostatically adsorbed to the surfaces of fine particles when the fine particles have such a property. For example, if the coloring material contained in ink is anionic, cationic fine particles will be used. If, to the contrary, the coloring material contained in ink is cationic, anionic fine particles will be used. Factors other than ionicity that can be used for adsorbing the coloring material include the size, the mass and the surface profile of fine particles. For example, porous fine particles having many pores on the surface show particular adsorption characteristics and hence can effectively adsorb the coloring material depending on the size and shape and other factors of the pores.

The effect of 2) above is produced as a result of interaction of ink and the recording medium. Therefore, this effect can be obtained depending on their compositions. For instance, the fine particles may show the ionicity opposite to that of any of the ingredients of ink and/or that of any of the ingredients of the recording medium. The dispersion stability of the fine particles will be influenced by the electrolyte that may exist in ink and/or in the liquid medium. For the purpose of the present invention, either the effect of 1) or that of 2) is preferably exerted the instance when ink and the liquid composition is mixed with each other. More preferably, both the effect of 1) and that of 2) are exerted the instance when ink and the liquid composition is mixed with each other.

[Cationic Liquid Composition]

Cationic liquid compositions that can be used for the purpose of the invention include those containing fine particles having a cationic group on the surface thereof and acid, in which said fine particles are dispersed stably. Preferable cationic liquid compositions that can be used for the purpose of the invention include those that contains acid and whose pH is regulated to be within a range between 2 and 7 and those whose zeta potential is within a range between +5 and +90 mV.

(pH and Zeta Potential)

Now, the zeta potential of a liquid composition will be discussed below. Firstly, the principle of zeta potential will be described. Generally, if the solid phase carries a free electric charge on the surface in a system where solid is dispersed in liquid, an oppositely charged layer appears in the liquid phase near the interface of the solid phase so as to make the system maintain electric neutrality. This is referred to as electric double layer and the potential difference developing unit to the electric double layer is referred to as zeta potential. The surfaces of fine particles are cationic if the zeta potential is positive, whereas they are anionic if the zeta potential is negative. Generally, the electrostatic repulsive force existing among fine particles is strong to produce a good dispersion and, at the same time, the ionicity of the surfaces of the fine particles is also strong when the absolute value of the zeta potential is large. In the case of cationic fine particles, they show a strong cationic property and strongly attract anionic compounds in ink when the zeta potential is high.

Furthermore, as a result of intensive research efforts for looking into the relationship between the zeta potential of a liquid composition to be used for forming images and the quality of the images formed by using the liquid composition, they came to find that the colored section formed on the recording medium shows a particularly excellent coloring property when a liquid composition whose the zeta potential is found within a range between +5 and +90 mV. While the reason for this is not clear, probably because the cationic property of fine particles is appropriate and hence the anionic compound (anionic coloring material) of ink does not aggregate rapidly, the anionic compound is adsorbed to the surfaces of fine particles uniformly and thinly so that the coloring material can hardly form a huge colony of lake and, as a result, the coloring material properly exerts its coloring effect. Additionally, in the case of a cationic liquid composition according to the invention, fine particles of the liquid composition are presumably held in an unstably dispersed state and keep on showing a weak cationic property after adsorbing the anionic compound to the surfaces thereof so that, while they aggregate, they are adsorbed easily to the surfaces of anionic cellulose fibers existing in the liquid composition and remain on and near the surface of the recording medium.

Thus, the excellent effects of using a liquid composition according to the invention as listed below can be obtained for the above identified reasons. Namely, as a result of using a liquid composition according to the invention, even plain paper provides a coloring effect as high as that of coat paper to be used for ink-jet recording and the produced image is excellent in terms of color uniformity and free from white haze and color unevenness in areas where ink is applied to a large extent such as shaded areas and solid areas. Additionally, an excellent image that shows a good rub-off resistance in recorded areas can be obtained without damaging the texture of the base paper particularly when plain paper is used because, if compared with coat paper, it is not necessary to apply cationic fine particles to a large extent in order to make the anionic compound (anionic coloring material) of ink to become adsorbed to the surfaces of fine particles and efficiently exerts its proper coloring effect. Particularly, when a liquid composition containing cationic fine particles whose zeta potential is found within a range between +10 and +85 mV is used, the boundaries of dots of a solidly recorded image are hardly noticeable and the obtained image is excellent and practically free from striped areas that can be produced as a result of the scanning operation of the ink-jet head. Most preferably, the zeta potential is within a range between +15 and +65 mV. Then, it is possible to obtain an image showing a very excellent coloring effect regardless of the type of paper used for the recording medium.

It is preferable that a cationic liquid composition according to the invention shows a pH value between 2 and 7 at or about 25° C. from the viewpoint of storage stability and the effect of adsorbing anionic compounds. Such a liquid composition does not cause any anionic compound to strongly aggregate and hence can prevent the degree of color saturation of the recorded image from falling to make the image a dull one because it does not remarkably reduce the stability of the anionic compound if it is mixed with anionic ink. Additionally, cationic fine particles keep a well dispersed state if the pH value is found within the above identified range so that the storage stability of the liquid composition can be maintained and the liquid composition can be stably ejected from the recording head. Furthermore, when the liquid composition is mixed with ink, the anionic substance of ink is sufficiently adsorbed to the surfaces of cationic fine particles so that the coloring material of ink is prevented from penetrating excessively into the inside of the recording medium and the recorded matter obtained by ink-jet recording shows an excellent coloring effect. More preferably, the pH value is between 3 and 6. If the pH value is within this range, the recording head can be protected against corrosion very effectively if it is stored for a long period of time and the rub-off resistance of the recorded area is further improved.

(Cationic Fine Particles)

Now, the cationic liquid composition of the present invention will be described. It is preferable for the cationic fine particles as the first component of the liquid composition to have cationic surface when the particles are dispersed in the liquid composition in order to obtain the above described effects. Because of the cationic surface of the particles, anionic colorants in the anionic ink are adsorbed quickly on the surface of the cationic fine particles when the cationic liquid composition and the anionic ink are mixed, and the quick adsorption prevents the colorant from penetrating into the printing medium excessively. Thus, ink-jet recorded product having sufficient optical density can be obtained. On the contrary, in case that the fine particles do not have cationic surface, and the cationic liquid composition contains water-soluble cationic compound other than the fine particle, the water-soluble cationic compound has the anionic colorants in the anionic ink agglomerated, and such an agglomeration may worsen the coloring properties of the colorants, thus, it is considered to be difficult to obtain ink-jet recorded product having the same quality as that produced on a recording medium specially prepared for ink-jet, i.e. a recording medium having an ink-jet ink receiving layer. While the fine particles contained in a liquid composition according to the invention need to have a cationically charged surface, not only fine particles that are intrinsically cationic but also those that are electrostatically anionic or neutral but whose surfaces are processed to become cationic may suitably be used as an ingredient of a liquid composition according to the invention.

Any cationic fine particles that form aggregates having pores on the recording medium and showing a specific surface area found within a given range can suitably be used to achieve the objectives of the present invention. There are no restrictions to the type of fine particles to be used for the purpose of the invention. Specific examples of cationic fine particles that can be used for the purpose of the invention include silica, alumina, alumina hydrate, titania, zirconia, boria, silica boria, ceria, magnesia, silica magnesia, calcium carbonate, magnesium carbonate, zinc oxide, hydrotalcite, composite fine particles of any of these, organic fine particles and inorganic/organic compound fine particles that are processed to become cationic. Any of them may be used solely or in the form of a combination of two or more than two in a liquid composition according to the invention.

Of the above listed, fine particles of alumina hydrate may preferably be used for the purpose of the invention because the particle surface has a positive electric charge. Particularly, the use of alumina hydrate that shows a boehmite structure as determined by X-ray diffractometry is advantageous and preferable from the viewpoint of coloring effect, color uniformity and storage stability. Alumina hydrate is defined by a general formula shown below;

$$Al_2O_{3-n}(OH)_{2n} \cdot mH_2O$$

where n represents an integer between 0 and 3 and m represents a number between 0 and 10, preferably between 0 and 5. The expression of $mH_2O$ represents an aqueous phase that can desorbed in many cases without participating in the formation of crystal lattice and hence m can be a number that is not integer. Note, however, that m and n are not equal to 0 at the same time.

Generally, crystal of alumina hydrate showing a boehmite structure has (020) planes produced by a layered compound that forms a huge plane and shows a particular diffraction peak in the X-ray diffractogram. It may show a structure containing excessive water between layers of (020) planes that is referred to as pseudoboehmite structure instead of a perfect boehmite structure. The X-ray diffractogram of pseudoboehmite shows a diffraction peak that is broader than that of perfect boehmite.

Since it is impossible to clearly discriminate boehmite and pseudoboehmite, alumina hydrate showing a boehmite structure (to be referred to simply as alumina hydrate) refers to both boehmite and pseudoboehmite for the purpose of the present invention unless specifically noted. As for the spacing of (020) planes and the crystal thickness of (020) planes, the diffraction angle 2θ is firstly obtained by observing the peak that appears between 14 and 15° and using the diffraction angle 2θ of the peak and the half width B and the spacing of (020) planes is determined by using the Bragg's formula, whereas the crystal thickness is determined by using the Scherrer's formula. The spacing of (020) planes can be used as a yardstick for determining if the alumina hydrate is hydrophilic or hydrophobic. Any appropriate method may be used for preparing alumina hydrate for the purpose of the invention as long as it can produce alumina hydrate having a boehmite structure. For example, alumina hydrate may be prepared by a known method of hydrolyzing aluminum alkoxide or a known method of hydrolyzing sodium aluminate.

As described in Japanese Patent Application Laid-Open No. 56-120508, it is possible to change the boehmite structure in terms of X-ray diffraction by subjecting amorphous alumina hydrate to a heat treatment at or above 50° C. in the presence of water. With a particularly preferable method, alumina hydrate is obtained by adding acid to long chain aluminum alkoxide and subjecting the latter to hydrolysis and defluocculation. Long chain aluminum alkoxide typically has 5 or more than 5 carbon atoms. The use of alkoxide having 12 to 22 carbon atoms is preferable because it makes it easy to remove alcohol and control the profile of alumina hydrate in the manufacturing process, which will be described hereinafter.

One or more than one acids selected from organic and inorganic acids without limitation and added to long chain aluminum alkoxide for the purpose of the invention. However, the use of nitric acid is most preferable from the viewpoint of reaction efficiency of hydrolysis and profile control of obtained alumina hydrate. It is also possible to control the grain diameter by means of hydrothermal synthesis after this step if nitric acid is used. When the process of hydrothermal synthesis is conducted by using a dispersed solution of alumina hydrate that contains nitric acid, the nitric acid in the aqueous solution is taken in to the surface of alumina hydrate as nitric acid radical to consequently improve the dispersiblility of the hydrate in the aqueous solution.

The above described method of producing alumina hydrate by way of hydrolysis of long chain aluminum alkoxide provides an advantage that impurities such as various ions can hardly get into the reaction system if compared with the method of preparing alumina hydrogel or cationic alumina. Another advantage of the above method is that the long chain alcohol produced after the hydrolysis can be used to completely eliminate alcohol from the alumina hydrate if compared with the method of using short chain alkoxide such as aluminum isoproxide. With the above described method, the pH value of the solution at the time of starting hydrolysis is preferably held to 6 or less. If the pH value exceeds 8, the alumina hydrate that is ultimately obtained will be crystalline and hence is not preferable.

Alumina hydrate to be used for the purpose of the invention may contain metal oxide such as titanium dioxide if it shows a boehmite structure when examine by X-ray diffractometry. Content ratio of metal oxide such as titanium dioxide is preferably between 0.01 and 1.00 mass % of alumina hydrate because a high optical density can be obtained when the content ratio is found within the above range. More preferably, the metal oxide content ratio is between 0.13 and 1.00 mass %. The use of such alumina hydrate will provide a high adsorption rate for the coloring material so that blurs and beading can hardly occur. Additionally, the valence of titanium of titanium dioxide to be used for the purpose of invention needs to be +4. The content ratio of titanium dioxide can be found by dissolving alumina hydrate in boric acid and using the ICP method. The distribution of titanium dioxide in alumina hydrate and the valence of titanium can be using the ESCA analysis method.

For instance, the change in the titanium content can be examined by etching the surface of alumina hydrate by means of argon ions for 100 seconds and 500 seconds. If the valence of titanium becomes less than +4, titanium dioxide operates as catalyst to reduce the weather resistance of the obtained recorded matter and yellow the recorded section.

Alumina hydrate to be used for the purpose of the invention may contain titanium dioxide only at and near the surface. Alternatively, it may contain titanium dioxide deep in the inside. The content ratio may vary from the surface to the inside. The electric characteristics of alumina hydrate are advantageously maintained if titanium dioxide is contained only at and hear the surface of alumina hydrate.

Alumina hydrate containing titanium dioxide can be prepared by using the method of hydrolyzing a mixed solution of aluminum alkoxide and titanium alkoxide as described in "Surface Science", Gakkai Publication Center, p. 327, (ed. K. Tamaru, 1985). A method of adding alumina hydrate as cores of crystal growth when hydrolyzing a mixed solution of aluminum alkoxide and titanium alkoxide may also be used.

Titanium dioxide contained in alumina hydrate may be replaced by oxide of silica, magnesium, calcium, strontium, barium, zinc, boron, germanium, tin, lead, zirconium, indium, phosphor, vanadium, niobium, tantalum, chromium, molybdenum, tungsten, manganese, iron, cobalt, nickel or ruthenium. For example, alumina hydrate containing silica provides an effect of improving the rub-off resistance of recorded sections.

Alumina hydrate whose spacing of (020) planes is found within a range between 0.614 nm and 0.626 nm is suitably be used for preparing a liquid composition according to the invention. Alumina hydrate shows a good dispersion stability in the liquid composition and the obtained liquid composition shows a good storage stability and a good ejection stability if the spacing is found within the above defined range. While the reasons for this are not clear, the inventors of the present invention presumes that, when the spacing of (020) planes is found within the above range, the quantitative ratio of hydrophobicity and hydrophilicity of alumina hydrate is found within an appropriate range so that consequently a good dispersion stability is obtained as a result of appropriate repulsion of particles in the liquid composition and a good ejection stability is achieved for the liquid composition because it wets the inside of the ejection orifices in an well balanced manner.

Alumina hydrate whose crystal thickness of (020) planes is found within a range between 4.0 and 10.0 nm is suitably be used for preparing a liquid composition according to the invention. Alumina hydrate shows a good transparency and a good adsorbability relative to the coloring material when the crystal thickness is found within the above defined range. According to the findings of the inventors of the present invention, the spacing of (020) planes and the crystal thickness of (020) planes are correlated and hence it is possible to regulate the crystal thickness of (020) planes so as to be within a range between 4.0 and 10.0 nm if the spacing of (020) planes is found within the above defined range.

Alumina (aluminum oxide) that is prepared by heat treating alumina hydrate, metal aluminum or aluminum salt typically by means of calcination can also suitably be used for the purpose of the invention because it is positively charged. Alumina crystal may be α-type, γ-type, δ-type, χ-type, η-type, ρ-type or β-type. Alumina of any crystal type may be used for the purpose of the invention so long as it is dispersed stably in water, maintaining cationicity on the surface. Particularly, alumina of γ crystal type can suitably be used because it is active at the surface and adapted to produce relatively fine well dispersed fine particles on a stable basis and shows a strong adsorptive power relative to the coloring material. Additionally, it is excellent in terms of coloring effect, storage stability and ejection stability.

Cationic fine particles to be used for the purpose of the present invention preferably have an average particle diameter between 0.005 and 1 $\mu$m as determined by a dynamic light scattering method from the viewpoint of coloring effect after recording, color uniformity and storage stability. When the average particle diameter is found within the above defined range, excessive penetration into the inside of the recording medium can be prevented to suppress reduction of the coloring effect and the color uniformity. Additionally, precipitation of cationic fine particles in the liquid medium is also suppressed to effectively prevent degradation of storage stability of the liquid composition. More preferably, the average particle diameter is found within a range between 0.01 and 0.8 $\mu$m. The rub-off resistance and the texture of the image recorded on the recording medium will be particularly preferable when such fine particles are used. Most preferably, the average particle diameter is found within a range between 0.03 and 0.3 $\mu$m. The use of such fine particles is advantageous because pores can be formed with a radius found within an intended range easily and effectively in the aggregates of fine particles that are formed on the recording medium.

(Physical Properties and Profile of Pores of Cationic Fine Particles)

Cationic fine particles to be used for the purpose of the present invention preferably have pores formed by the nitrogen adsorption/desorption method with a maximum pore radius between 2 nm and 12 nm and an overall pore volume of not less than 0.3 ml/g so that pores may be formed effectively and efficiently in the aggregates of fine particles that are produced on the recording medium and the fine particles may adsorb the coloring material effectively and efficiently to the surfaces thereof. More preferably, cationic fine particles have pores with a maximum pore radius between 3 nm and 10 nm and an overall pore volume of not less than 0.3 ml/g so that pores may be formed with a radius found within an intended range easily and effectively in the aggregates of such fine particles that are formed on the recording medium.

For the purpose of the present invention, when the BET specific surface area of cationic fine particles is found within a range between 70 and 300 $m^2/g$, the surfaces of fine particles have a sufficient number of adsorption point for adsorbing the coloring material so that the multi-color may be effectively left on and near the surface of the recording medium in a monomolecular state and operate for improving the coloring effect. When the BET specific surface area of cationic fine particles is found within a range between 100 and 250 $m^2/g$, it is possible to limit the specific surface area of fine particles to a range good for the purpose of the present invention so that bleeding can be suppressed along the color boundaries. Then, it is possible to obtain with ease a liquid composition in which aggregates of fine particles are easily formed to improve the quality of the recorded characters. More preferably, the BET specific surface area of cationic fine particles is found within a range between 130 and 200 $m^2/g$. Then, it is possible to provide a liquid composition according to the invention whose reactivity with the coloring material is highly well balanced and the images obtained by using such a liquid composition is freer from bleeding and stripes to further improve the quality of recorded characters. Furthermore, aggregates of fine particles are formed with appropriate pores to improve the coloring property of the coloring material to a great advantage of the use of a liquid composition according to the invention.

The profile of fine particles to be used for the purpose of the invention can be determined by preparing a specimen for observation by dispersing fine particles into ion-exchange water and dropping the water onto collodion film and observing the specimen through a transmission type electron microscope. For the purpose of the present invention, as pores are formed in aggregates of fine particles when the latter is produced on the recording medium, fine particles preferably have a needle-like or flat plate-shaped profile or a rod-shaped or necklace-like non-spherical profile that is produced when spherical primary particles are linked in a given direction.

According to the findings of the inventors of the present invention, fine particles having a flat plate-shaped profile are dispersed well in water if compared with those having a needle-like profile or a hair bundle-like profile because, when aggregates are formed from them, fine particles are oriented randomly to raise the pore volume of the aggregates. Therefore, the use of fine particles having such a profile is preferable. The expression of hair bundle-like profile as used herein refers to a state where needle-like fine particles are held in contact with each other along the lateral surfaces thereof to become like hair bundles. Particularly, it is well known that pseudobeohmite that is preferably used as alumina hydrate for the purpose of the invention shows a ciliary profile or some other profile as described in the above cited document (Rocek J., et al., Applied Catalysis, Vol. 74, pp. 29–36, 1991).

The aspect ratio of flat plate-shaped particles can be determined by using the method defined in Japanese Patent Application Laid-Open No. 5-16015. The aspect ratio is the ratio of the thickness to the diameter of each particle. The diameter as used herein refers to the diameter of a circle whose area is equal to the projected area of a particle of alumina hydrate as observed through a microscope or an electron microscope. The slenderness ratio is expressed in terms of the ratio of the diameter representing the minimum value of the flat plate surface area to the diameter representing the maximum value of the flat plate surface area as determined through microscopic observation as in the case of the aspect ratio. In the case of hair bundle-like profile, the aspect ratio is determined by assuming each needle-like particles alumina hydrate of a hair bundle as a circular cylinder, measuring the diameter of the top circuit, that of the bottom circuit and the length and determining the ratio thereof. Most preferably, alumina hydrate having a flat plate-shaped profile shows an average aspect ratio found within a range between 3 and 10, whereas alumina hydrate having a hair bundle-like profile shows an average aspect ratio found within a range between 3 and 10. When the average aspect ratio is found within the above defined range, a porous structure can be formed with ease with producing aggregates of fine particles because gaps can be easily formed among particles.

While an optimally appropriate range may be determined for the content of cationic fine particles in a liquid composition according to the invention depending on the type of substance to be used, a suitable range on the mass basis is between 0.1 and 40%, more preferably between 1 and 30%, most preferably between 3 and 15%. An image showing an excellent coloring property can be obtained on a stable basis and the liquid composition particularly shows both a good storage stability and a good ejection stability when the content of cationic fine particles is within such a range.

(Acid)

As pointed out earlier, a liquid composition according to the invention preferably contains acid and the pH of the liquid composition is regulated to between 2 and 7. The acid contained in the liquid composition as the second ingredient plays a role of improving the dispersion stability of fine particles in the liquid and also the adsorbability of fine particles relative to the anionic compound (anionic coloring material) in ink and regulating the viscosity of the liquid composition by ionizing the surfaces of cationic fine particles and raising the surface potential thereof. No particular limitation is imposed to acid that is suitably used for the purpose of the invention provided that it is combined with cationic fine particles to provide desired physical properties in terms of pH level, zeta potential and dispersibility of fine particles. It may be freely selected from the inorganic acids and the organic acids listed below.

Specific examples of inorganic acids that can be used for the purpose of the invention include hydrochloric acid, sulfuric acid, sulfurous acid, nitric acid, nitrous acid, phosphoric acid, boric acid and carbonic acid. Specific examples of organic acids that can be used for the purpose of the invention include carbonic acids, sulfonic acids and amino acids as listed below.

Specific examples of carbonic acids that can be used for the purpose of the invention include formic acid, acetic acid, chloroacetic acid, dichloroacetic acid, trichloroacetic acid, fluoric acid, trimethylacetic acid, methoxyacetic acid, mercaptoacetic acid, glycolic acid, propionic acid butylic acid, valeric acid, caproic acid, caprylic acid, lauric acid, myristic acid, palmitic acid, stearic acid, oleic acid, linolic acid, linolenic acid, cyclohexanecarbonic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, malonic acid, succinic acid, glutaric acid, adipic acid, tartaric acid, maleic acid, fumaric acid, citric acid, phthalic acid, isophthalic acid, terephthalic acid, salicylic acid, p-hydroxybenzoic acid, anthranilic acid, m-aminobenzoic acid, p-aminobenzoic acid, o-methoxybenzoic acid, m-methoxybenzoic acid and p-methoxybenzoic acid.

Specific examples of sulfonic acids that can be used for the purpose of the invention include benzenesulfonic acid, methylbenzenesulfonic acid, ethylbenzenesulfonic acid, dodecylbezenesulfonic acid, 2,4,6-trimethylbenzenesulfonic acid, 2,4-dimethylbenzenesulfonic acid, 2-sufosalicylic acid, 1-sulfonaphthalene, 2-sulfonaphthalene, hexasulfonic acid, octanesulfonic acid and dodecanesulfonic acid.

Specific examples of amino acids that can be used for the purpose of the invention include glycine, alanine, valine, α-aminobutyric acid, γ-aminobutyric acid, taurine, serine, ε-amino-n-caproic acid, leucine, norleucine and phenylalanine.

One or a mixture of two or more than two of such acids may be used for a liquid composition according to the invention. The use of acids whose primary dissociation constant pka in water is not more than 5 are particularly advantageous in terms of dispersion stability of cationic fine particles and adsobability of anionic compounds. Examples of such acids include hydrochloric acid, nitric acid, sulfuric acid, phosphoric acid, formic acid, oxalic acid, citric acid, maleic acid and malonic acid.

For a liquid composition according to the invention, the mixing ratio of cationic fine particles (A) to acid (B) in the liquid medium is made to be found preferably within a range between A:B=200:1 and 5:1 on the mass basis, more preferably within a range between 150:1 and 8:1 in order to improve the dispersion stability of cationic fine particles and the adsorbability of the surface of fine particles relative to the anionic compound.

(Other Ingredients)

Other ingredients of a cationic liquid composition according to the invention will be described specifically below. A liquid composition according to the invention contains cationic fine particles as indispensable ingredient preferably along with one or more than one acids as described above and water that operates as liquid medium. It may additionally contain a water-soluble organic solvent as liquid medium along with other additives.

Examples of water-soluble solvents that can be used for the purpose of the invention include amides such as dimethylformamide and dimethylacetoamide, ketones such as acetone, ethers such as tetrahydrofuran and dioxane, polyaklyleneglycols such as polyethyleneglycol and polypropyleneglycol, alkyleneglycols such as ethyleneglycol, propyleneglycol, butyleneglycol, triethyleneglycol, 1,2,6-hexanetriol, thiodiglycol, hexyleneglycol and diethyleneglycol, lower alkylethers of polyhydric alcohols such as ethyleneglycolmethylether, diethyleneglycolmonomethylether and triethyleneglycolmonomethylether and monohydric alcohols such as ethanol, isopropyl alcohol, n-butyl alcohol and isobutyl alcohol as well as glycerol, N-methyl-2-pyrrolidone, 1,3-dimethyl-imidazolidinone, triethanolamine, sulfolane and dimethylsulfoxide. Examples of wetting agents that can be used as additive for the purpose of the invention include nitrogen-containing compounds such as urea, thiourea, ethyleneurea, alkylurea, alkylthiourea, dialkylurea and dialkylthiourea. While the content of the water-soluble organic solvent and that of the wetting agent are not subjected to particular limitations, they are preferably within a range between 5 and 60%, more preferably within a range between 5 and 40%, of the total mass of the liquid composition.

If necessary, one or more than one additives selected from viscosity regulating agents, pH regulating agents, preservatives, various surfactants, antioxidants, evaporation accelerators, water-soluble cationic compounds and binder resin may be added appropriately to a liquid composition according to the invention. The selection of a surfactant is particularly important from the viewpoint of regulating the permeability of the liquid composition relative to the recording medium.

Examples of surfactants that can be used for the purpose of the invention include primary, secondary and tertiary amine salt type compounds such hydrochlorides and acetates of lauryl amine, coconut amine, stearil amine and rosin amine, quarternary ammonium salt type compounds such as laurylmethylammoniumchloride, cetyltrimethylamoniumchloride, benziltributylammoniumchloride and benzailconiumchloride, pyridinium salt type compounds such as cetylpyridiniumchloride and cetylpyridiniumbromide, imidazoline type cationic compounds such as 2-heptadecenylhydroxyethylimidazoline and ethyleneoxide adducts of higher alkylamines such as cationic surfactants of dihydroxyethylsteraril amine. Additionally, amphoteric surfactants that become cationic in a certain pH range such as amino acid type amphoteric surfactants, R—NH—$CH_2$—$CH_2$—COOH type compounds and carbonic acid type amphoteric surfactants such as betaine type compounds including stearyldimethylbetaine, lauryldihydroxyethylbetaine as well as sulfate type, sulfonic acid type and phosphate type amphoteric surfactants. Examples of nonionic surfactants that can be used for the purpose of the invention include polyoxyethylenealkylethers, polyoxyethyleneaklylesters, acetylene alcohols and acetylene glycols. One or a combination of two or more than two different type of surfactants may be used for the purpose of the invention. Of the above listed compounds, acetylene alcohols and acetylene glycols are preferably be used for the purpose of the invention because any of the surfactants can improve the permeability of the liquid composition relative to plain paper and, at the same time, suppress foaming of the liquid composition. If the liquid composition foams, any of the surfactants can quickly defoam it.

While the rate at which the surfactant is added may vary depending on the type of surfactant, it is preferably be used at a rate between 0.05 to 5 mass % relative to the total amount of ink to provide ink with a sufficient degree of permeability.

One or more than one water-soluble cationic compounds may be added for the purpose of providing the liquid composition with additional cationicity to such an extent that they may not interfere with the effect of the present invention.

Binder resin may be added to improve the rub-off resistance of cationic fine particles to such an extent that it may not damage the texture of the recording medium and the storage stability and the ejection stability of the liquid composition. Examples of binder resin that can be used for the purpose of the invention include water-soluble polymers such as polyvinylalcohol, gelatin, polyvinylpyrroridone, polyethyleneoxide, casein, starch as well as carboxymethylcellulose, polyacrylic acid, polyurethane, polyvinylacetate, emulsions of copolymers of any of them and latex such as SBR and NBR.

(Surface Tension of Liquid Composition)

While a liquid composition according to the invention is preferably colorless or white, it may be made to bear a color that matches the color of the recording medium. Some of the physical properties that is desirable for a liquid composition according to the invention include the surface tension that is preferably found within a range between 10 and 60 mN/m (dyn/cm), more preferably between 10 and 40 mN/m (dyn/cm) and the viscosity that is preferably found within a range between 1 and 30 mPa·s (cP).

[Anionic Liquid Composition]

Now, an anionic liquid composition according to the invention will be described below. An anionic liquid composition according to the invention contains fine particles having an anionic group on the surface thereof as an indispensable ingredient and the fine particles are stably dispersed in the liquid composition. Preferably, an anionic liquid composition according to the invention further contains base, while its pH is regulated to be within a range between 7 and 12 and its zeta potential is within a range between −5 and −90 mV.

(pH and Zeta Potential)

As a result of intensive research efforts, it was found that, when the zeta potential of the liquid composition is within a range between −5 and −90 mV, the cationic compound (e. g., the cationic coloring material) contained in ink is particularly efficiently adsorbed to the surfaces of anionic fine particles to reveal its excellent coloring property on the recording medium. While the reason for this is not clear, probably because the anionic property of fine particles is appropriate and hence the cationic compound of ink does not aggregate rapidly, the cationic compound is adsorbed to the surfaces of fine particles uniformly and thinly so that the coloring material can hardly form a huge colony of lake and, as a result, the coloring material properly exerts its coloring effect as in the case of a cationic liquid composition described above. Additionally, in the case of an anionic liquid composition according to the invention, anionic fine particles of the liquid composition are presumably held in an unstably dispersed state after adsorbing the cationic compound to the surfaces thereof so that they aggregate as a result of the change of concentration when the solvent permeates on the recording medium and become apt to remain on and near the surface of the recording medium.

Thus, the excellent effects of using a liquid composition according to the invention as listed below can be obtained for the above identified reasons. Namely, as a result of using a liquid composition according to the invention, even plain paper provides a coloring effect as high as that of coat paper to be used for ink-jet recording and the produced image is excellent in terms of color uniformity and free from white haze and color unevenness in areas where ink is applied to a large extent such as shaded areas and solid areas. Additionally, an excellent image that shows a good rub-off resistance in recorded areas can be obtained without damaging the texture of the base paper particularly when plain paper is used because, if compared with coat paper, it is not necessary to apply anionic fine particles to a large extent in order to make the cationic compound (cationic coloring material) of ink to become adsorbed to the surfaces of fine particles and efficiently exerts its proper coloring effect. Particularly, when a liquid composition containing anionic fine particles whose zeta potential is found within a range between −10 and −85 mV is used, the boundaries of dots of a solidly recorded image are hardly noticeable and the obtained image is excellent and practically free from striped areas that can be produced as a result of the scanning operation of the ink-jet head. Most preferably, the zeta potential is within a range of from −15 to −65 mV. Then, it is possible to obtain an image showing an excellent coloring effect regardless of the type of paper used for the recording medium.

It is preferable that an anionic liquid composition according to the invention shows a pH value between 7 and 12 at or about 25° C. from the viewpoint of storage stability and the effect of adsorbing cationic compounds. Such a liquid composition does not cause any cationic compound to strongly aggregate and hence can prevent the degree of color saturation of the recorded image from falling to make the image a dull one because it does not remarkably reduce the stability of the cationic compound if it is mixed with cationic ink. Additionally, anionic fine particles keep a well dispersed state if the pH value is found within the above identified range so that the storage stability of the liquid composition can be maintained and the liquid composition can be stably ejected from the recording head. Furthermore, when the liquid composition is mixed with ink, the cationic substance of ink is sufficiently adsorbed to the surfaces of anionic fine particles so that the coloring material of ink is prevented from penetrating excessively into the inside of the recording medium and the recorded matter obtained by ink-jet recording shows an excellent coloring effect. More preferably, the pH value is between 8 and 11. If the pH value is within this range, the recording head can be protected against corrosion very effectively if it is stored for a long period of time and the rub-off resistance of the recorded area is further improved.

(Anionic Fine Particles)

Then, the anionic liquid composition of the present invention will be described. It is preferable for the anionic fine particles to have anionic surface when they are dispersed in the liquid composition. Because of the anionic surface, cationic colorants in the cationic ink are adsorbed quickly on the surface of the anionic fine particles when the liquid composition and the cationic ink are mixed, and the quick adsorption prevents the colorants from permeating into the recording medium excessively. Thus, ink-jet recorded product having sufficient optical density can be obtained. On the contrary, in case that the fine particle do not have anionic surface, and the anionic liquid composition contains water-soluble anionic compound other than the fine particles, the water-soluble anionic compound has the cationic colorants in the cationic ink agglomerated, and such an agglomeration may worsen the coloring properties of the colorants, thus, it is considered to be difficult to obtain ink-jet recorded product having the same quality as that produced on a recording medium specially prepared for ink-jet, i. e. a recording medium having an ink-jet ink receiving layer. While the fine, particles contained in a liquid composition according to the invention need to have an anionically charged surface, not only fine particles that are intrinsically anionic but also those that are electrostatically cationic or neutral but whose surfaces are processed to become anionic may suitably be used as an ingredient of a liquid composition according to the invention.

Any anionic fine particles that form aggregates having pores on the recording medium and showing a specific surface area found within a given range can suitably be used to achieve the objectives of the present invention. There are no restrictions to the type of fine particles to be used for the purpose of the invention. Specific examples of anionic fine particles that can be used for the purpose of the invention include silica, titania, zirconia, boria, silica boria, ceria, magnesia, silica magnesia, calcium carbonate, magnesium carbonate, zinc oxide, composite fine particles of any of these, organic fine particles and inorganic/organic compound fine particles that are processed to become anionic. Any of them may be used solely or in the form of a combination of two or more than two in a liquid composition according to the invention.

As in the above described case of cationic fine particles, anionic fine particles to be used for the purpose of the present invention preferably have an average particle diameter between 0.005 and 1 μm as determined by a dynamic light scattering method from the viewpoint of coloring effect after recording, color uniformity and storage stability. More preferably, the average particle diameter is found within a range between 0.01 and 0.8 μm. The rub-off resistance and the texture of the image recorded on the recording medium will be particularly preferable when such fine particles are used. Most preferably, the average particle diameter is found within a range between 0.03 and 0.3 μm. The use of such fine particles is advantageous because pores can be formed with a radius found within an intended range easily and effectively in the aggregates of fine particles that are formed on the recording medium.

(Physical Properties and Profile of Pores of Anionic Fine Particles)

Anionic fine particles to be used for the purpose of the present invention preferably have pores formed by the nitrogen adsorption/desorption method with a maximum pore radius between 2 nm and 12 nm and an overall pore volume of not less than 0.3 ml/g so that pores may be formed effectively and efficiently in the aggregates of fine particles that are produced on the recording medium and the fine particles may adsorb the coloring material effectively and efficiently to the surfaces thereof. More preferably, cationic fine particles have pores with a maximum pore radius between 3 nm and 10 nm and an overall pore volume of not less than 0.3 ml/g so that pores may be formed with a radius found within an intended range easily and effectively in the aggregates of such fine particles that are formed on the recording medium.

For the purpose of the present invention, when the BET specific surface area of fine particles is found within a range between 70 and 300 m$^2$/g, the surfaces of fine particles have a sufficient number of adsorption point for adsorbing the coloring material so that the multi-color may be effectively left on and near the surface of the recording medium in a monomolecular state and operate for improving the coloring effect. When the BET specific surface area of cationic fine particles is found within a range between 100 and 250 m$^2$/g, it is possible to limit the specific surface area of fine particles to a range good for the purpose of the present invention so that bleeding can be suppressed along the color boundaries. Then, it is possible to obtain with ease a liquid composition in which aggregates of fine particles are easily formed to improve the quality of the recorded characters. More preferably, the BET specific surface area of cationic fine particles is found within a range between 130 and 200 m$^2$/g. Then, it is possible to provide a liquid composition according to the invention whose reactivity with the coloring material is highly well balanced and thus, bleeding and stripes in the obtained images are largely alleviated, and further improvement in the quality of recorded characters can be seen. Furthermore, aggregates of fine particles are formed with appropriate pores to improve the coloring property of the coloring material to a great advantage of the use of a liquid composition according to the invention.

The profile of fine particles to be used for the purpose of the invention can be determined by preparing a specimen for observation by dispersing fine particles into ion-exchange water and dropping the water onto collodion film and observing the specimen through a transmission type electron microscope. For the purpose of the present invention, as pores are formed in aggregates of fine particles when the latter is produced on the recording medium, fine particles preferably have a needle-like or flat plate-shaped profile or a rod-shaped or necklace-like non-spherical profile that is produced when spherical primary particles are linked in a given direction. According to the findings of the inventors of the present invention, fine particles having a flat plate-shaped profile are dispersed well in water if compared with those having a needle-like profile or a hair bundle-like profile because, when aggregates are formed from them, fine particles are oriented randomly to raise the pore volume of the aggregates.

While an optimally appropriate range may be determined for the content of anionic fine particles in a liquid composition according to the invention depending on the type of substance to be used, a suitable range on the mass basis is between 0.1 and 40%, more preferably between 1 and 30%, most preferably between 3 and 15%. An image showing an excellent coloring property can be obtained on a stable basis and the liquid composition particularly shows both a good storage stability and a good ejection stability when the content of cationic fine particles is within such a range.

(Base)

As pointed out earlier, an anionic liquid composition according to the invention preferably contains base and the pH of the liquid composition is regulated to between 7 and 12. The base contained in the liquid composition as the second ingredient plays a role of improving the dispersion stability of fine particles in the liquid and also the adsorbability of fine particles relative to the cationic compound (cationic coloring material) in ink and regulating the viscosity of the liquid composition by ionizing the surfaces of anionic fine particles and raising the surface potential thereof. No particular limitation is imposed to base that is suitably used for the purpose of the invention provided that it is combined with anionic fine particles to provide desired physical properties in terms of pH level, zeta potential and dispersibility of fine particles. It may be freely selected from the inorganic compounds and the organic compounds listed below.

Specific examples of compounds that can be used for the purpose of the invention include sodium hydroxide, lithium hydroxide, sodium carbonate, ammonium carbonate, ammonia, sodium acetate, ammonium acetate, morpholine and alkanolamines such as monoethanolamine, diethanolamine, triethanolamine, ethylmonoethanolamine, normalbutylmonoethanolamine, dimethylethanolamine, diethylethanolamine, ethyldiethanolamine, normalbutyldiethanolamine, dinormalbutylethanolamine, monoisopropanolamine, diisopropanolamine and triisopropanolamine, of which those whose primary dissociation constant pkb in water is not more than 5 may particularly advantageously be used from the viewpoint of dispersion stability of anionic fine particles and adsobability of cationic compounds (cationic coloring material).

For a liquid composition according to the invention, the mixing ratio of anionic fine particles (A) to base (B) in the liquid medium is made to be found preferably within a range between A:B=200:1 and 5:1 on the mass basis, more preferably within a range between 150:1 and 8:1 in order to improve the dispersion stability of anionic fine particles and the adsorbability of the surface of fine particles relative to the cationic compound.

(Other Ingredients)

Other ingredients of an anionic liquid composition according to the invention will be described specifically below. A liquid composition according to the invention contains anionic fine particles as indispensable ingredient preferably along with one or more than one bases as described above and also water that operates as liquid medium. It may additionally contain a water-soluble organic solvent and one or more than one other additives selected from viscosity regulating agents, pH regulating agents, preservatives, various surfactants, antioxidants, evaporation accelerators, water-soluble cationic compounds and binder resin may be added appropriately to a liquid composition according to the invention.

Examples of surfactants that can be used for the purpose of the invention include salts of fatty acids, sulfates of higher alcohols, sulfates of fatty oils, anionic surfactants such as alkylarylsulfonates and nonionic surfactants such as polyoxyethylenealkylethers, polyoxyethylenealkylesters, polyoxyethylenesorbitanalkylesters, acetylene alcohols, acetylene glycols. One or a combination of two or more than two different type of surfactants may be used for the purpose of the invention. Of the above listed compounds, acetylene alcohols and acetylene glycols are preferably be used for the purpose of the invention because any of the surfactants can improve the permeability of the liquid composition relative to plain paper and, at the same time, suppress foaming of the liquid composition. If the liquid composition foams, any of the surfactants can quickly defoam it. While the rate at which surfactant is added may vary depending on the type of surfactant, it is preferably be used at a rate between 0.05 to 5 mass % relative to the total amount of ink to provide ink with a sufficient degree of permeability.

(Surface Tension of Liquid Composition)

While an anionic liquid composition according to the invention is preferably colorless or white, it may be made to bear a color that matches the color of the recording medium. Some of the physical properties that is desirable for a liquid composition according to the invention include the surface tension that is preferably found within a range between 10 and 60 mN/m (dyn/cm), more preferably between 10 and 40 mN/m (dyn/cm) and the viscosity that is preferably found within a range between 1 and 30 mPa·s (cP).

(Method of Dispersion Liquid Composition)

Any appropriate known popular method of dispersing fine particles may be used for dispersing fine particles in the process of preparing a liquid composition according to the invention and containing fine particles. However, a dispersion device adapted to slowly agitate liquid such as a homogenizing mixer or a rotary vane is more preferable than a crushing type dispersion device such as a ball mill or a sand mill. While the shearing stress may vary depending on the viscosity of liquid composition and the content or volume of fine particles contained therein, it is preferably found within a range between 0.1 and 100.0 N/m$^2$. More preferably, the shearing stress is found within a range between 0.1 and 20.0 N/m$^2$ so that the pore structure fine particles may be effectively prevented from being destroyed to reduce the pore volume.

While the duration of the dispersing operation may vary depending on the volume of the liquid dispersion medium, the size of the container and the temperature of the liquid dispersion medium, it is preferably less than 30 hours from the viewpoint of preventing the crystal structure of fine particles from being modified. More preferably, it is less than 10 hours so that the pore structure of fine particles may be controlled within the above defined range. The temperature of the liquid dispersion medium may be held within a predetermined range by cooling it or taking measures for retaining its temperature during the dispersing operation. The preferable temperature range is between 10 and 100° C., although it may vary depending on the dispersing method, the materials involved and the viscosity of the liquid composition.

<Aqueous Ink>

[Anionic Ink]

Now, the composition of aqueous anionic ink that is used in combination with a liquid composition according to the invention to form an ink set will be described. The expression of ink set as used herein refers to a combination of a cationic liquid composition according to the invention and described above and one or more than one different types of anionic ink containing an anionic substance (anionic coloring material). A combination of one or more than one different types of ink obtained by removing the liquid composition from an ink set is referred to as ink subset. Anionic ink to be used for the purpose of the invention preferably contains a water-soluble dye having an anionic group as coloring material. If a pigment is used as coloring material, it is preferably combined with an anionic compound (which is also referred to as anionic coloring material herein). If necessary, anionic ink to be used for the purpose of the invention further contains water, water-soluble organic solvent and other ingredients selected from viscosity regulating agents, pH regulating agents, preservatives, various surfactants, antioxidants and so on. Now, the ingredients of ink will be described below.

(Water-Soluble Dye)

Any acidic dyes, direct dyes and reactive dyes that are typically listed in the Color Index may be used for the purpose of the invention if such dyes are water-soluble dyes having an anionic group. Dyes that are not listed in the Color Index but have an anionic group such as sulfone group or carboxyl group may also be used without limitation for the purpose of the invention. Water-soluble dyes as used herein include those whose solubility depends on pH.

(Pigment)

Water-soluble dyes having an anionic group may be replaced by pigments and anionic compounds for aqueous anionic ink. Such anionic ink may also contain water, water-soluble organic solvent and other ingredients selected from viscosity regulating agents, pH regulating agents, preservatives, various surfactants, antioxidants and so on. The anionic compound may be a dispersion medium. If the dispersion medium of pigment is not anionic, another anionic compound may be added. It may be needless to say that an additional anionic compound can be used if the dispersion medium is an anionic compound.

While there is no limitation for pigments that may be used for the purpose of the present invention, preferable pigments will be described specifically below. Firstly, as for carbon black that is used for black pigment ink, carbon black produced by means of a furnace process or a channel process that shows a primary grain diameter between 15 and 40 $\mu$m, a specific surface area between 50 and 300 m$^2$/g as determined by the BET method, a DBP oil absorption rate between 40 and 150 ml/100 g, a volatile matter content between 0.5 and 10 mass % and a pH value between 2 and 9 is preferable.

Examples of such carbon black include No. 2300, No. 900, MCF88, No. 40, No. 52, MA7, MA8, No. 2200B (tradenames, available from Mitsubishi Chemical Corp.), RAVEN 1255 (tradename, available from Columbian) REGAL 400R, REGAL 660R, MOGUL L (tradename, available from Cabot), Color Black FW1, Color Black FW18, Color Black S170, Color Black S150, Printex 35 and Printex U (tradenames, available from Degussa), all of which are commercially available. Carbon black specifically prepared for the purpose of the invention may also be used.

Examples of pigment that can be used for yellow ink include C. I. Pigment Yellow 1, C. I. Pigment Yellow 2, C. I. Pigment Yellow 3, C. I. Pigment Yellow 13, C. I. Pigment Yellow 16 and C. I. Pigment Yellow 83, C. I. Pigment Yellow 74, C. I. Pigment Yellow 128, C. I. Pigment Yellow 134, C. I. Pigment Yellow 93, C. I. Pigment Yellow 144.

Examples of pigment that can be used for magenta ink include C. I. Pigment Red 5, C. I. Pigment Red 7, C. I. Pigment Red 12, C. I. Pigment Red 48 (Ca), C. I. Pigment Red 48 (Mn), C. I. Pigment Red 57 (Ca), C. I. Pigment Red 112 and C. I. Pigment Red 122, C. I. Pigment Violet 19.

Examples of pigment that can be use for cyan ink include C. I. Pigment Blue 1, C. I. Pigment Blue 2, C. I. Pigment Blue 3, C. I. Pigment Blue 15:3, C. I. Pigment Blue 16, C. I. Pigment Blue 22, C. I. Vat Blue 4 and C. I. Vat Blue 6.

Coloring materials specifically prepared for the purpose of the invention may also be used for any of the above colors.

(Pigment Dispersion Medium)

Any water-soluble resin having a function of stably dispersing pigments in water or in an aqueous medium in the presence of an anionic group may be used as pigment dispersion medium of ink to be used for the purpose of the invention. Particularly, such water-soluble resin preferably has a weight average molecular weight found within a range between 1,000 and 30,000. More preferably, such resin has a weight average molecular weight found within a range between 3,000 and 15,000. Specific examples of resin that can be used for the purpose of the invention include hydrophobic monomers such as styrene, styrene derivatives, vinylnaphthalene, vinylnaphthalene derivatives, and aliphatic alcohol esters of $\alpha,\beta$-ethylenic unsaturated carbonic acid, block copolymers, graft copolymers, random copolymers and salts thereof formed from two or more than two monomers selected from acrylic acid, acrylic acid derivatives, maleic acid, maleic acid derivatives, itaconic acid, itaconic acid derivatives, fumaric acid and fumaric acid derivatives. Such resins are alkali-soluble resins that can be dissolved into aqueous solution containing a base dissolved therein.

Resin to be used for the purpose of the invention may be selected from homopolymers and salts thereof formed from a hydrophilic monomer. Water-soluble resins such as polyvinyl alcohol, carboxymethylcellulose, naphthalenesulfonic acid/formaldehyde condensate and the like may also be used for the purpose of the invention. However, the use of alkali-soluble resin is advantageous because a low viscosity liquid dispersion medium can be used and the dispersoid can be dispersed with ease. Water-soluble resin is used within a range between 0.1 and 5 mass % relative to the total mass of the ink.

Pigment ink to be used for the purpose of the invention is prepared by dispersing or dissolving the selected pigment and the selected water-soluble resin into a water-soluble medium. The water-soluble medium to be used for preparing pigment type ink for the purpose of the invention is preferably a mixture medium of water and water-soluble organic solvent. Preferably, water is not ordinary water that contains various ions but ion exchange water (deionized water).

If the dispersion medium is not anionic polymer, it is preferable to further add an anionic compound to ink that contains a pigment. Anionic compounds that can be suitably used for the purpose of the invention include polymeric substances such as alkali-soluble resins described above under the heading of (pigment dispersion medium) as well as low molecular weight anionic surfactants listed below.

Specific examples of low molecular weight anionic surfactants that can be used for the purpose of the invention non-limtatively include lauryldisodium sulfosuccinate, polyoxyethylenelaurylethanolamideesterdisodium sulfosuccinate, disodiumpolyoxyethleneakyl sufosuccinate, carboxylated polyoxyethylenelaurylethersodium salt, carboxylated polyoxytheylenetridecilethersodium salt, polyoxyethylenelaurylether sodium sufate, polyoxyethylenelaurylether triethanolamine sulfate, polyoxyethylenealkylether sodium sulfate, alkyl sodium sulfate and alkyl triethanolamine sulfate. The anionic substance is used preferably within a range between 0.05 and 10 mass %, more preferably within a range between 0.05 and 5 mass % relative to the total mass of ink.

(Self-Dispersion Type Pigment)

Self-dispersion type pigments that can be dispersed into water or an aqueous medium without using any dispersion medium can also be used for anionic ink for the purpose of the invention. In a self-dispersion type pigment, at least a type of anionic hydrophilic group is bonded to the pigment surface directly or by way of some other atomic group. For the purpose of the invention, at least an anionic hydrophilic group is selected from the hydrophilic groups listed below, while the other atomic group may be an alkylene group, a phenylene group that may or may not have a substituent or a naphtylene group that may or may not have a substituent if the group has 1 to 12 carbon atoms.

—COOM, —SO$_3$M, —SO$_2$NH$_2$, —PO$_3$HM, —PO$_3$M$_2$ (where M represents hydrogen atom, alkali metal, ammonium or organic ammonium)

Since a pigment that is anionically charged by introducing a hydrophilic group to the surface thereof is dispersed in water very well because of repulsion of ions and hence it is stably held in a dispersed state in ink without using any dispersion medium when ink is made to contain it. Particularly, a pigment that is carbon black can suitably be used as self-dispersion type pigment.

(Additional Ingredients of Ink)

Beside the above ingredients, for ink to show desired physical properties, if necessary, one or more than one additives selected from surfactants, defoaming agents, preservatives and other agents may be added to ink. Furthermore, one or more than one commercially available dyes may be added.

Examples of surfactant that can be used for the purpose of the invention include anionic surfactants such as salts of aliphatic acids, sulfates of higher alcohols, sulfates of liquid fatty oils and alkylaryl sulfonates and nonionic surfactants such as polyoxyethylenealkylethers, polyoxyethyleneaklylesters, polyoxyethylenesorbitanalkylesters, acetylene alcohols and acetylene glycols. One or a combination of two or more than two different type of surfactants may be used for the purpose of the invention. Of the above listed compounds, acetylene alcohols and acetylene glycols are preferably be used for the purpose of the invention because any of the surfactants can improve the permeability of the liquid composition relative to plain paper and, at the same time, suppress foaming of the liquid composition. If the liquid composition foams, any of the surfactants can quickly defoam it. While the rate at which the surfactant is added may vary depending on the type of surfactant, it is preferably be used at a rate between 0.05 to 5 mass % relative to the total amount of ink to provide ink with a sufficient degree of permeability.

As pointed out above, of the above listed compounds, acetylene alcohols and acetylene glycols are preferably be used for the purpose of the invention because any of the surfactants can improve the permeability of the liquid composition relative to plain paper and, at the same time, suppress foaming of the liquid composition. If the liquid composition foams, any of the surfactants can quickly defoam it. The surface tension of ink at 25° C. is preferably not less than 10 mN/m (dyne/cm), more preferably not less than 20 mN/m, most preferably not less than 30 mN/m and not more than 70 mN/m. Thus, it is preferable that the rate of adding the surfactants is so determined that the surface tension of ink is found within the above range. If the surface tension is found within the above range, any displacement of printed dots (displacement of hitting points of ink droplets) and other problems that can be caused by a wet nozzle tip can be effectively avoided in any ink-jet recording system to be used for the purpose of the invention.

As described above, pigment type ink is prepared by firstly adding the selected pigment to an aqueous solution containing at least pigment dispersing resin and water, agitating the solution, subsequently dispersing the pigment by using a dispersion means as will be described hereinafter and, if necessary, conducting a centrifugal process to obtain a desired dispersion liquid. Thereafter, the remaining ingredients is added to the dispersion liquid and agitated to produce ink.

If alkali-soluble resin is used, it is necessary to add base for dissolving the resin. The amount of amine or base that is added to dissolve resin needs to be more than the amount of amine or base determined by calculation using the acid value of the resin. The amount of amine or base is determined by using the formula below.

amount of amine or base (g) = acid value of resin× molecular weight of amine or base × amount of resin (g)/5600

The pigment is dispersed efficiently when a premising operation is conducted before subjecting the aqueous solution containing the pigment to the dispersion process. Such a premixing operation improve the wetting property of the pigment surface and accelerate the adsorption of the dispersion medium to the pigment surface.

The base to be added to the dispersion liquid when alkali-soluble resin used is typically selected from organic amines such as monoethanolamine, diethanolamine, triethanolamine, amineethylpropanol and ammonia and inorganic bases such as potassium hydroxide and sodium hydroxide.

On the other hand, a dispersion machine of any popular type such as a ball mill or a sand mill may be used for preparing pigment ink for the purpose of the invention. Particularly, the use of a high speed sand mill is preferable. Examples of sand mill include Super Mill, Sand Grinder, Beads Mill, Agitator Mill, Glen Mill, Dino Mill, Pearl Mill and Cobol Mill (tradenames).

If necessary, one or more than one additives selected from water-soluble organic solvents, surfactants, pH regulating agents, preservatives, anti-rust agents, anti-mold agents, antioxidants, evaporation accelerators, chelating agents and water-soluble polymers may be added to ink to be used for the purpose of the invention.

The liquid medium for dissolving or dispersing the coloring material for the purpose of the invention is preferably a mixture of water and water-soluble organic solvent. Specific examples of water-soluble organic solvent include alkyl alcohols having 1 to 4 carbon atoms such as methyl alcohol, ethyl alcohol, n-propyl alcohol, isopropyl alcohol, n-butyl alcohol, sec-butyl alcohol, tert-butyl alcohol, amides such as dimethylformamide and dimethylacetoamide, ketones such as acetone, ethers such as tetrahydrofuran, ethers such as dioxane, polyalkkyleneglycols such as polyethyleneglycol and polypropyleneglycol, alkyleneglycols with an alkylene group having 2 to 6 carbon atoms such as ethyleneglycol, propyleneglycol, butyleneglycol, triethyleneglycol, 1,2,6-hexanetriol, thiodiglycol, hexyleneglycol and diethyleneglycol, lower alkylethers of polyhydric alcohols such as ethyleneglycolmethylether, diethyleneglycolmonomethylether and triethyleneglycolmonomethylether, cyclic amide compounds such as N-methyl-2-pyrrolidone, 1,3-dimethylimidazolidinone, triethanolamine, sulfolane, dimethylsulfoxide, 2-pyrrolidone, $\epsilon$-caprolactam and imide compounds such as succinimde.

The content of the water-soluble organic solvent is generally 1 to 40 mass %, preferably 3 to 30 mass % relative to the total mass of ink. The coloring material dissolves well and the viscosity of ink is prevented from rising too high, while the fixing property of ink is satisfactory when the water content of ink is found within a range between 30 and 95 mass relative to the total mass of ink.

While anionic ink to be used for the purpose of the present invention can be used for ordinary aqueous ink pens and other writing tools, it is most suitably be used with ink-jet recording methods of ejecting ink by utilizing the foaming phenomenon of ink that can be made to occur by applying thermal energy. The use of such anionic ink stabilizes the ink ejecting operation and does not give rise to any satellite dots and other problems. Physical properties that relate to heat (e.g., specific heat, thermal expansion coefficient, thermal conductivity) of ink need to be regulated if such ink is used.

[Cationic Ink]

Now, the composition of aqueous cationic ink that is used in combination with a liquid composition according to the invention to form an ink set will be described. The expression of ink set as used herein refers to a combination of a liquid composition according to the invention and described above and one or more than one different types of cationic ink containing a cationic substance (cationic coloring material). A combination of one or more than one different types of ink obtained by removing the liquid composition from an ink set is referred to as ink subset. Cationic ink to be used for the purpose of the invention preferably contains a water-soluble dye having a cationic group as coloring material. If a pigment is used as coloring material, it is preferably combined with a cationic compound (which is also referred to as cationic coloring material herein). If necessary, cationic ink to be used for the purpose of the invention further contains water, water-soluble organic solvent and other ingredients selected from viscosity regulating agents, pH regulating agents, preservatives, various surfactants, antioxidants and so on. Now, the ingredients of ink will be described below.

(Water-Soluble Dye)

Any dyes that are typically listed in the Color Index may be used for the purpose of the invention if such dyes are water-soluble dyes having a cationic group. Dyes that are not listed in the Color Index but have a cationic group may also be used without limitation for the purpose of the invention. Water-soluble dyes as used herein include those whose solubility depends on pH.

(Pigment)

Water-soluble dyes having a cationic group may be replaced by pigments and cationic compounds for aqueous cationic ink. Such cationic ink may also contain water, water-soluble organic solvent and other ingredients selected from viscosity regulating agents, pH regulating agents, preservatives, various surfactants, antioxidants and so on. The cationic compound may be a dispersion medium. If the dispersion medium of pigment is not cationic, another cationic compound may be added. It may be needless to say that an additional cationic compound can be used if the dispersion medium is a cationic compound. There is no limitation for pigments that may be used for the purpose of the present invention and any of the pigments listed above under the heading of (anionic ink) may suitably be used.

(Pigment Dispersion Medium)

Any water-soluble resin having a function of stably dispersing pigments in water or in an aqueous medium in the presence of a cationic group may be used as pigment dispersion medium of ink to be used for the purpose of the invention. For example, those that can be obtained by polymerization of a vinyl monomer can be used for the purpose of the invention if at least part of the obtained polymer is cationic. Cationic monomers that can be used for the cationic part of polymer include salts of tertiary amine monomers that may or may not be turned into quaternary amine monomers. Some such compounds are listed below;

N,N-dimethylaminoethylmethacrylate [$CH_2=C(CH_3)-COO-C_2H_4N(CH_3)_2$],

N,N-dimethylaminoethylacrylate [$CH_2=CH-COO-C_2H_4N(CH_3)_2$],

N,N-dimethylaminopropylmethacrylate [$CH_2=C(CH_3)-COO-C_3H_6N(CH_3)_2$],

N,N-dimethylaminopropylacrylate [$CH_2=CH-COO-C_3H_6N(CH_3)_2$],

N,N-dimethylacrylamide [$CH_2=CH-CON(CH_3)_2$],

N,N-dimethylmethacrylamide [$CH_2=C(CH_3)-CON(CH_3)_2$],

N,N-dimethylaminoethylacrylamide [$CH_2=CH-CONHC_2H_4N(CH_3)_2$],

N,N-dimethylaminoethylmethacrylamide [$CH_2=C(CH_3)-CONHC_2H_4N(CH_3)_2$],

N,N-dimethylaminopropylacrylamide [$CH_2=CH-CONH-C_3H_6N(CH_3)_2$] and

N,N-dimethylaminopropylmethacrylamide [$CH_2=C(CH_3)-CONH-C_3H_6N(CH_3)_2$].

In the case of tertiary amines, compounds that can be used for forming salts include hydrochloric acid, sulfuric acid and acetic acid. Compounds that can be used for turning tertiary amines into quaternary amines include methyl chloride, dimethyl sulfate, benzyl chloride and epichlorohydrin, of which methyl chloride and dimethyl sulfate are preferably used for preparing a dispersion medium for the purpose of the invention. Salts of tertiary amines and quaternary ammonium compounds as listed above behave as cations in water and are stably dissolved in an acidic condition if they are neutralized. The content of such a monomer in a copolymer is preferably found within a range between 20 and 60 mass %.

Other monomers that can be used for forming a polymeric dispersion medium include 2-hydroxyethylmethacrylate, acrylates having a hydroxyl group such as those having a long ethylene oxide chain as side chain, hydrophobic monomers such as styrene type monomers, water-soluble monomers that can be dissolved into water with a pH value of about 7 such as acrylamides, vinylethers, vinylpyrrolidones, vinylpyridines and vinyloxazolines. Hydrophobic monomers that can be used for forming a polymeric dispersion medium include styrene, styrene derivatives, vinylnaphthalene, vinylnaphthal5ene derivatives, alkyl (meth)acrylates and acrylonitrils. The content of the water-soluble monomer in a polymeric dispersion medium obtained by copolymerization is preferably between 15 and 35 mass % from the viewpoint of making the copolymer to exist stably in an aqueous solution. The content of the hydrophobic monomer is preferably between 20 and 40 mass % from the viewpoint of enhance the dispersion effect of the copolymer relative to the pigment.

(Self-Dispersion Type Pigment)

In the case of a pigment that is cationically charged, the hydrophilic group bonded to it directly or by way of some other atomic group is preferably but non-limitatively also bonded to at least one of the quaternary ammonium groups listed below;

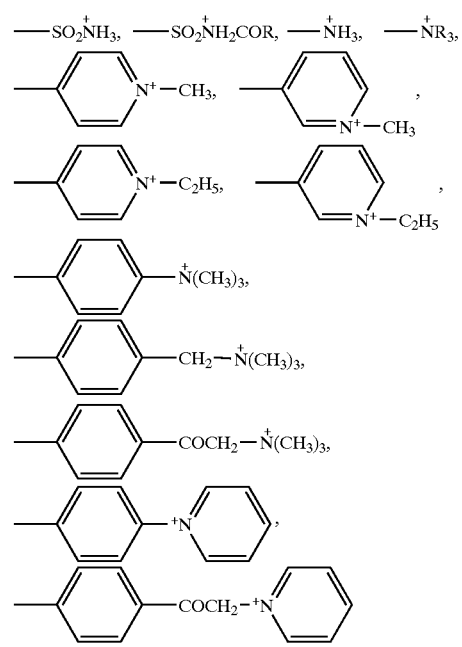

where R represents a straight chain or branched chain alkyl group having 1 to 12 carbon atoms, a substituted or unsubstituted phenyl group or a substituted or unsubstituted naphtyl group.

Note that typically $NO_3^-$ or $CH_3COO^-$ exists as counter ion in the above cationic groups.

A self-dispersion type pigment to which a hydrophilic group is bonded to make it cationically charged can be prepared by causing the hydrophilic group to be also bonded to an N-ethylpyridyl group having a structure as shown below. With this method, the pigment is typically treated by means of 3-amino-N-ethylpyridiniumbromide.

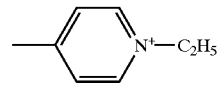

The pigment that is cationically charged as a result of introducing a hydrophilic group to the surface thereof is dispersed in water very well because of repulsion of ions and hence it is stably held in a dispersed state in ink without using any dispersion medium when ink is made to contain it. Particularly, a pigment that is carbon black can suitably be used as self-dispersion type pigment.

(Additional Ingredients of Ink)

Beside the above ingredients, for ink to show desired physical properties, if necessary, one or more than one additives selected from surfactants, defoaming agents, preservatives and other agents may be added to ink. Furthermore, one or more than one commercially available dyes may be added.

Examples of surfactants that can be used for the purpose of the invention include primary, secondary and tertiary amine salt type compounds such hydrochlorides and acetates of lauryl amine, coconut amine, stearil amine and rosin amine, quarternary ammonium salt type compounds such as laurylmethylammoniumchloride, cetyltrimethylamoniumchloride, benziltributylammoniumchloride and benzailconiumchloride, pyridinium salt type compounds such as cetylpyridiniumchloride and cetylpyridiniumbromide, imidazoline type cationic compounds such as 2-heptadecenylhydroxyethylimidazoline and ethyleneoxide adducts of higher alkylamines such as cationic surfactants of dihydroxyethylstearil amine. Additionally, amphoteric surfactants that become cationic in a certain pH range such as amino acid type amphoteric surfactants, $R-NH-CH_2-CH_2-COOH$ type compounds and carbonic acid type amphoteric surfactants such as betaine type compounds including stearyldimethylbetaine, lauryldihydroxyethylbetaine as well as sulfate type, sulfonic acid type and phosphate type amphoteric surfactants. Examples of nonionic surfactants that can be used for the purpose of the invention include polyoxyethylenealkylethers, polyoxyethyleneaklylesters, acetylene alcohols and acetylene glycols. One or a combination of two or more than two different type of surfactants may be used for the purpose of the invention. Of the above listed compounds, acetylene alcohols and acetylene glycols are preferably be used for the purpose of the invention because any of the surfactants can improve the permeability of the liquid composition relative to plain paper and, at the same time, suppress foaming of the liquid composition. If the liquid composition foams, any of the surfactants can quickly defoam it.

While the rate at which the surfactant is added may vary depending on the type of surfactant, it is preferably be used at a rate between 0.05 to 5 mass % relative to the total amount of ink to provide ink with a sufficient degree of permeability.

(Surface Tension of Ink)

Cationic ink to be used for the purpose of the invention is made to show surface tension at 25° C. preferably not less than 10 mN/m (dyne/cm), more preferably not less than 20 mN/m, most preferably not less than 30 mN/m and not more than 70 mN/m so that it may permeate well when it is used to record characters on plain paper and matches well with ink-jet head. Additionally, its viscosity is adjusted to be preferably less than 15 mPa·s (cP), more preferably less than 10 mPa·s, most preferably less than 5 mPa·s.

<Concentration of Coloring Material in Ink>

While the mass concentration of the coloring material contained in anionic ink and cationic to be used for the purpose of the invention may be selected appropriately depending on the type thereof, which may be an aqueous dye, a pigment or a self-dispersion type pigment, it is found preferably within a range between 0.1 and 20 mass %, more preferably within a range between 0.1 and 12 mass %, relative to the total mass of ink. When the concentration of the fine particles in the liquid composition relative to that of the coloring material in ink is 1:1.2 or less, more particularly 1:1 or less in relative terms, the coloring property of the image formed under the recording conditions of an ordinary two-liquid system is particularly good if the mass concentration of the coloring material is found within a range between 0.3 and 7 mass %.

<Method of Forming Colored Section on Recording Medium>

Now, a method of forming a colored section on a recording medium according to the invention will be described. A method of forming a colored section on a recording medium according to the invention comprises (i) a step of applying anionic or cationic ink containing a coloring material to a recording medium and (ii) a step of applying a liquid composition according to the invention and containing fine particles charged to the polarity opposite to that of ink in a dispersed state and is characterized in that aqueous ink and the liquid composition are applied in such a way that they contact with each other in a liquid state on the surface of the recording medium. Now, a method of applying a liquid composition according to the invention and aqueous ink onto a recording medium will be discussed below.

As pointed out above, a method of forming a colored section on a recording medium according to the invention comprises (ii) a step of applying a liquid composition onto a recording medium and (i) a step of applying anionic or cationic aqueous ink onto the recording medium. In these steps, the liquid composition is applied to a region for forming a colored section or a region for forming a colored section and its neighboring area on the recording medium so that aqueous ink and the liquid composition may contact with each other in a liquid state. The expression of a region for forming a colored section as used herein refers to a region where a dot of ink is made to adhere and the neighboring area of a region for forming a colored section refers to an area outside the region where a dot of ink is made to adhere, said area showing a dimension of 1 to 5 times of the size of the dot.

Any technique of applying a liquid composition and ink may be used for a method of forming a colored section on a recording medium according to the invention provided that the liquid composition and aqueous ink are made to contact with each other in a liquid state on the recording medium. In other words, it does not matter if the liquid composition is applied first and ink is applied second or vice versa. In other words, the step (i) may be conducted first and subsequently the step (ii) may be conducted. Alternatively, the step (ii) may be conducted first and subsequently the step (i) may be conducted. It is preferable that the step (i) is conducted first, the step (ii) is conducted second and subsequently the step (i) is conducted again. When the liquid composition is applied to the recording medium first, the time between the application of the liquid composition onto the recording medium and the application of in onto the recording medium is not subjected to any limitation. However, the both are preferably applied simultaneously or within several seconds onto the recording medium so that they may contact with each other in a liquid state successfully.

(Recording Medium)

There is no limitation to the recording medium to be used for forming a colored section thereof for the purpose of the invention. Plain paper such as copying paper and bond paper may suitably be used as recording medium. Of course, coat paper prepared specifically for ink-jet recording and transparent film to be used for OHPs may also suitably be used. Furthermore, ordinary wood free paper and glossy paper may also suitably be used for the purpose of the invention.

(Method of Applying Liquid Composition)

While a sprayer or a roller may be used for applying a liquid composition according to the invention onto a recording medium, an ink-jet method adapted to apply the liquid composition only to a region for forming a colored section or a region for forming a colored section and its neighboring area on the recording medium is preferably used. While there may be a number of ink-jet recording methods that can be used for the purpose of the invention, methods adapted to eject liquid droplets by means of bubbles generated by thermal energy is particularly advantages.

<Ink-jet Recording Apparatus>

Now, an ink-jet recording apparatus according to the invention will be described by way of preferred embodiments.

An ink-jet recording apparatus according to the invention comprises an ink storage section containing ink by turn containing a coloring material, a first recording unit equipped with an ink-jet heat for ejecting ink, a liquid composition storage section containing a liquid composition according to the invention and by turn containing fine particles in a dispersed state with the surfaces thereof electrically charged to show the polarity opposite to that of ink and a second recording unit equipped with an ink-jet head for ejecting the liquid composition.

FIG. 1 is a schematic perspective view of an embodiment of ink-jet recording apparatus according to the invention having the above configuration and using an ink-jet method for recording output information. Referring to FIG. 1, reference symbol 1 denotes a cartridge comprising an ink-jet head for ejecting ink for the purpose of printing and forming a colored section (to be referred to as printing head cartridge hereinafter) and reference symbol 2 denotes a cartridge comprising a liquid composition ejection head for ejection the liquid composition (to be referred to as head cartridge for liquid composition hereinafter). Four printing head cartridges 1 adapted to use ink of different respective colors and a head cartridge for liquid composition 2 are provided in the embodiment of FIG. 1. Each of the printing head cartridges 1 has an upper section that is an ink tank section and a lower section that is an ink ejecting section (printing section). On the other hand, the head cartridge for liquid composition 2 has an upper section that is a liquid composition tank section and a lower section that is a liquid composition ejecting section. Each of the head cartridges 1 and 2 is provided with a connector for receiving drive signals and other signals. Reference symbol 3 denotes a carriage.

The carriage 3 carries thereon the four printing head cartridges 1 for printing, using ink of different respective colors, and the single head cartridge for liquid composition 2, which are aligned relative to each other. The carriage 1 is provided with a connector holder to be used for transmitting signals for driving the printing head cartridges 1 and the head cartridge for liquid composition 2 and connected to the head cartridges 1 and 2 by way of the connector holder.

The printing head cartridges 1 store ink of different respective colors, which may typically be yellow (Y), magenta (M), cyan (C) and black (B). In FIG. 1, the printing head cartridges 1Y, 1M, 1C, 1B for yellow ink, magenta ink, cyan ink and black ink are arranged from the left in the mentioned order and the head cartridge for liquid composition 2 storing the liquid composition is arranged to the right of the printing head cartridges 1.

Referring to FIG. 1, there are also shown a scanning rail 4 extending in the main scanning direction of the carriage 3 and supporting the carriage in such a way that the carriage may freely slide thereon, a drive belt 5 for transmitting drive force for driving the carriage 3 to reciprocate and pairs of transfer rollers 6, 7 and 8, 9 arranged respectively in front of and behind the printing positions of the printing heads of the head cartridges for the purpose of pinching and transferring the recording medium 10. The recording medium 10 that is typically a sheet of paper is pressed against and guided and supported by a platen (not shown) for flattening the printing area of the recording medium at the printing positions. Under this condition, the ejection orifice forming plane of each of the head cartridges 1 and 2 mounted on the carriage 3 is located between the recording medium transfer rollers 7, 8 at a position projecting downward from the carriage 3 so that it is arranged vis-à-vis and in parallel with the recording medium 10 that is pressed against the guide plane of the platen (not shown).

A recovery unit 11 is arranged near the home position of the carriage that is located off the printing region of the ink-jet printer at the left side FIG. 1. The recovery unit 11 comprises four caps 12 the correspond to the respective ink ejecting sections of the four printing head cartridges 1Y, 1M, 1C, 1B and a cap 13 that corresponds to the liquid composition ejecting section of the head cartridge for liquid composition 2. The caps are adapted to move up and down. When the carriage 3 is at the home position, the caps 12 and 13 are pressed against the respective ejection orifice forming planes of the ejecting sections of the head cartridges 1, 2 to hermetically seal (cap) the ejection orifices of the head cartridges 1, 2. As the ejection orifices are capped, ink is prevented from thickening and adhering to the inside of the ejection orifices as a result of evaporation of the ink solvent so that faulty ejection of ink may not occur.

The recovery unit 11 additionally comprises a suction pump 14 communicating to the caps 12 and a suction pump 15 communicating to the cap 13. When any of the printing head cartridges 1 and the head cartridge for liquid composition 2 comes to operate faultily, the suction pumps 14, 15 are used cap the ejection orifice forming planes of the head cartridges 1, 2 by means of the respective caps 12, 13 and perform a suction recovery operation. The recovery unit 11 further comprises a pair of wiping members (blades) 16 and 17 made of a resilient material such as rubber. The blade 16 is held by a blade holder 18, whereas the blade 17 is held by a blade holder 19.

In the embodiment of FIG. 1, the blade holders 18, 19 are driven to move up and down by a blade lift mechanism (not shown) that is driven by utilizing the movement of the carriage 3 between a projecting (raised) position (wiping position) for wiping out the ink and the foreign objects adhering to the ejection orifice forming planes of the head cartridges 1 and 2 and a retracted (lowered) position A (standby position) where they do not contact the ejection orifice forming planes. The blade 16 for wiping the ejection orifice forming planes of the printing head cartridges 1 (to be referred to as blades for ink hereinafter) and the blade 17 for wiping the ejection orifice forming plane of the head cartridge for liquid composition 2 (to be referred to as blade for liquid composition hereinafter) are adapted to move up and down separately and independently.

When the carriage 3 moves from the right side in FIG. 1 (printing region side) to the home position side or from the home position side to the printing region side, the blade 16 abuts the ejection orifice forming planes of the printing head cartridges 1 and the blade 17 abuts the ejection orifice forming plane of the head cartridge for liquid composition 2. Then, they wipe the ejection orifice forming planes as they are moved relative to the latter.

FIG. 2 is a schematic perspective view of one of the printing head cartridges 1 having an ink ejecting section and an ink tank that are integrally formed with it. Note that the head cartridge for liquid composition 2 has a configuration substantially same as that of the printing head cartridges 1 except that the liquid it stores and uses is not ink but a liquid composition. Referring to FIG. 2, the printing head cartridge 1 has an upper section that is an ink tank 21 and a lower section that is an ink ejecting section (printing head section) 22 along with a head side connector 23 to be used for receiving signals including one for driving the ink ejecting section and outputting a remaining ink detection signal. The connector 23 is juxtaposed with the ink tank 21.

The printing head cartridge 1 has an ejection orifice forming plane 81 at the bottom side (the side close to the recording medium 10) in FIG. 2, which ejection orifice forming plane 81 is provided with a plurality of ejection orifices. An ejection energy generating element for generating energy necessary for ejecting ink is arranged at the liquid paths communicating to the respective ejection orifices.

The printing head cartridge 1 is a replaceable ink-jet cartridge having an ink ejecting section 22 and an ink tank as integral parts thereof and operates as ink-jet printing means for ejecting ink from the ink ejecting section for the purpose of a printing operation. More specifically, the printing head cartridge 1 is an ink-jet printing means that ejects ink by utilizing thermal energy and hence it is provided with electrothermal transducer for generating thermal energy. The printing head cartridge 1 is adapted to eject ink from the ejection orifices for a printing operation by utilizing the pressure changes produced by the growth and contraction of bubbles that appear as a result of a membrane boiling phenomenon that is made to occur by the thermal energy applied from the electrothermal transducer.

Figure 3:
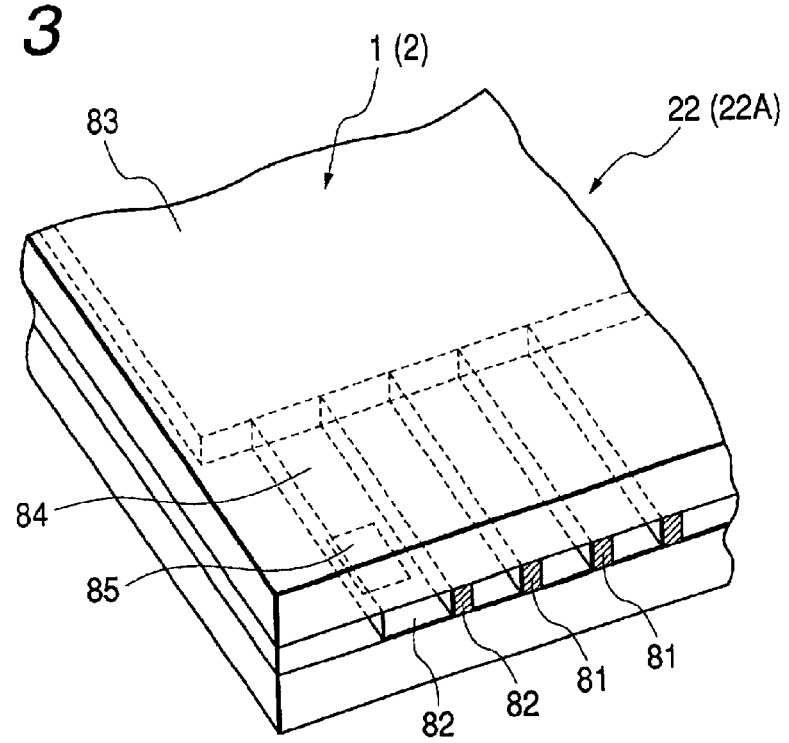
FIG. 3 is a partial perspective view of the head cartridge in FIG. 1, illustrating the configuration of the ink ejecting section thereof.

FIG. 3 is a partial perspective view of the printing head cartridge 1 (head cartridge for liquid composition 2), illustrating the structure of the ink ejecting section 22 (liquid composition ejecting section 22A). Referring to FIG. 3, the ejection orifice forming plane 81 is made to face the recording medium (printing paper or the like) 10 with a predetermined gap (e. g., about 0.5 to 2.0 mm) and provided with a plurality of ejection orifices 82 that are arranged at a predetermined pitch. An electrothermal transducer (heat generating resistor or the like) 85 for generating energy to be used for ejecting ink is arranged along the wall surfaces of the liquid paths 84, through which the common liquid chamber 83 communicates to the ejection orifices. The plurality of ejection orifices 82 are arranged in a direction that intersects the moving direction (main scanning direction) of the printing head cartridge 1. The printing head cartridge 1 is so designed that the corresponding electrothermal transducer 85 is driven (energized) according to an image signal or an ejection signal to give rise to membrane boiling to the ink in the liquid paths 84 and the generated pressure is used to drive ink to fly from the ejection orifices 82 toward the recording medium 10.

The material of the tanks that the printing head cartridges 1 have for storing ink and the tank that the head cartridge for liquid composition 2 has for storing the liquid composition (which is also 4 referred to as ink tank for the purpose of simplicity of description) preferably is chemical-resistant because it is brought into contact with ink and the liquid medium. Examples of materials that satisfy this requirement and are commercially available with, ease include resin materials such as polyolefin type resin, polyvinylchloride, polyvinylidenechloride, silicon resin, ethylene-vinyl acetate copolymer, ABS resin, polyacetal, nylon, unsaturated polyester resin, PET and aramid resin and synthetic rubbers such as styrene-butadiene rubber (SBR), butadiene rubber, chloroprene, nitrile rubber, butyl rubber, EPDM, urethane rubber, silicon rubber, acryl rubber, epichlorohydrin rubber and fluorine rubber. If necessary, auxiliary additives selected from stabilizers, UV absorbers, antioxidants and so on may be added to the chemical substance of the material selected from such resins and rubbers as listed above depending on the application.

Some of the additives may be eluted into ink or the liquid composition and react with any of the ingredients thereof to produce an insoluble substance. Particularly, fatty acids and fatty acid derivatives can be eluted into ink or the liquid composition and the eluate may react with dissolved ions contained in the ink or the liquid medium, whichever appropriate, to produce insoluble salts of fatty acids, which by turn clog the filters and the ejection orifices to block the ink flow. Therefore, measures such as minimizing the content of the additives of the resin material of the ink tanks, selecting materials that can hardly be eluted for the ink tanks, modifying the compositions of the solvents of ink and the liquid medium and/or minimizing the contents of the reactive ingredients of ink and the liquid composition may need to be taken in order to prevent or suppress the deposition of the eluate itself from the material and/or the reaction products of the eluate and any of the ingredients of ink and the liquid composition.

Figure 4A:
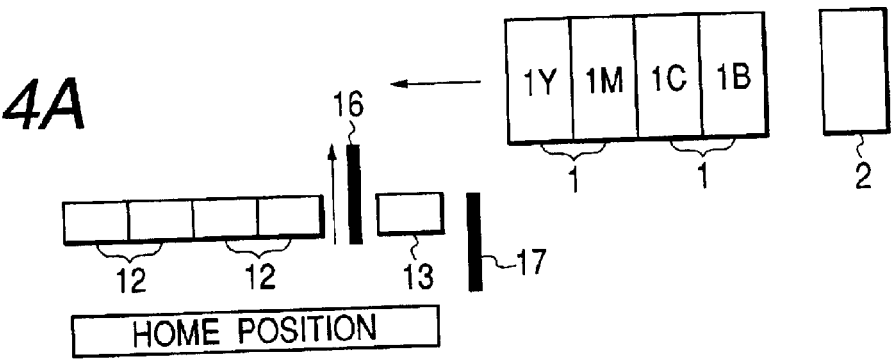
Figure 4B:
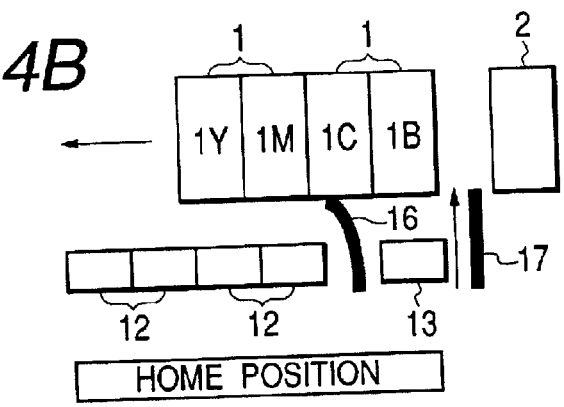

FIGS. 4A through 4D and 6A through 6D are schematic illustrations of a wiping operation of the ink-jet printer of FIG. 1. FIGS. 4A through 4D illustrate the movement of the carriage 3 from the printing region side to the home position side. Firstly, as shown in FIG. 4A, the printing head cartridges 1 and the head cartridge for liquid composition 2 on the carriage 4 are moved from the right side (printing region side) toward the home position. Then, as shown in FIG. 4B, firstly the blade 16 for ink located between the cap 12 for ink and the cap 13 for the liquid composition is raised to sequentially wipe the printing heads 1Y, 1M, 1C and 1B as the carriage 3 moves.

Figure 4C:
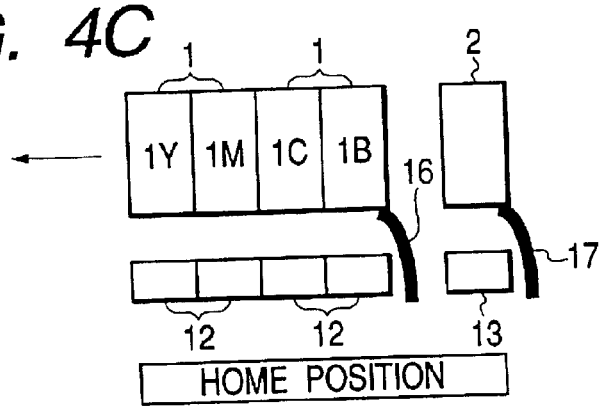
Figure 4D:
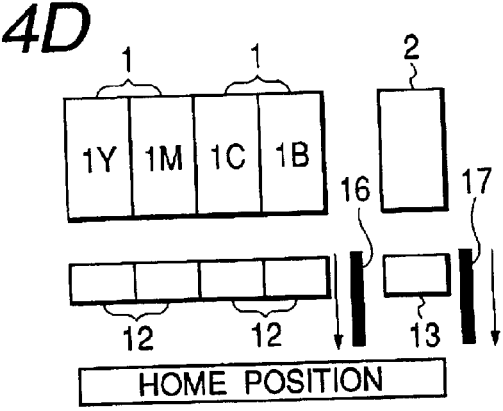

Then, as shown in FIG. 4C, after the printing head cartridges 1 pass by above the blade 17 for liquid composition, the blade 17 is raised to immediately wipe the ejection orifice forming plane of the head cartridge for liquid composition 2 as shown in FIG. 4D. After the blade 16 for ink and the blade 17 for liquid composition finish the respective operation of wiping the fourth printing head 1 and the ejecting section of the head cartridge for liquid composition 2, they are lowered and standby at the respective standby positions. While the blades 16, 17 perform a wiping operation when the carriage 3 is moved from the right side in FIG. 1 (printing region side) to the home position side where the recovery unit 11 is arranged in the above description made by referring to FIGS. 4A through 4D, the direction along which the wiping operation is performed is not limited to the above description. Alternatively, it may be so arranged that the wiping operation is performed when the carriage 3 is moved from the home position side to the right side (printing region side) as illustrated in FIGS. 5A through 5D.

Figure 5A:
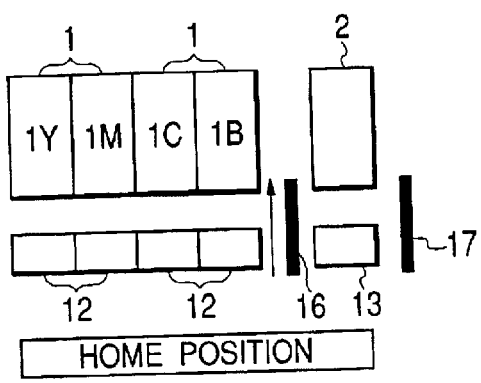
Figure 5B:
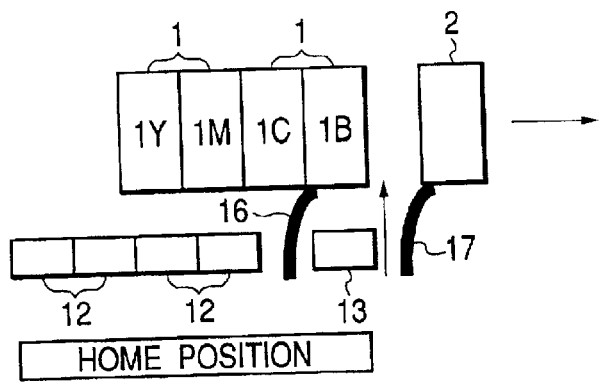
Figure 5C:
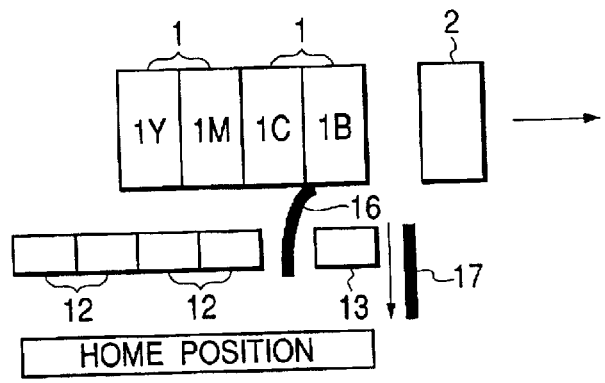
Figure 5D:
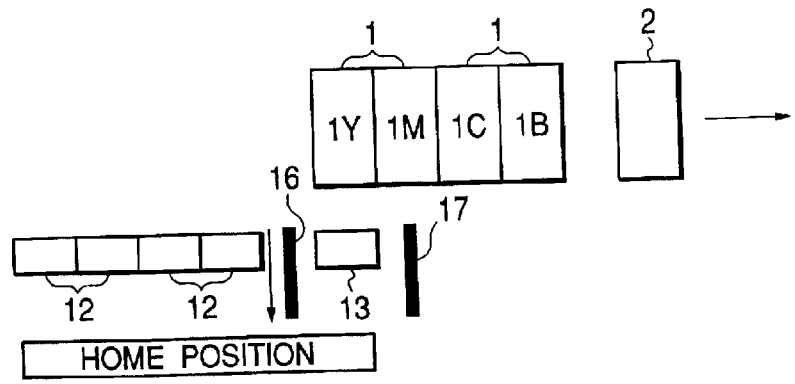

Referring to FIG. 5A, both the blade 16 for ink and the blade 17 for liquid composition are raised at the same time and, as the carriage 3 is moved rightward (toward the printing region side), they simultaneously and respectively wipe the printing head cartridges 1 and the head cartridge for liquid composition 2 (FIG. 5B). As the operation of wiping the head cartridge for liquid composition 2 is finished, only the blade 17b for liquid composition is lowered and brought to a standby state, while the blade 16 for ink is left there to complete the operation of wiping the printing head cartridges 1 (FIG. 5C). Finally, as shown in FIG. 5D, when all the printing head cartridges 1 are wiped, the blade 16 for ink is lowered to terminate the sequence of wiping operation. The wiping direction of FIGS. 5A through 5D is advantageous in that the problem (risk) that the liquid droplets removed by the wiping operation and adhering to the blades 16 and 17 are driven to fly toward the recording medium transfer section by the resiliency of the blades and inadvertently smear the recording medium 10 is reliably eliminated.

Figure 6A:
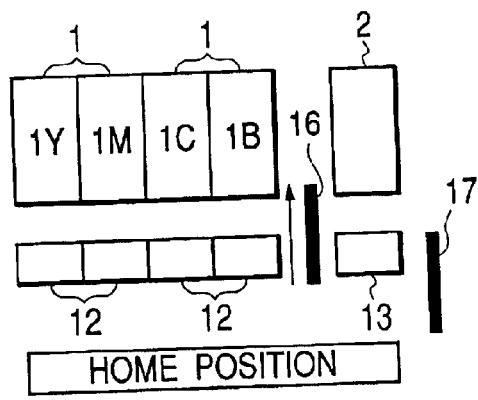
Figure 6B:
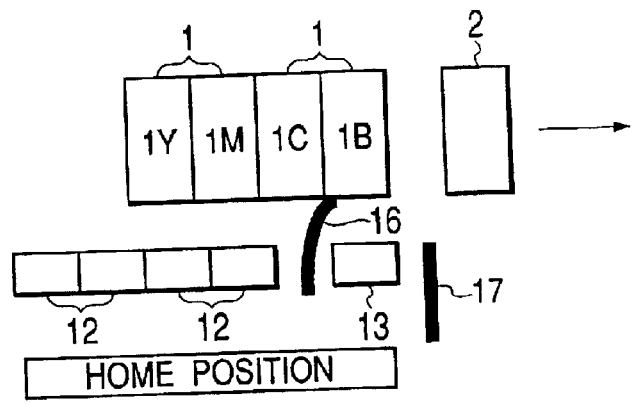
Figure 6C:
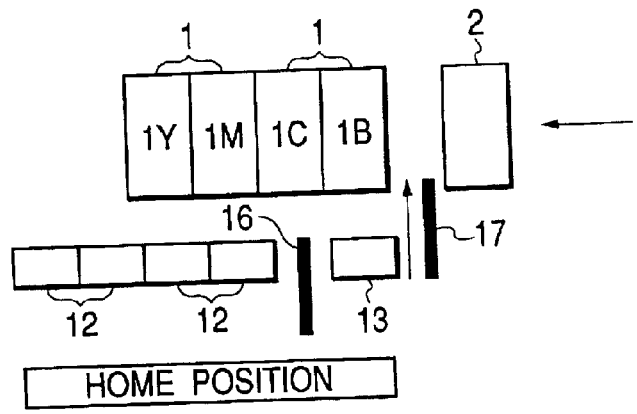
Figure 6D:
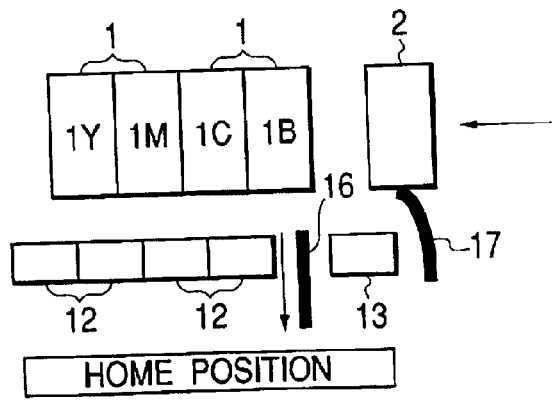

The direction of wiping the printing head cartridges 1 and that of wiping the head cartridge for liquid composition 2 may be differentiated as shown in FIGS. 6A through 6D. It may be so arranged that the blade 16b for ink wipes the printing head cartridges 1 when the carriage 3 is moved from the home position side toward the right side (printing region side) as shown in FIGS. 6A and 6B and the blade 17 for liquid composition wipes only the ejecting section of the head cartridge for liquid composition 2 when the carriage 3 is moved from the printing region side toward the home position side. The use of these wiping directions is advantageous in that the problem (risk) that ink droplets driven to fly by the resiliency of the blade 16 adhere to the ejecting section of the head cartridge for liquid composition 2 and droplets of the liquid composition driven to fly by the resilience of the blade 17 adhere to the ejecting sections of the printing head cartridges 1 is eliminated or remarkably reduced.

In FIG. 1, the cap 12 for wiping the printing head cartridges 1 and the cap 13 for wiping the head cartridge for liquid composition 2 are used separately and independently (dedicated caps) and the suction pumps 14, 15 connected respectively to the caps 12, 13 are also used separately and independently for (dedicated to) the printing head cartridges 1 and the head cartridge for liquid composition 2 respectively. With this arrangement, ink and the liquid composition that is highly reactive with ink are not brought into contact with each other in any of the caps 12, 13 and the pumps 14, 15 when treating the waste liquid therein so that the apparatus can be operated highly reliably.

Figure 7:
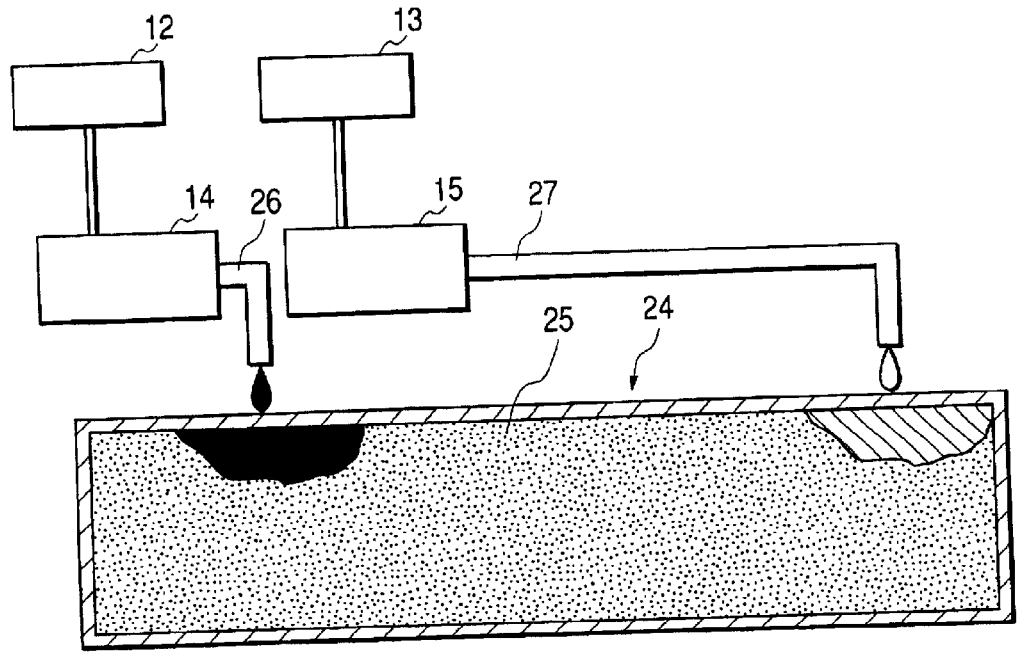
FIG. 7 is schematic illustration of the waste liquid collection system of the ink-jet printer of FIG. 1.

FIG. 7 is a schematic illustration of the waste liquid collection system for collecting the ink and the liquid composition discharged from the respective pumps 14, 15 in a waste ink tank. Referring to FIG. 7, the waste ink drawn from the printing head cartridges 1 by means of the suction pump 14 that communicates to the cap 12 and the waste liquid drawn from the head cartridge for liquid composition 2 by means of the suction pump 15 that communicates to the cap 13 are collected and stored in the waste liquid tank 24 by way of independent respective paths so that both the waste ink and the waste liquid may not leak out of the printer.

The inside of the waste liquid tank 24 is filled with a porous absorbing body 25, which absorbs and holds the collected waste liquid. The waste liquid tank 24 is arranged in the printer main body. As shown in FIG. 7, the waste ink conduit 26 extending from the suction pump 14 for the printing head cartridges 1 and the waste liquid conduit 27 extending from the suction pump 15 for the head cartridge for liquid composition 2 are connected to the waste liquid tank 24 at opposite ends of the latter so that they are remote from each other. With this arrangement, the liquid composition and the ink in the waste liquid tank 24 do not contact with each other until the absorbing body 25 absorbs liquid to a large extent so that the porous absorbing body 25 can absorb and retain a sufficient amount of liquid.

Figure 8:
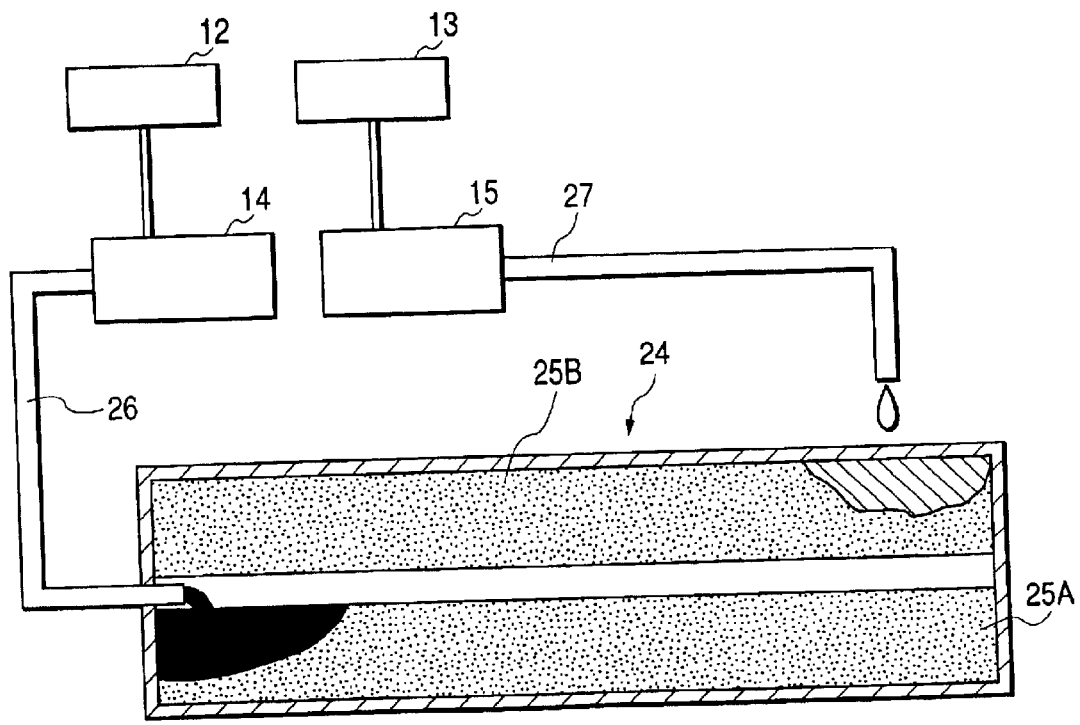
FIG. 8 is a schematic illustration of a waste liquid collection system obtained by partly modifying that of FIG. 7.
Figure 9:
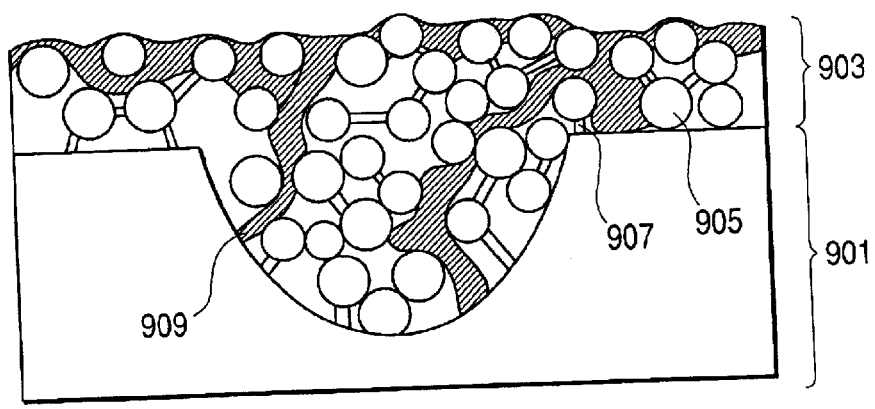
FIG. 9 is a schematic partial cross sectional view of coat paper illustrating the state of a colored section produced by ink-jet recording.

FIG. 8 is a schematic illustration of a waste liquid collection system obtained by partly modifying that of FIG. 7 in such a way that the absorbing body 25 in the waste liquid tank 24 is arranged in two layers and the lower layer absorbing body 25A absorbs ink, while the upper layer absorbing body 25B absorbs the liquid composition. With the arrangement of FIG. 8, if the ink in the lower layer ink absorbing body 25A overflows, the dyes in the overflowed ink react with the liquid composition absorbed in the upper layer absorbing body 25B and come to be fixed there so that the overflowed ink is prevented from leaking out and smearing the inside and the outside of the printer.

Another embodiment of ink-jet recording apparatus according to the invention comprises an ink storage section containing anionic or cationic aqueous ink by turn containing a coloring material, a liquid composition storage section containing a liquid composition according to the invention and by turn containing fine particles in a dispersed state with the surfaces thereof electrically charged to show the polarity opposite to that of ink and an ink-jet head for ejecting independently aqueous ink stored in the ink storage section and the liquid composition stored in the liquid composition storage section. Now, this embodiment of ink-jet recording apparatus will be described below.

Figure 10:
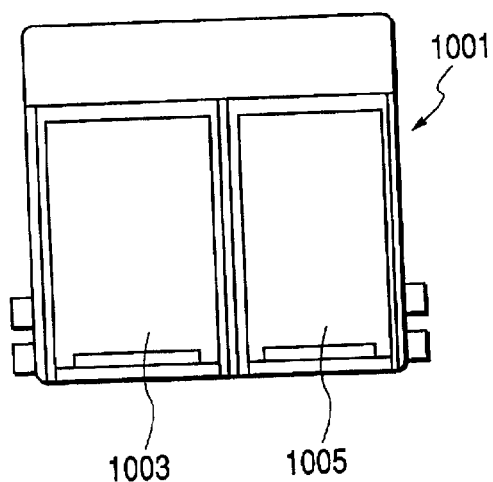
FIG. 10 is a schematic illustration of an embodiment of ink cartridge according to the invention.
Figure 11:
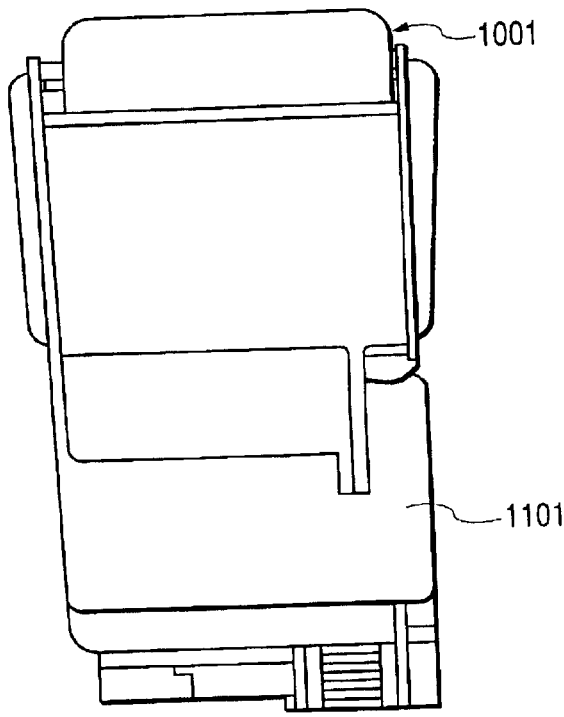
FIG. 11 is a schematic illustration of a recording head equipped with an ink cartridge as shown in FIG. 10.

FIG. 10 illustrates a cartridge 1001 to be used for the embodiment of ink-jet recording apparatus. In FIG. 10, reference symbol 1003 denotes an ink storage section containing ink and reference symbol 1005 denotes a liquid composition storage section containing a liquid composition. As shown in FIG. 11, the cartridge is removably fitted to the recording head 1101 for ejecting ink and the liquid composition and, once the cartridge 1001 is fitted to the recording head 1101, the liquid composition and ink are supplied to the recording head 1101.

Figure 15:
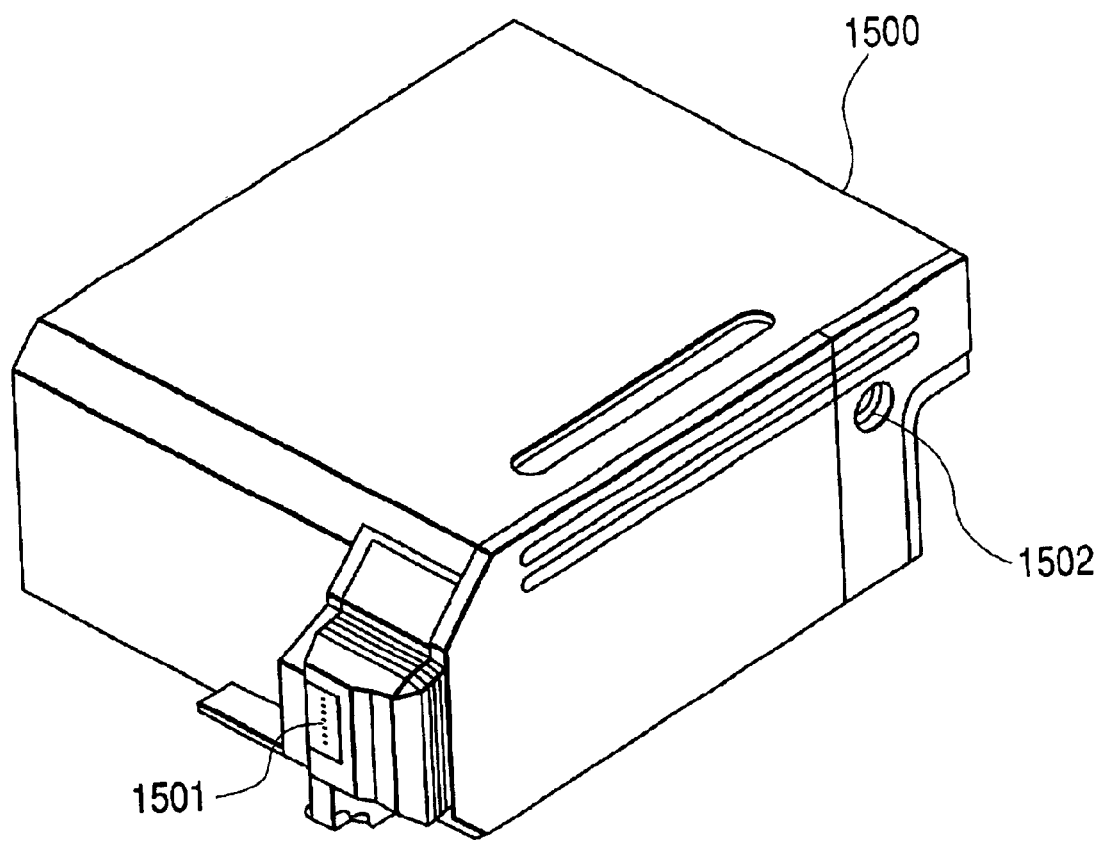
FIG. 15 is a schematic perspective view of a recording unit.

An ink-jet recording apparatus according to the invention does not necessarily have an ink head and a cartridge that are separate from each other. Alternatively, the ink head and the cartridge may be integrally formed as shown in FIG. 15. Referring to FIG. 15, reference symbol 1500 denotes a recording unit containing an ink storage section containing ink typically along with an ink absorbing body and ink in the ink absorbing body is ejected as ink droplets from a head section 1501 having a plurality of orifices. The ink absorbing body may typically made of polypropylene or polyurethane. In FIG. 15, reference symbol 1502 denotes an atmosphere communicating port that holds the inside of the recording unit in communication with the atmosphere.

Figure 12:
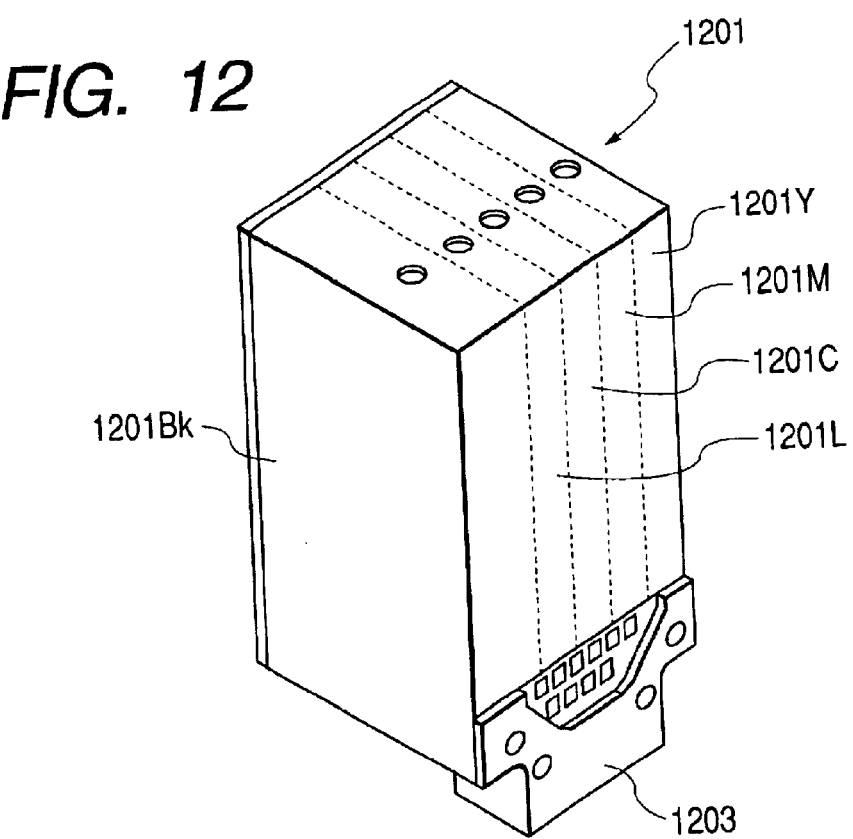
FIG. 12 is a schematic illustration of an embodiment of recording unit according to the invention.

In still another embodiment of recording unit to be used for the invention, ink and the liquid composition are stored in respective storage sections arranged in a single ink tank and formed integrally with a recording head adapted to eject ink and the liquid composition. FIG. 12 shows such an arrangement. Referring to FIG. 12, the liquid composition is stored in storage section 1201L and black ink is stored in storage section 1201Bk, whereas yellow, cyan and magenta inks are stored respectively in color ink storage sections 1201Y, 1201M and 1201C. Then, ink flow paths are provided in the recording head 1203 respectively for the liquid composition and inks of different colors so that they may be ejected separately.

Figure 16:
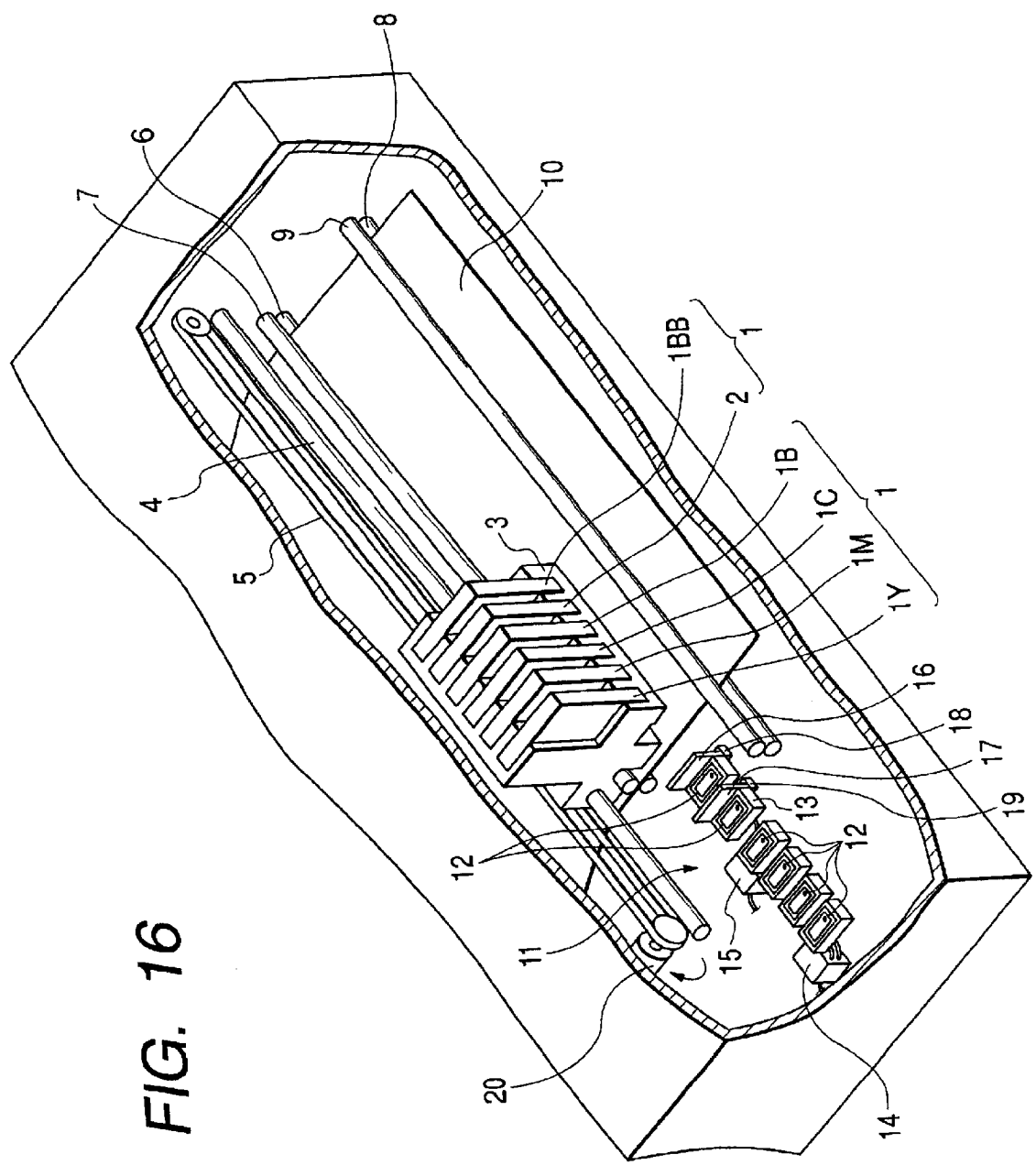
FIG. 16 is a partially cut out schematic perspective view of an ink-jet printer to which the present invention is applied.

FIG. 16 is a partially cut out schematic perspective view of another embodiment of ink-jet recording apparatus that is an ink-jet printer.

Referring to FIG. 16, there are shown a scanning rail 4 extending in the main scanning direction of the carriage 3 and supporting the carriage in such a way that the carriage may freely slide thereon, a drive belt 5 for transmitting drive force for driving the carriage 3 to reciprocate. There are also shown transfer roller pairs 6, 7 and 8, 9 arranged respectively in front of and behind the printing positions of the printing heads of the head cartridges for the purpose of pinching and transferring the recording medium 10. The recording medium 10 that is typically a sheet of paper is pressed against and guided and supported by a platen (not shown) for flattening the printing area of the recording medium at the printing positions. Under this condition, the ejection orifice forming plane of each of the head cartridges 1 and 2 mounted on the carriage 3 is located between the recording medium transfer rollers 7, 8 at a position projecting downward from the carriage 3 so that it is arranged vis-à-vis and in parallel with the recording medium 10 that is pressed against the guide plane of the platen (not shown).

In FIG. 16, a total of 6 head cartridges are mounted on the carriage 3 in this embodiment. They are head cartridge 1Y for the yellow printing head, head cartridge 1M for the magenta printing head, head cartridge 1C for the cyan printing head, head cartridge 1B for the black printing head, carriage 2 for the liquid composition and head cartridge 1BB for the second black printing head arranged on the carriage from the left end toward the right side in FIG. 16 in the mentioned order. The head cartridge 2 for the liquid composition is used to eject the liquid composition according to the invention that is reactive with the coloring material contained in ink toward the recording medium 10. The head cartridge 1BB for the second black printing head located at the right end is used to eject black ink for printing in the sub-scanning direction in a reciprocating printing operation. Thus, unlike the preceding embodiments, the head cartridge 2 for the liquid composition is arranged next to (and at the right side of) the head cartridge 1B for the black printing head and the head cartridge 1BB for the second black printing head is arranged (at the right end and) next to the head cartridge 2 for the liquid composition.

Referring to FIG. 16, a recovery unit 11 is arranged to the left of the printing region. In the recovery unit 11, the caps 12 for capping the head cartridges 1Y, 1M, 1C and 1B for the respective printing heads are arranged sequentially from left to right in the mentioned order and the cap 13 for capping the ejecting section of the head cartridge for liquid composition 2 is arranged next to (to the right of) those caps, whereas the cap 12 for capping the head cartridge 1BB for the second black printing head is arranged next to (at the right end of) the cap 13 so as to correspond to the arrangement of the head cartridges 1 and 2. The caps are adapted to move up and down. When the carriage 3 is at the home position, the caps 12 and 13 are pressed against the respective ejection orifice forming planes of the ejecting sections of the head cartridges 1, 2 to hermetically seal (cap) the ejection orifices of the head cartridges 1, 2. As the ejection orifices are capped, ink is prevented from thickening and adhering to the inside of the ejection orifices as a result of evaporation of the ink solvent so that faulty ejection of ink may not occur.

The recovery unit 11 additionally comprises a suction pump 14 communicating to the caps 12 and a suction pump 15 communicating to the cap 13. When any of the printing head cartridges 1 and the head cartridge for liquid composition 2 comes to operate faultily, the suction pumps 14, 15 are used cap the ejection orifice forming planes of the head cartridges 1, 2 by means of the respective caps 12, 13 and perform a suction recovery operation. The recovery unit 11 further comprises a blade 17 for liquid composition arranged between the fifth cap 13 from the left that is for the liquid composition and the sixth cap 12 (at the right end) for black ink and a blade 16 for the ejecting sections of the head cartridges 1 for different color inks that is arranged at the right side (printing region side) of the right end cap 12. The blade 17 is held by a blade holder 19, while the blade 16 is held by a blade holder 18.

In this embodiment, the blade of FIG. 16, the blade holder 19 is driven to move up and down by a blade lift mechanism (not shown) that is driven by utilizing the movement of the carriage 3 between a projecting position (wiping position) for wiping out the ink and the foreign objects adhering to the ejection orifice forming planes of the head cartridges 1 and 2 and a retracted position (standby position) where it does not contact the ejection orifice forming planes. The blade 16 for wiping the ejection orifice forming planes of the printing head cartridges 1 and the blade 17 for wiping the ejection orifice forming plane of the head cartridge for liquid composition 2 are adapted to move up and down separately and independently.

Figure 17A:
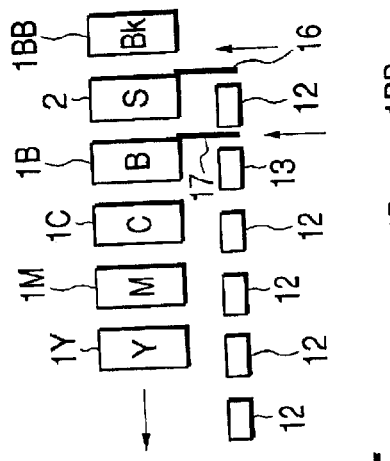
Figure 17B:
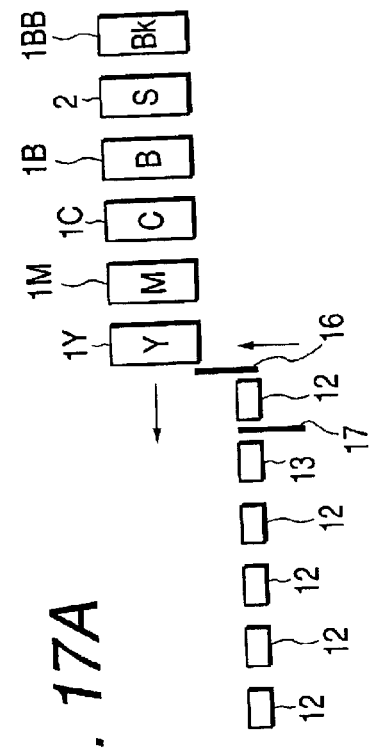
Figure 17C:
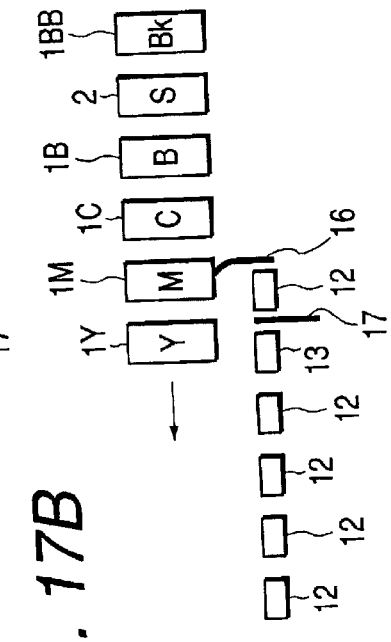

FIGS. 17A through 17F are schematic illustrations of a wiping operation of the ink-jet printer of FIG. 16. Firstly, as shown in FIG. 17A, after the blade 16 for ink is projected (raised), the heads mounted on the carriage 3 are driven to move from the right side (printing region side) toward the home position. Then, as shown in FIG. 17B, the raised blade 16 for ink sequentially wipes the printing heads 1 as the carriage 3 is driven to move leftward. Thereafter, as shown in FIG. 17C, when the head cartridge for liquid composition 2 comes before (next to) the blade 16 for ink, the blade 16 is retracted (lowered) to the standby position to prevent any contact of the blade 16 and the ejection head of the head cartridge for liquid composition 2.

Figure 17D:
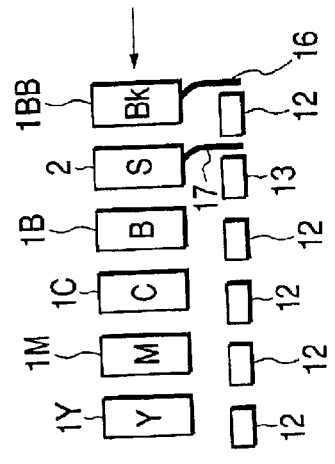
Figure 17E:
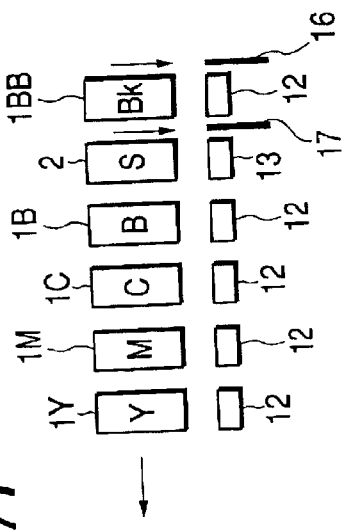
Figure 17F:
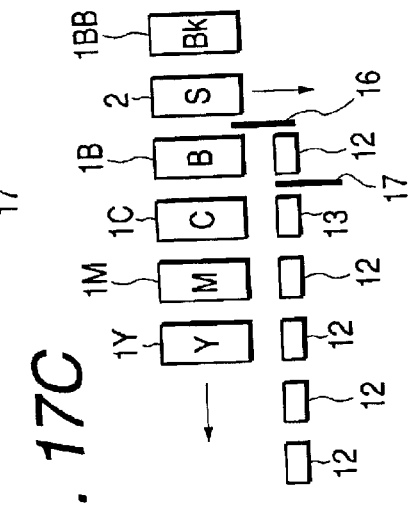

As the carriage 3 further moves leftward and the head cartridge for liquid composition 2 passes by the blade 16 for printing heads, both the blade 16 for ink and the blade 17 for liquid composition are projected (raised) as shown in FIG. 17D. Then, as shown in FIG. 17E, as the carriage 3 moves leftward, the blade 17 for liquid composition wipes the head cartridge for liquid composition 2 and the blade 16 wipes the rightmost printing head 1BB simultaneously. When the operation of wiping all the heads 1, 2 is completed, both of the blades 16, 17 are retracted (lowered) and held in a standby state at the standby position.

While the wiping operation of the blades 16 and 17 are conducted when the carriage 3 is driven to move from the printing region side (right side) toward the home position side where the recovery unit 11 is located in the embodiment illustrated in FIGS. 16 and 17A through 17E, the wiping direction is by no means limited thereto. Alternatively, the wiping operation may be performed when the cartridge is driven to move from the home position side toward the right side (printing region side).

The ink-jet printer of FIG. 16 is so arranged that the ejection head 2 for liquid composition ejects a liquid composition according to the invention that is reactive with the coloring material contained in ink and forms a recorded matter as it is brought into contact with ink ejected from the printing heads 1 on the recording medium 10. As the coloring material in ink reacts with the liquid composition on the recording medium 10, the coloring material in ink is adsorbed to the surfaces of fine particles in the liquid composition in a monomolecular state and an image is formed by the fine particles so that the produced image is excellent in terms of coloring effect and color uniformity.

While the above described embodiments of ink-jet recording apparatus are so adapted that thermal energy is applied to ink and the liquid composition in order to eject ink droplets, an ink-jet recording apparatus according to the invention may alternatively be so arranged that ink droplets are ejected by means of a piezo system using piezoelectric elements.

While an ink-jet recording apparatus according to the invention is described above, other ink-jet recording apparatus such as the one disclosed in Japanese Patent Application Laid-Open No. 10-146991 where the operating direction of the head wiping blades is different from that of an ink-jet recording apparatus according to the invention can also suitably be used for the purpose of forming a colored section on a recording medium.

EXAMPLES

Now, the present invention will be described by way of examples and comparative examples. In the following description, the expression of "portions" and "%" are used on the mass basis unless specifically noted otherwise. The zeta potential in the following description is a value determined by dispersing a liquid composition into ion exchange water until the solid concentration of fine particles becomes equal to 0.1% and subsequently observing the zeta potential by means of a zeta potential meter (BI-ZETAplus: tradename, available from Brookhaven Co., liquid temperature: 20° C. An acryl cell was used.). The pH value of the liquid composition is determined by means of a pH meter (Castany D-14 pH Meter: tradename, available from Horiba Ltd.) at liquid temperature of 25° C. The average particle diameter of fine particles is determined by dispersing the liquid composition into ion exchange water until the solid concentration of fine particles becomes equal to 0.1% and subsequently observing the average particle diameter by means of a dynamic light scattering type particle size distribution meter (BI-90: tradename, available from Brookhaven Co., liquid temperature: 20° C. An acryl cell was used.).

Each of the liquid compositions A through D used in the examples was prepared in a manner as described below. After mixing and dissolving the ingredients, which will be described hereinafter, the solution was filtered under pressure by means of a membrane filter having a pore size of 1 μm (Fluoropore Filter: tradename, available from Sumitomo Electric Industries, Ltd.). The pore radius distribution and the pore volume of the liquid composition was determined by pre-treating the liquid composition by following the sequence of (1) through (3) listed below, putting the specimen in a cell, deaerating the specimen at 120° C. for 8 hours by vacuum and observing the pore radius distribution and the pore volume by means of the nitrogen adsorption/desorption method using Omnisorb 1 available from Quantachrome Co. The pore radius and the pore volume are determined by calculation, using the method proposed by Barrett et al. (J. Am. Chem. Soc., Vol. 173, 373, 1951). The BET specific surface area was determined by calculation, using the method proposed by Brunauer et al. (J. Am. Chem. Soc., Vol. 60, 309, 1938).

(1) The liquid composition to be observed is dried at 120° C. for 10 hours in the atmosphere to nearly completely evaporate the solvent for drying.

(2) The temperature of the dry product is raised from 120° C. to 700° C. in an hour and subsequently baked at 700° C. for 3 hours.

(3) After the baking, the baked product is gradually cooled to room temperature and crushed into powder in an agate mortar.

(Synthesis of Alumina Hydrate)

Specimens of aluminum dodexide were prepared by means of the method described in U.S. Pat. No. 4,242,271. Subsequently, the obtained alumina dodexide was hydrolyzed by the method described in U.S. Pat. No. 4,202,870 to produce alumina slurry. Water was added to the obtained alumina slurry until the solid content of the alumina hydrate was made equal to 8.2%. The pH of the alumina slurry was 9.7. The pH value was regulated by adding a 3.9% nitric acid solution and colloidal sol was obtained under the maturing conditions listed in Table 1 below. All the specimens of alumina hydrate were positively charged on the surface to make them cationic in water. Each of the specimens of alumina hydrate was dispersed in ion exchange water and dropped onto collodione film to produce a specimen to be observed. When observed through a transmission type electron microscope, fine particles were found to be flat plate-shaped in all the specimens.

Each of the specimens of powdery alumina hydrate was put into a cell and deaerated at 120° C. for 8 hours by vacuum and observed by the nitrogen adsorption/desorption method, using Omnisorb 1 available from Quantachrome Co. The BET specific surface area was determined by calculation, using the method proposed by Brunauer et al. (J. Am. Chem. Soc., Vol. 60, 309, 1938). Table 1 shows the BET specific surface areas of the obtained specimens A through D of alumina hydrate,

TABLE 1

PREPARATION CONDITIONS OF ALUMINA HYDRATES

| | Alumina Hydrate | | | |
|---|---|---|---|---|
| | A | B | C | D |
| Aging Conditions of Colloidal Sol | | | | |
| pH before aging | 6.2 | 7.1 | 5.8 | 6.2 |
| temperature (° C.) | 160 | 160 | 65 | 100 |
| time (hr) | 30 | 4 | 360 | 60 |
| apparatus | Autoclave | | Oven | |
| BET Specific Surface Area (m$^2$/g) | 85 | 110 | 230 | 260 |

<Composition of Liquid Composition A>

| | |
|---|---|
| glycerol | 7.5 portions |
| diethylene glycol | 7.5 portions |
| alumina hydrate A (average particle diameter: 180 nm) | 10 portions |
| nitric acid | 0.3 portions |
| water | 74.7 portions |

The liquid composition A obtained above showed a pH value of 3.8 and a zeta potential of +35 mV. The liquid composition A was filled in an ink tank for an ink-jet printer, i. e. BJF8500 (trade name) manufactured by Canon Inc., and then the ink tank was stored at 60° C./Dry for 1 month for a storage test. After the storage test, no sediment was observed. Then the ink tank was fitted to the ink-jet printer, and ejection performance was observed, and any problems in the performance were not found. The aggregates of fine particles obtained after the pretreatment following the sequence (1) through (3) described earlier showed a pore volume of 0.95 ml/g in a pore radius range between 3 nm and 30 nm and that of 0.015 ml/g in a pore radius range exceeding 30 nm. The pore volume was 0.88 ml/g in a pore radius range between 3 nm and 20 nm, and was 0.09 ml/g in a pore radius range exceeding 20 nm. The BET specific surface area of the aggregates of fine particles was 74 m$^2$/g.

<Composition of Liquid Composition B>

| | |
|---|---|
| 1,5-pentanediol | 10.0 portions |
| ethylene glycol | 7.5 portions |
| alumina hydrate B (average particle diameter: 140 nm) | 10 portions |
| nitric acid | 0.6 portions |
| water | 71.9 portions |

The liquid composition A obtained above showed a pH value of 3.7 and a zeta potential of +37 mV. The liquid composition B was filled in an ink tank for an ink-jet printer, i. e. BJF8500 (trade name) manufactured by Canon Inc., and then the ink tank was stored at 60° C./Dry for 1 month for a storage test. After the storage test, no sediment was observed. Then the ink tank was fitted to the ink-jet printer, and ejection performance was observed, and any problems in the performance were not found. The aggregates of fine particles obtained after the pretreatment following the sequence (1) through (3) described earlier showed a pore volume of 0.92 ml/g in a pore radius range between 3 nm and 30 nm and that of 0.009 ml/g in a pore radius range exceeding 30 nm. The pore volume was 0.91 ml/g in a pore radius range between 3 nm and 0.015 ml/g in a pore radius range exceeding 20 nm. The BET specific surface area of the aggregates of fine particles was 103 m²/g.

<Composition of Liquid Composition C>

| | |
|---|---|
| glycerol | 7.5 portions |
| propylene glycol | 7.5 portions |
| alumina hydrate C (average particle diameter: 70 nm) | 10 portions |
| nitric acid | 0.5 portions |
| water | 74.5 portions |

The liquid composition C obtained above shows a pH value of 3.7 and a zeta potential of +40 mV. The liquid composition A was filled in an ink tank for an ink-jet printer, i. e. BJF8500 (trade name) manufactured by Canon Inc., and then the ink tank was stored at 60° C./Dry for 1 month for a storage test. After the storage test, no sediment was observed. Then the ink tank was fitted to the ink-jet printer, and ejection performance was observed, and any problems in the performance were not found. The aggregates of fine particles obtained after the pretreatment following the sequence (1) through (3) described earlier showed a pore volume of 0.51 ml/g in a pore radius range between 3 nm and 30 nm and that of 0.001 ml/g in a pore radius range exceeding 30 nm. The pore volume was 0.50 ml/g in a pore radius range between 3 nm and 20 nm, and was 0.007 ml/g in a pore radius range exceeding 20 nm. The BET specific surface area of the aggregates of fine particles was 192 m²/g.

<Composition of Liquid Composition D>

| | |
|---|---|
| 2-pyrroridone | 7.5 portions |
| ethylene urea | 7.5 portions |
| alumina hydrate C (average particle diameter: 55 nm) | 10 portions |
| nitric acid | 0.5 portions |
| water | 74.5 portions |

The liquid composition C obtained above shows a pH value of 3.7 and a zeta potential of +40 mV. The liquid composition A was filled in an ink tank for an ink-jet printer, i. e. BJF8500 (trade name) manufactured by Canon Inc., and then the ink tank was stored at 60° C./Dry for 1 month for a storage test. After the storage test, no sediment was observed. Then the ink tank was fitted to the ink-jet printer, and ejection performance was observed, and any problems in the performance were not found. The aggregates of fine particles obtained after the pretreatment following the sequence (1) through (3) described earlier showed a pore volume of 0.41 ml/g in a pore radius range between 3 nm and 30 nm and that of 0.001 ml/g in a pore radius range exceeding 30 nm. The pore volume was 0.38 ml/g in a pore radius range between 3 nm and 20 nm, and was 0.027 ml/g in a pore radius range exceeding 20 nm. The BET specific surface area of the aggregates of fine particles was 215 m²/g.

Now, the preparation of ink subsets 1 and 2 used in the examples and the comparative examples will be described.

<Preparation of Ink Subset>

The ingredients listed below were mixed together, agitated sufficiently and dissolved. Subsequently, the prepared solutions were filtered under pressure by means of a membrane filter having a pore size of 0.45 μm (Fluoropore Filter: tradename, available from Sumitomo Electric Industries, Ltd.) to obtain black, yellow, magenta and cyan dye inks Bk1, Y1, M1 and C1, which were combined to produce ink subset 1.

| [black ink Bk1] | |
|---|---|
| C. I. Direct Black 195 | 2.5 portions |
| 2-pyrrolidone | 10 portions |
| glycerol | 5 portions |
| isopropyl alcohol | 4 portions |
| sodium hydroxide | 0.4 portions |
| water | 78.1 portions |
| [yellow ink Y1] | |
| Projet Fast Yellow 2 (available from Zeneca) | 2 portions |
| C. I. Direct Yellow 86 | 1 portion |
| thiodiglycol | 8 portions |
| ethylene glycol | 8 portions |
| Acetylenol EH (available from Kawaken Chemicals KK) | 0.2 portions |
| isopropyl alcohol | 4 portions |
| water | 76.8 portions |
| [magenta ink M1] | |
| Projet Fast Magenta 2 (available from Zeneca) | 3 portions |
| glycerol | 7 portions |
| urea | 7 portions |
| Acetylenol EH (available from Kawaken Chemicals KK) | 0.2 portions |
| isopropyl alcohol | 4 portions |
| water | 78.8 portions |
| [cyan ink C1] | |
| C. I. Direct Blue 199 | 3 portions |
| ethylene glycol | 7 portions |
| diethylene glycol | 10 portions |
| Acetylenol EH (available from Kawaken Chemicals KK) | 0.3 portions |
| water | 79.7 portions |

<Preparation of Ink Subset 2>

The ingredients listed below were used to prepare a pigment dispersion liquid, which was then used to prepare black ink Bk2. Inks of the other colors were also prepared by using the pigment dispersion liquids produced for the respective colors in the same manner except that the coloring material was replaced. Thus, yellow, magenta and cyan pigment inks Y2, M2 and C2 were obtained, which were combined to produce ink subset 2.

[Black Ink Bk2]
(Preparation of Pigment Dispersion Liquid)

| | |
|---|---|
| styrene-acrylic acid-ethyl acrylate copolymer (acid value: 140, mass average molecular weight: 5,000) | 1.5 portions |
| monoethanolamine | 1.0 portions |
| diethylene glycol | 5.0 portions |
| ion exchange water | 81.5 portions |

The above ingredients were mixed and heated in a water bath to 70° C. and the resin content was completely dissolved. 10 portions carbon black (MCF 88: tradename, available from Mitsubishi Chemical Corp.) newly manufactured on an experiment basis and 1 portion of isopropyl alcohol were added to the obtained solution, pre-mixed for 30 minutes and subjected to a dispersion process under the following conditions.

disperser machine:sand grinder (available from Igarashi Kikai K K)

crushing medium:zirconium beads, diameter:1 mm
filling ratio of crushing medium:50% (volume ratio)
crushing time:3 hours Additionally, the dispersion liquid was subjected to a centrifugal separation process (12,000 rpm, 20 minutes) to remove large grains and obtain a pigment dispersion liquid.
(Preparation of Black Ink Bk2)

The above pigment dispersion liquid was used and the other ingredients listed below with the composition ratio were mixed together to produce ink containing the pigment, which was used as black ink Bk2.

| | |
|---|---|
| above pigment dispersion liquid | 30.0 portions |
| glycerol | 10.0 portions |
| ethylene glycol | 5.0 portions |
| N-methylpyrrolidone | 5.0 portions |
| ethyl alcohol | 2.0 portions |
| ion exchange water | 48.0 portions |

[Yellow Ink Y2]

Yellow ink Y2 was prepared in a manner same as the preparation of black ink Bk2 except that the 10 portions of carbon black (MCF88: tradename, available from Mitsubishi Chemical Corp.) used for preparing the black ink Bk2 was replaced by Pigment Yellow 74.

[Magenta Ink M2]

Magenta ink M2 was prepared in a manner same as the preparation of black ink Bk2 except that the 10 portions of carbon black (MCF88: tradename, available from Mitsubishi Chemical Corp.) used for preparing the black ink Bk2 was replaced by Pigment Red 7.

[Cyan Ink C2]

Cyan ink C2 was prepared in a manner same as the preparation of black ink Bk2 except that the 10 portions of carbon black (MCF88: tradename, available from Mitsubishi Chemical Corp.) used for preparing the black ink Bk2 was replaced by Pigment Blue 15.

Example 1 through Example 8

The liquid compositions A through D, the ink subset 1 (Bk1, Y1, M1 and C1) and the ink subset 2 (Bk2, Y2, M2 and C2) obtained in a manner as described above were used for the combinations listed in Table 2 below and subjected to printing tests. The combinations were used respectively in Examples 1 through 8.

TABLE 2

INK SETS USED IN EXAMPLES 1 TO 8

| | Ink Subset | Liquid Composition |
|---|---|---|
| Example 1 | 1 | A |
| Example 2 | 1 | B |
| Example 3 | 1 | C |
| Example 4 | 1 | D |
| Example 5 | 2 | A |
| Example 6 | 2 | B |
| Example 7 | 2 | C |
| Example 8 | 2 | D |

In each of Examples 1 through 8 where the liquid compositions A through D and the ink subsets 1 and 2 were combined in a manner as listed in Table 2 above, a colored section was formed on PPC paper (available from Canon) by using the corresponding ink set. An ink-jet recording apparatus similar to the one illustrated in FIG. 1 was used with five recording heads as shown in FIG. 3 to form a color image. Specifically, as an ink-jet printer, modified version of BJF8500 manufactured by Canon was prepared, and tanks for the ink-jet printer were filled with the liquid composition and the ink respectively, and fitted to the ink-jet printer. Then ink-jet recording was performed. The liquid composition was ejected and made to adhere to the PPC paper and subsequently ink was ejected and made to adhere to the PPC paper.

More specifically, a 2-pass fine printing operation of forming an image in a printing region by two scanning sessions was conducted. In each passing session, the liquid composition was applied to the pixel positions where yellow, magenta, cyan or black ink is applied for printing. In other words, the logical sum of the printing data of yellow, magenta, cyan and black of each pass session was used as the printing data of the liquid composition. There is no limitation to the type of fine mask to be used for fine printing and known techniques can be used. Therefore, it will not be described any further.

The recording heads used in the examples showed a recording density of 600 dpi and a drive frequency of 9.6 kHz was selected as drive condition. As recording heads with a recording density of 600 dpi were used, the heads ejected an amount of liquid per dot of 15 ng for yellow, magenta, cyan inks and the liquid composition and 30 ng for black ink. Note that these recording conditions were same for all the examples and the comparative examples.

Comparative Examples 1 and 2

In these comparative examples, only the ink subsets 1 and 2 were used for printing as shown in Table 3 below.

TABLE 3

INK SETS USED IN COMPARATIVE EXAMPLES 1 & 2

| | Ink Subset | Liquid Composition |
|---|---|---|
| Comparative Example 1 | 1 | None |
| Comparative Example 2 | 2 | None |

In the case of the recording operations using only the ink subsets 1 and 2 (Comparative Examples 1 and 2), the recording heads showed a recording density of 600 dpi and a drive frequency of 9.6 kHz was selected as drive condition. As recording heads with a recording density of 600 dpi were used, the heads ejected an amount of liquid per dot of 15 ng for yellow, magenta and cyan inks and 30 ng for black ink as in Examples 1 through 8.

[Evaluation Method and Rating System]

The evaluation method and the evaluation criteria as shown below were used for evaluating the recorded images obtained in Examples 1 through 8 and Comparative Examples 1 and 2. Table 4 summarily shows the obtained results.

(Method of Evaluating Recorded Image)
(Coloring Property)

A RGB color chart according to the Standard High Precision Picture Data (SHIPP) including XYZ/CIELAB/RGB digital color chart data (supervised by the Committee for Preparation of Standard High Precision Images, published by the Institute of Image Electronics Engineers of Japan) was printed by means of a printer and the colors of the color chart was observed. The coloring property was determined by computing the three-dimensional stretch (to be referred to as color gamut volume hereinafter) of the color distribution and comparing the obtained results. The image processing operations for forming printed images were conducted under the same conditions and the colors were measured 24 hours after the printing operation by means of GRETAG Spectrolino under the conditions including light source: D50 and visual field: 2°. The rating system is shown below. The ratio of the color gamut volume relative to that of the images printed by using only an ink subset (Comparative Examples 1 and 2) was used for the rating system.

AAA: The color gamut volume ratio is not less than 1.7.
AA: The color gamut volume ratio is not less than 1.5 and less than 1.7.
A: The color gamut volume ratio is not less than 1.4 and less than 1.5.
BB: The color gamut volume ratio is not less than 1.2 and less than 1.4.
B: The color gamut volume ratio is not less than 1.0 and less than 1.2.
C: The color gamut volume is less than 1.0.

Independently from the above, an image was formed by using coat paper for ink-jet recording (Color BJ Paper LC-101: tradename, available from Canon) and the ink subset 1 and the color gamut volume ratio relative to that of the printed matter of Comparative Example 1 was determined t find it equal to 1.3.

(2) Uniformity

After printing solid images by using the above printer and yellow, magenta, cyan and black inks, the images were visually evaluated for white haze and color unevenness in terms of color uniformity. The colors that were particularly poor in terms of color uniformity were evaluated. The rating system used for the evaluation is shown below.

A: Practically no white haze nor color unevenness occurred.
B: White haze and color unevenness were slightly observable along fibers of paper, they were practically not a problem.
C: White haze and color unevenness were remarkable along fibers of paper.

(3) Striped Image

After printing solid images by using the above printer and yellow, magenta, cyan and black inks, the images were visually evaluated for striped image. The colors that were particularly poor in terms of stripes were evaluated. The rating system used for the evaluation is shown below.

A: Practically no striped image occurred.
B: While a striped image was observable for each head scan, it was practically not a problem.
C: A striped image was remarkable for each head scan.

(4) Texture

After printing solid images by using the above printer and yellow, magenta, cyan and black inks, the recording medium was visually evaluated for texture. The rating system used for the evaluation is shown below.

A: Both the printed section and the unprinted section were not strange and the texture of plain paper was tangible.
B: The printed section and the unprinted section were different in terms of texture or all the recording medium was different from plain paper in terms of texture.

(5) Bleeding

After printing cyan and black solid images by using the above printer, bleeding along the color boundaries was visually observed. The rating system used for the evaluation is shown below.

AA: No bleeding was visually observable.
A: Bleeding was practically not conspicuous.
B: While bleeding was noticeable, it is practically not a problem.
C: Bleeding was so remarkable that the color boundaries were not clear.

(6) Quality of Characters

A text was printed in black by using the above printer and the degree of quality of the printed character was visually observed. The rating system used for the evaluation is shown below.

A: The text was sharply reproduced and practically feathering and dot gain did not occur.
B: Feathering and dot gain occurred slightly but they were practically not a problem.
C: Other than A and B.

TABLE 4

EVALUATION RESULTS

| | Coloring Property | Uniformity | Stripe Alleviation | Texture | Bleed Alleviation | Letter Quality |
|---|---|---|---|---|---|---|
| Ex. 1 | AA | A | A | A | A | A |
| Ex. 2 | AAA | A | A | A | AA | A |
| Ex. 3 | AAA | A | A | A | AA | A |
| Ex. 4 | AA | A | A | A | AA | A |
| Ex. 5 | AAA | A | A | A | A | A |
| Ex. 6 | AAA | A | A | A | AA | A |
| Ex. 7 | AAA | A | A | A | AA | A |
| Ex. 8 | AAA | A | A | A | AA | A |
| Comp. 1 | B | C | A | A | B | C |
| Comp. 2 | B | C | A | A | C | C |

Examples 9 through 15

In order to see the influence of the recording medium on the image quality, the liquid composition B, the ink subset 1 and "plain paper" of seven different types that are popularly marketed with the respective tradenames were used and an image was printed on plain paper by using each of the inks of the four colors of the ink subset 1 and the liquid composition B as in the preceding examples to produce recorded images of Examples 9 through 15. The images were evaluated by using the above rating systems. Table 5 below summarily shows the obtained results.

1) PB paper: available from Canon
2) Brilliant Whitepaper: available from Canon
3) Great White Ink Jet: available from Union Camp
4) Jet Print: available from Hammermill
5) Xerox 4024: available from Xerox
6) Bright White Inkjet Paper: available from Hewlett Packard
7) Ray Jet: available from Aussdat Ray

TABLE 5

| | Recording Medium | Coloring Property | Uniformity | Stripe Alleviation | Texture | Bleed Alleviation | Letter Quality |
|---|---|---|---|---|---|---|---|
| Ex. 9 | 1) | AAA | A | A | A | AA | A |
| Ex. 10 | 2) | AAA | A | A | A | AA | A |

TABLE 5-continued

|  | Recording Medium | Coloring Property | Uniformity | Stripe Alleviation | Texture | Bleed Alleviation | Letter Quality |
|---|---|---|---|---|---|---|---|
| Ex. 11 | 3) | AAA | A | A | A | AA | A |
| Ex. 12 | 4) | AAA | A | A | A | AA | A |
| Ex. 13 | 5) | AAA | A | A | A | AA | A |
| Ex. 14 | 6) | AAA | A | A | A | AA | A |
| Ex. 15 | 7) | AAA | A | A | A | AA | A |

As a result, it was confirmed that, with the method of forming a colored section used in Examples 9 through 15, images satisfactory in terms of coloring property, color uniformity, striped image, and texture were obtained regardless of the type of recording medium as shown in Table 5.

As described above in detail, according to the invention, there are provided a liquid composition, an ink set, a method of forming a colored section on a recording medium and a ink-jet recording apparatus, with which, when an ink-jet recording operation is conducted on a plain paper by ink-jet recording, it is possible to obtain an image that is as excellent as an image formed on a coat paper in terms of coloring effect, color uniformity, suppression of bleeding along color boundaries and quality of characters. Additionally, the solidly printed part of the obtained image is free from striped images. Furthermore, according to the invention, there is provided a liquid composition that is excellent in terms of storage stability, stability of ejection from a recording head and ink-jet recording characteristics.

What is claimed is:

1. A liquid composition to be applied to a recording medium with ink containing a coloring material to form a colored section on the recording medium, said liquid composition containing at least a solvent and fine particles reactive to said coloring material, the specific surface area of aggregates of fine particles formed from the liquid composition by way of steps (1) through (4) listed below being 70 to 250 m²/g as determined by the BET nitrogen adsorption/desorption method,
   (1) a step of drying the liquid composition at 120° C. for 10 hours in the atmosphere to evaporate the solvent;
   (2) a step of raising the temperature of said dried product resulting from the step (1) from 120° C. to 700° C. in an hour and baking it at 700° C for 3 hours;
   (3) a step of gradually cooling the baked product resulting from the step (2) to room temperature and pulverizing it; and
   (4) a step of deaerating the powder obtained in the step (3) by vacuum at 120° C. for 8 hours to obtain aggregates of fine particles.

2. A liquid composition according to claim 1, wherein said ink is anionic or cationic aqueous ink and said liquid composition is aqueous and contains fine particles in a dispersed state, the particles' surfaces being electrically charged to the polarity opposite to that of said aqueous ink.

3. A liquid composition according to claim 1, wherein said fine particles are adapted to adsorb the coloring material in the ink to the surfaces thereof while preventing the coloring material from aggregating when forming a colored section.

4. A liquid composition according to claim 1, wherein the zeta potential is between +5 and +90 mV.

5. A liquid composition according to claim 1, further containing an acid, and having a pH of 2 to 7.

6. A liquid composition according to claim 5, wherein the primary dissociation constant pKa of the acid in water is not more than 5.

7. A liquid composition according to claim 1, wherein the zeta potential is between −5 and −90 mV.

8. A liquid composition according to claim 1, further containing a base, and having a pH of 7 to 12.

9. A liquid composition according to claim 8, wherein the primary dissociation constant pKb of the base in water is not more than 5.

10. A liquid composition according to claim 1, wherein the average particle diameter of the fine particles is within a range of from 0.005 to 1 μm.

11. A liquid composition according to claim 1, wherein the specific surface area of the fine particles is found within a range between 70 and 300 m²/g.

12. An ink set comprising an ink containing a coloring material and the liquid composition according to claim 1 respectively.

13. An ink set according to claim 12, wherein said ink is anionic or cationic aqueous ink and said liquid composition is aqueous and contains fine particles electrically charged to the polarity opposite to that of said aqueous ink on the surfaces thereof in a dispersed state.

14. An ink set according to claim 12, wherein said ink is at least an ink selected from a group consisting of yellow ink, magenta ink, cyan ink, black ink, red ink, blue ink and green ink.

15. An ink set according to claim 12, comprising yellow ink, magenta ink and cyan ink respectively as the ink.

16. An ink set according to claim 12, comprising yellow ink, magenta ink, cyan ink and black ink respectively as the ink.

17. An ink set according to claim 12, wherein said ink is anionic ink and the zeta potential of said liquid composition is between +5 and +90 mV.

18. An ink set according to claim 12, wherein said ink is anionic ink, and said liquid composition contains an acid and has a pH of 2 to 7.

19. An ink set according to 18, wherein the acid shows a primary dissociation constant pKa of not more than 5 in water.

20. An ink set according to claim 12, wherein said ink is cationic ink and the zeta potential of the liquid composition is between −5 and −90 mV.

21. An ink set according to claim 12, wherein said ink is cationic ink, and said liquid composition contains a base and has a pH of 7 to 12.

22. An ink set according to 21, wherein the base shows a primary dissociation constant pKb of not more than 5 in water.

23. An ink set according to claim 12, wherein the average particle diameter of the fine particles dispersed in the liquid composition is within a range of from 0.005 to 1 μm.

24. An ink set according to claim 1, wherein the specific surface area of the fine particles is within a range of from 70 to 300 m²/g.

25. An ink set according to claim 12, wherein said ink is anionic ink and contains an anionic compound.

26. An ink set according to claim 25, wherein said anionic compound includes an aqueous dye having an anionic group.

27. An ink set according to claim 25, wherein said anionic compound includes a pigment having an anionic group on the surface thereof.

28. An ink set according to claim 25, wherein said ink contains a pigment and an anionic compound for dispersing the pigment in the ink.

29. An ink set according to claim 12, wherein said ink is cationic ink and contains a cationic compound.

30. A method of forming a colored section on a recording medium, said method comprising the steps of (i) applying ink containing a coloring material to a recording medium and (ii) applying a liquid composition as defined in claim 1 above to the recording medium.

31. A method according to claim 30, wherein said ink is anionic or cationic aqueous ink and said liquid composition is aqueous and contains fine particles electrically charged to the polarity opposite to that of said aqueous ink on the surfaces thereof in a dispersed state.

32. A method according to claim 30, wherein said step (i) is conducted after said step (ii).

33. A method according to claim 30, wherein said step (ii) is conducted after said step (i).

34. A method according to claim 30, wherein said step (ii) is conducted after said step (i) and subsequently said step (i) is conducted once again.

35. A method according to claim 30, wherein the step (i) is conducted by causing the ink to be ejected from an orifice according to a recording signal.

36. A method according to claim 30, wherein the step (ii) is conducted by causing the liquid composition to be ejected from an orifice according to a recording signal.

37. A method according to claim 35 or 36, wherein the ink-jet recording method to be used is a method of causing said liquid composition to be ejected by applying thermal energy to the liquid composition.

38. An ink-jet recording apparatus provided with an ink-container containing an ink, a liquid composition-container containing a liquid composition, and an ink-jet head for ejecting the ink and the liquid composition respectively, wherein the ink comprises a coloring material, and the liquid composition is that defined in claim 1.

39. An apparatus according to claim 38, wherein said ink-jet head is a thermal ink-jet head adapted to eject liquid by causing thermal energy to act.

* * * * *

UNITED STATES PATENT AND TRADEMARK OFFICE
CERTIFICATE OF CORRECTION

PATENT NO. : 6,863,391 B2
DATED : March 8, 2005
INVENTOR(S) : Hiroshi Tomioka et al.

It is certified that error appears in the above-identified patent and that said Letters Patent is hereby corrected as shown below:

<u>Title page,</u>
Item [56], References Cited, OTHER PUBLICATIONS, "Roček, et al." reference, "Scienc s," should read -- Sciences, --.

<u>Column 37,</u>
Line 67, "vinylnaphthal5ene" should read -- vinylnaphthalene --.

<u>Column 42,</u>
Line 44, "A" should be deleted.

Signed and Sealed this

Eleventh Day of April, 2006

JON W. DUDAS
*Director of the United States Patent and Trademark Office*